(12) United States Patent
Reid

(10) Patent No.: US 11,915,554 B1
(45) Date of Patent: Feb. 27, 2024

(54) ONLINE BILLS PAYMENT GAMES

(71) Applicant: Antoine Reid, Chesapeake, VA (US)

(72) Inventor: Antoine Reid, Chesapeake, VA (US)

( * ) Notice: Subject to any disclaimer, the term of this patent is extended or adjusted under 35 U.S.C. 154(b) by 2 days.

(21) Appl. No.: 17/348,974

(22) Filed: Jun. 16, 2021

(51) Int. Cl.
*A63F 13/00* (2014.01)
*A63F 9/18* (2006.01)
*G07F 17/32* (2006.01)
*G06Q 30/0207* (2023.01)
*G06Q 20/38* (2012.01)
*G06Q 40/02* (2023.01)
*G06Q 20/14* (2012.01)

(52) U.S. Cl.
CPC ....... *G07F 17/3244* (2013.01); *G06Q 20/381* (2013.01); *G06Q 30/0209* (2013.01); *G06Q 30/0215* (2013.01); *G06Q 40/02* (2013.01); *G07F 17/3237* (2013.01); *G07F 17/3262* (2013.01); *G07F 17/3269* (2013.01); *G07F 17/3295* (2013.01); *A63F 9/18* (2013.01); *G06Q 20/14* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 6,070,874 | A * | 6/2000 | Ivers | A63F 9/18 273/292 |
| 6,692,005 | B2 * | 2/2004 | Vancura | G07F 17/3295 273/274 |
| 7,651,095 | B1 * | 1/2010 | Pillalamarri | A63F 9/18 273/274 |
| 8,459,648 | B2 * | 6/2013 | Kimbrough | A63F 3/00 273/256 |
| 8,777,712 | B2 * | 7/2014 | Baerlocher | G07F 17/3262 463/16 |
| 2003/0050806 | A1 * | 3/2003 | Friesen | G06Q 99/00 705/5 |
| 2006/0211493 | A1 * | 9/2006 | Walker | G07F 17/3262 463/29 |
| 2010/0081114 | A1 * | 4/2010 | Goodrich | G09B 7/06 434/128 |
| 2010/0267438 | A1 * | 10/2010 | Williams | G07F 17/3255 463/17 |
| 2014/0113716 | A1 * | 4/2014 | Mukhopadhyay | A63F 13/00 463/31 |
| 2017/0084129 | A1 * | 3/2017 | Baerlocher | G07F 17/3211 |

* cited by examiner

*Primary Examiner* — Sunit Pandya
(74) *Attorney, Agent, or Firm* — Shaddock Law Group, PC

(57) ABSTRACT

A method of providing payment towards financial obligations through online gaming, which allows the player to identify at least one financial obligation; provides the player an opportunity to participate in at least one online game to receive one or more credits for successfully participating in, completing, or winning the online game; credits one or more credits to the player's account for successfully participating in, completing, or winning the game; assigns, once the player has accumulated one or more credits, a monetary value to the credits; allows the player to exchange the assigned monetary value of a determined number of credits from the player's account for monetary credit towards payment of at least one financial obligation; and submits, on the player's behalf, a monetary payment towards at least one financial obligation that is equivalent to the monetary credit exchanged by the player.

17 Claims, 75 Drawing Sheets

ONLINE BILLS PAYMENT GAMES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

Notice of Copyrighted Material

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates to the field of online advertising a product or service through an online game. In particular, the present disclosure relates to systems and methods for providing players worldwide over the Internet through a secure network with multiple opportunities to win prizes in credit or cash payments towards any bills of their choice. Examples of bills are mortgages, rent, cell phone, etc., and the winning game amounts vary. For example, $25.00, $75.00, $2,000.00 etc.

2. Description of Related Art

Paying bills online has grown in popularity; billions of people around the world pay their bills online through different secure outlets. Paying bills online is manageable and very timesaving.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

The systems and methods of the present disclosure provide players worldwide with hope and empower them with the necessary knowledge and tools to help them take advantage of beneficial opportunities and therefore eliminate their individual debt through the payment of individual or collective bills.

In various exemplary, non-limiting embodiments, the online bills payment games of the presently disclosed systems and/or methods (sometimes referred to herein as Jumungee) combines several important industries, such as, for example, advertisement, gaming, and finance, to create a new, disruptive technological industry that specializes in software. Jumungee provides many fascinating ways to allow players to play games and in the process win credit or cash payments that will be paid on a bill or several bills of the winner's choice. Although players will never receive cash payments directly, they will be taxed on the winning amount due to the fact they are receiving the benefit of having their bills paid. In various exemplary, nonlimiting embodiments, the systems and methods of the present disclosure may provide players with a 1099-Miscellaneous (or other tax documentation) for other income, but depending on the monetary amount, if it is under $600.00, it may not be required.

In various exemplary, non-limiting embodiments, the online bills payment games of the presently disclosed systems and/or methods (sometimes referred to herein as Jumungee) provide anonymous players worldwide an opportunity to join a network within a designated country, empowering all with multiple and beneficial opportunities along with new tools that can improve their financial status by participating in online bill payment games, over the Internet. All winners will receive prizes in various cash, credit, or other representative payment amounts towards any designated bills of their choice. All players will connect to the website from the frontend (Client-side). All information from players will be encrypted and secured on the backend (Server-side). In various exemplary, nonlimiting embodiments, the backend is a collection of database servers that are programmed to disburse the information into individual tables in the designated database.

In certain exemplary, nonlimiting embodiments, the systems and methods of the present disclosure offer at least 2 different types of games, advertisement in the form of a game ("Jumungee"), unlimited referrals, the top row (current information), and the right scoreboard column (additional information).

In certain exemplary embodiments, the 2 different types of games Jumungee provides are "Jumungee", and "The Monthly High Score". It should be appreciated that these names and game types are merely representative and should not be viewed as limiting the systems or methods of the present disclosure.

In various exemplary embodiments, players may optionally be offered a free membership (i.e., at the Limited level). Players may join and/or participate in at least 1 of 3 subscriptions or memberships.

With these 2 types of games, the systems and methods of the present disclosure will optionally offer at least 2 paid subscriptions or memberships (Plus, Unlimited). The Unlimited paid subscriptions or memberships will receive a subscription, membership ID #, UUID #, and/or referral code.

An exemplary game is "Jumungee", it will have a prize amount that players are competing to win. Also, included is a game board that players will be asked several questions and once they complete the game board they will receive their winning prize credits. The systems and methods of the present disclosure will have four different categories and the questions will increase in difficulty as the players continue to answer them correctly. Also, we have incorporated a preparations section on our navigation bar. This area levels the playing field among players by allowing all players who want to take advantage and study upcoming game material before the games become active. We want to give all players time to learn the information so that everyone can be successful. A player's level (Limited, Plus or Unlimited) will determine how many games the player is allowed to play per day, weekly and/or monthly.

The second game illustrates an optional "The Monthly High Score". All players will receive game points for the games they played. At the end of every month, the systems and methods of the present disclosure will add up all of the game points and the members with the highest score for that month will win a pre-determined amount of credits that are used to pay any bills of their choice.

In various exemplary embodiments, the systems and methods of the present disclosure optionally include an unlimited referral program (URP). If included, the URP is a marketing and advertisement feature. The URP is a means for players that will become subscribers or members of the website at our Unlimited level. They can take advantage of the program and tell as many people as they know to join Jumungee and become a subscriber or member too. After the player pays for their subscription or membership, the member that referred them will receive 5% off their annual fee for each referral when they join.

Advertisement in the form of a game is a creative way for companies to market their products and services to our players. All games will be fun, exciting, educational, and will have a time period. This feature is also included in the "Jumungee" game.

In certain exemplary embodiments, a row (i.e., for example, the top row) or other graphical display is provided for players to see, date and time, username, game status, winning game credits, membership level, appreciation points.

In certain exemplary embodiments, a column (i.e., for example, the right scoreboard column) or other graphical display is provided for players to see, the monthly high score, name of the game, total game prize credits to pay bills, game points earned per game, the points multiplier, and the countdown timer.

In various exemplary embodiments, the systems and methods of the present disclosure optionally include a method of providing payment towards financial obligations through an online game, which includes at least some of the steps of allowing at least one player to create an account and identify at least one financial obligation; providing the player an opportunity to participate in at least one online game, wherein the player is eligible to receive one or more credits for successfully participating in, completing, or winning the online game; crediting to the player's account one or more credits for successfully participating in, completing, or winning the online game; allowing the player to participate in one or more online games and accumulate one or more credits in the player's account; assigning, once the player has accumulated one or more credits, the one or more credits in the player's account a monetary value; allowing the player to exchange the assigned monetary value of a determined number of credits from the player's account for monetary credit towards payment of at least one financial obligation; subtracting a number of credits from the player's account equivalent to the determined number of credits exchanged by the player for monetary credit; and submitting, on the player's behalf, a monetary payment towards at least one financial obligation, wherein the monetary payment submitted on the player's behalf is equivalent to the monetary credit exchanged by the player.

The systems and methods of the present disclosure may optionally include allowing at least one player to associate at least one financial obligation with the player's account.

In various exemplary embodiments, the systems and methods of the present disclosure optionally include a method of providing payment towards financial obligations through an online game, which includes at least some of the steps of presenting a player with a graphical representation of a game board, wherein the game board has a plurality of game spaces; presenting the player with a graphical representation of the player's position within an initial game space; presenting the player with four categories, followed by a question; providing the player with a determined time period for supplying a response to the presented question; crediting the player with a/or several game points if the player provides a proper response to the presented question, where in each game points corresponds to a determined monetary value and advancing the graphical representation of the player's position to the next game space; requiring the player to choose between at least one or more options if the player fails to respond within the determined time period or provides an improper response to the presented question within the determined time period, wherein at least one or more options comprises reducing a total monetary value for participating in the game, or not advancing or backtracking the graphical representation of the player's position to a previous game space, or subtracting at least one game point from the total number of game points credited to the player, and implementing the option chosen by the player; presenting subsequent questions to the player until the player provides a proper response to a presented question while the graphical representation of the player's position is represented in a final game space, a determined time period for the game expires, or the player terminates the game; and allowing the player to exchange the determined monetary value of a selected number of credits for monetary credit towards payment of at least one financial obligation.

In various exemplary embodiments, the response must be a predetermined response or must be one of a plurality of predetermined responses.

In various exemplary embodiments, the question is selected from a category chosen by the player and is selected from a pre-determined category.

In various exemplary embodiments, at least one subsequent question increases in difficulty from a previous question if the player answers the previous question correctly or decreases in difficulty from a previous question if the player answers the previous question incorrectly.

In various exemplary embodiments, the player is credited with a determined number of game points if the player completes the game or if the player provides a proper response to each of the presented questions.

In various exemplary embodiments, the systems and methods further include beginning the game with a determined game credits.

In various exemplary embodiments, the systems and methods of the present disclosure optionally include a method of providing payment towards financial obligations through an online game, which includes at least some of the steps of presenting a plurality of players with a graphical representation of a game board, wherein the game board has a plurality of game spaces; presenting each of a plurality of players with a discrete graphical representation of each player's position within an initial game space; presenting, during a respective turn, each player with a question; providing, during the respective turn, each player with a determined time period for supplying a response to the presented question; crediting each player with at least one or more game points if, during the respective turn, the player provides a proper response to the presented question, where in each game point corresponds to a determined monetary value and advancing the graphical representation of the player's position to the next game space; requiring each player to choose between at least one or more options if, during the respective turn, the player fails to respond within the determined time period or provides an improper response to the presented question within the determined time period, wherein at least one or more options comprises reducing the game credits that represents a total monetary value for participating in the game, subtracting at least one game point from the total number of game points credited to the player, or not advancing or backtracking the graphical representation of the players position to a previous game space and implementing the option chosen by the player; and presenting subsequent questions to the players, in turn, until at least one of the players provides a proper response to a presented question while the graphical representation of the player's position is represented in a final game space, a determined time period for the game expires, or a determined number of game points has been credited to the players.

Accordingly, the presently disclosed systems and/or methods provide online bills payment games that allow a player to participate in online games that allow winning players to have credits applied to one or more previously identified bills or outstanding debts.

The presently disclosed systems and/or methods separately provide online bills payment games that are fun, exciting, and educational for players to participate in and can result in players winning payments towards existing bills or other outstanding debts.

The presently disclosed systems and/or methods separately provide online bills payment games that allow easy participation by a player.

The presently disclosed systems and/or methods separately provide online bills payment games that allow winning players to have credits applied to one or more previously identified bills or outstanding debts of another player or person.

These and other aspects, features, and advantages of the presently disclosed systems and/or methods are described in or are apparent from the following detailed description of the exemplary, non-limiting embodiments of the presently disclosed systems and/or methods and the accompanying figures. Other aspects and features of embodiments of the presently disclosed systems and/or methods will become apparent to those of ordinary skill in the art upon reviewing the following description of specific, exemplary embodiments of the presently disclosed systems and/or methods in concert with the figures. While features of the presently disclosed systems and/or methods may optionally be discussed relative to certain embodiments and figures, all embodiments of the presently disclosed systems and/or methods can include one or more of the features discussed herein. Further, while one or more embodiments may optionally be discussed as having certain advantageous features, one or more of such features may also be used with the various embodiments of the systems and/or methods discussed herein. In similar fashion, while exemplary embodiments may optionally be discussed below as device, system, or method embodiments, it is to be understood that such exemplary embodiments can be implemented in various devices, systems, and methods of the presently disclosed systems and/or methods.

Any benefits, advantages, or solutions to problems that are described herein with regard to specific embodiments are not intended to be construed as a critical, required, or essential feature(s) or element(s) of the presently disclosed systems and/or methods or the claims.

BRIEF DESCRIPTION OF THE SEVERAL VIEWS OF THE DRAWINGS

As required, detailed exemplary embodiments of the presently disclosed systems and/or methods are disclosed herein; however, it is to be understood that the disclosed embodiments are merely exemplary of the presently disclosed systems and/or methods that may optionally be embodied in various and alternative forms, within the scope of the presently disclosed systems and/or methods. The figures are not necessarily to scale; some features may optionally be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems and/or methods.

The exemplary embodiments of the presently disclosed systems and/or methods will be described in detail, with reference to the following figures, wherein like reference numerals refer to like parts throughout the several views, and wherein:

FIG. 14 shows a screen shot illustrating certain exemplary usability and functionality of the present disclosure;

FIG. 23 shows a screen shot illustrating certain exemplary usability and functionality of the present disclosure;

FIG. 24 shows a screen shot illustrating certain exemplary usability and functionality of the present disclosure;

Figure 25:
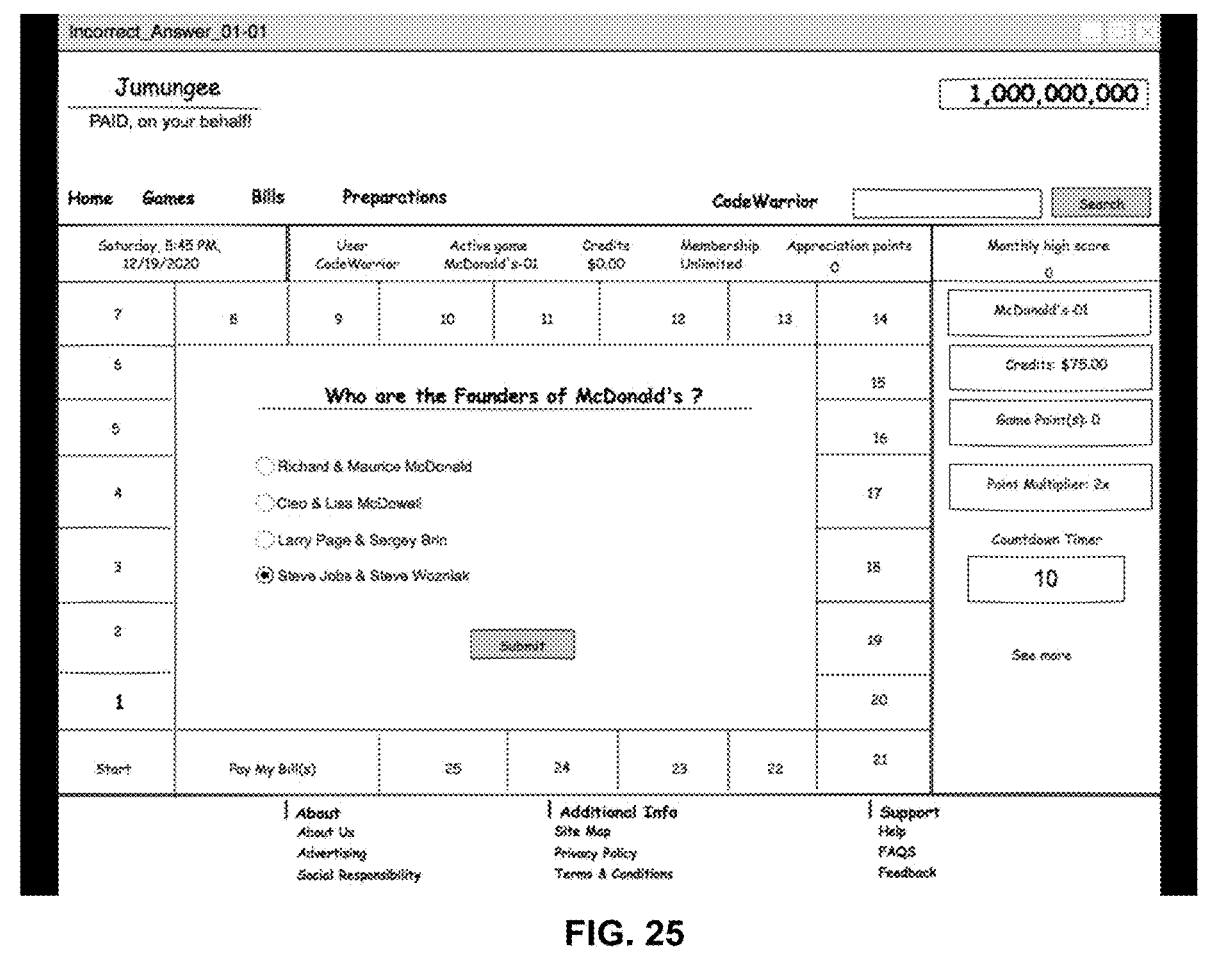

FIG. 25 shows a screen shot illustrating certain exemplary usability and functionality of the present disclosure;

Figure 26:
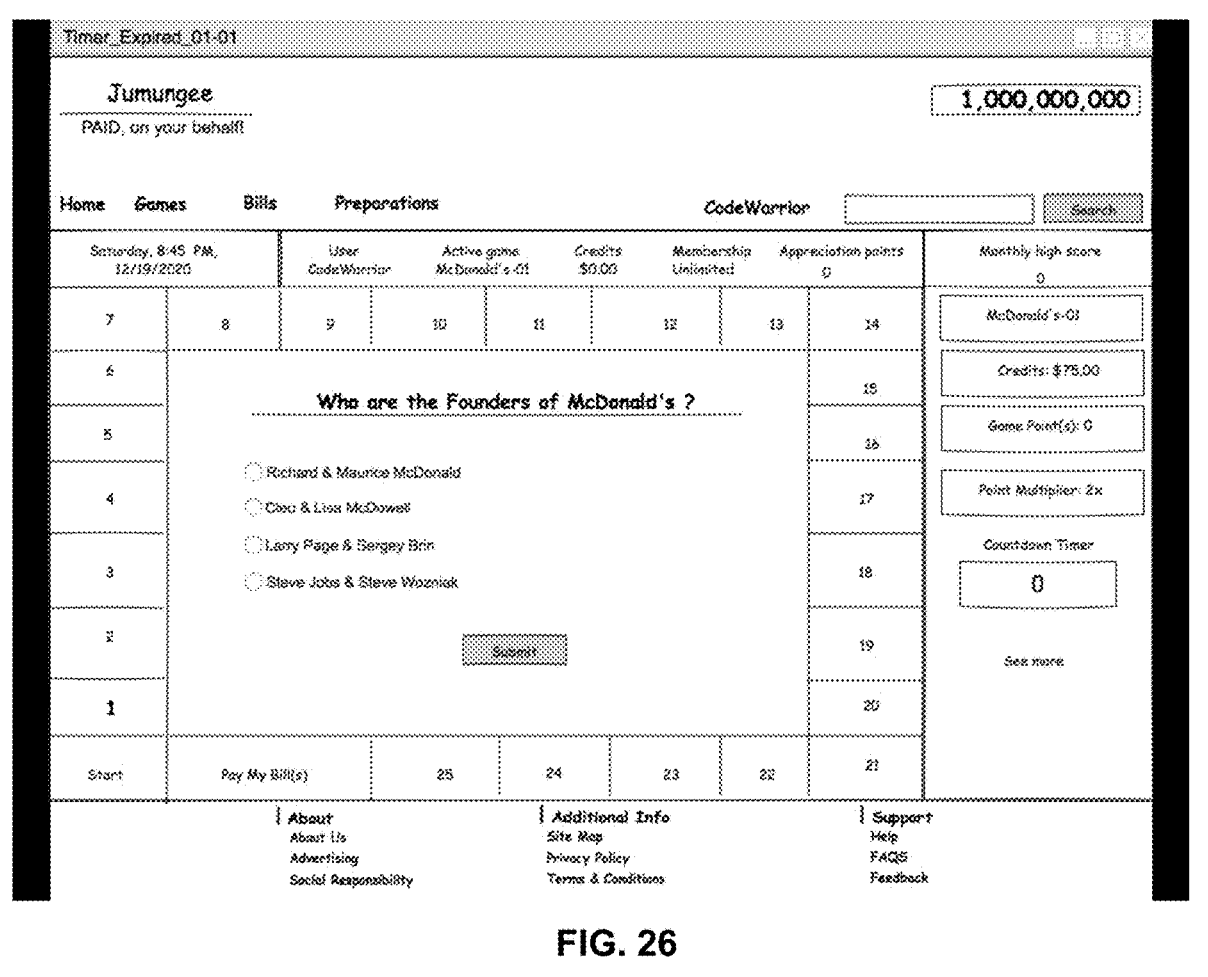

FIG. 26 shows a screen shot illustrating certain exemplary usability and functionality of the present disclosure;

Figure 31:
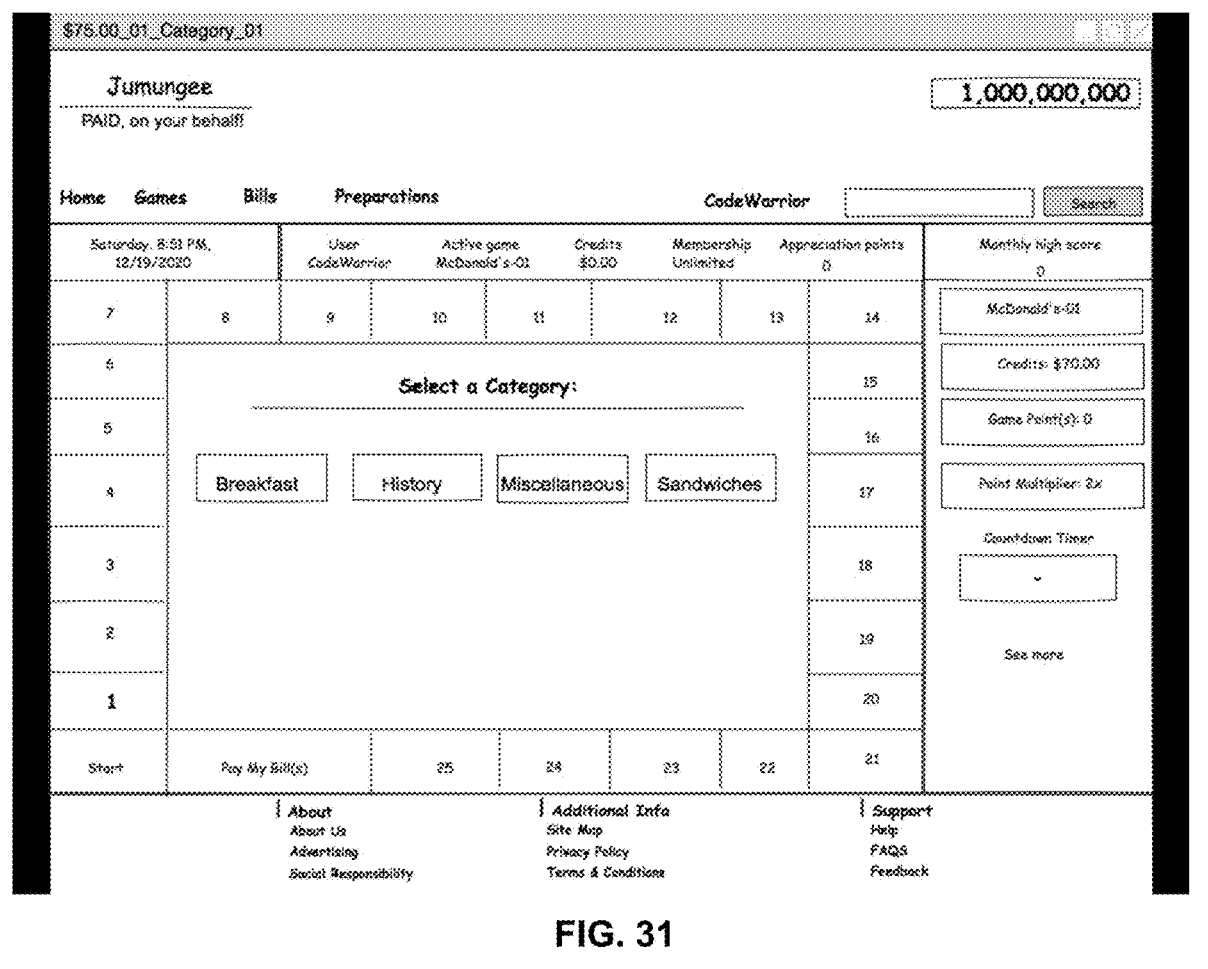

FIG. 31 shows a screen shot illustrating certain exemplary usability and functionality of the present disclosure;

Figure 32:
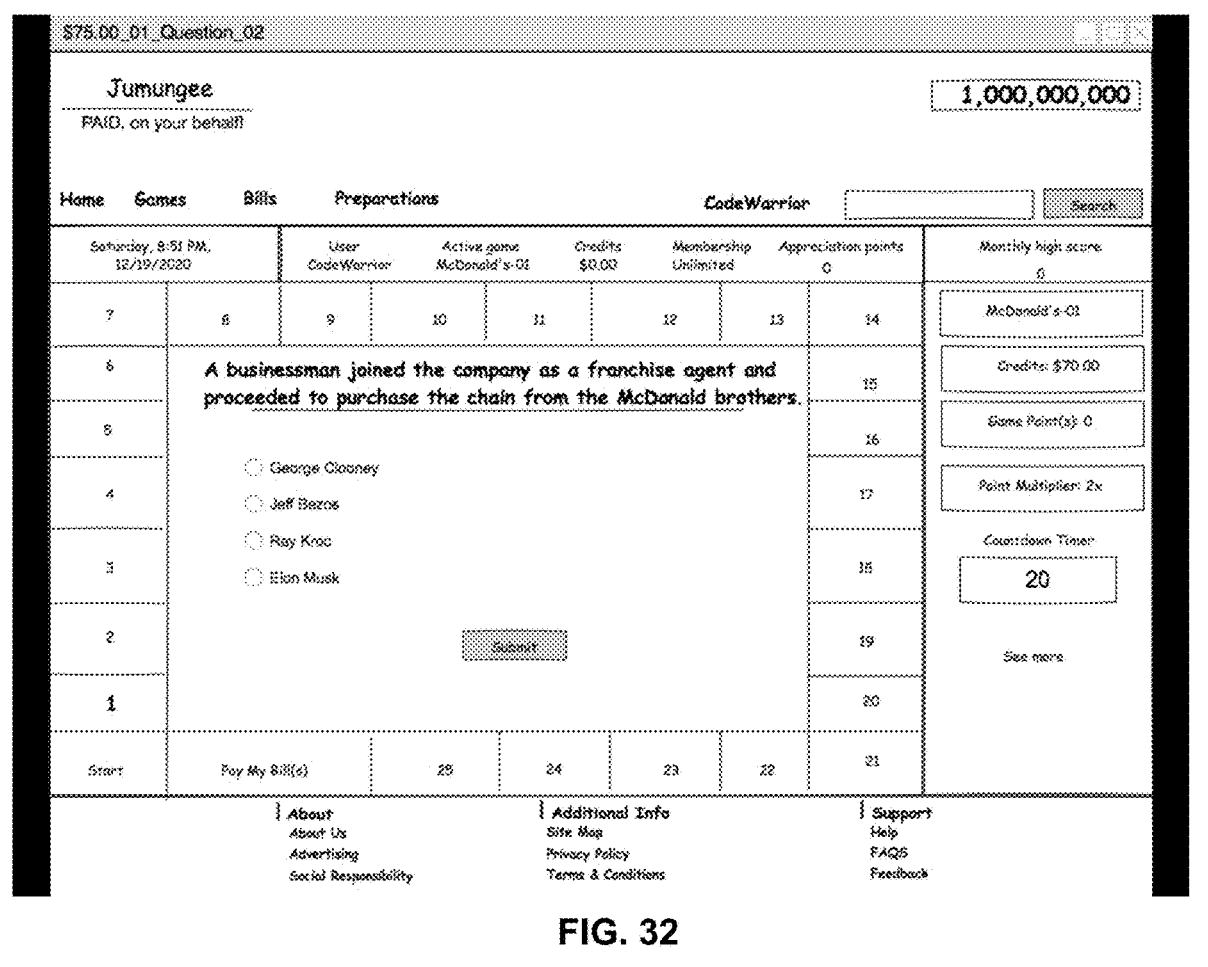

FIG. 32 shows a screen shot illustrating certain exemplary usability and functionality of the present disclosure;

Figure 34:
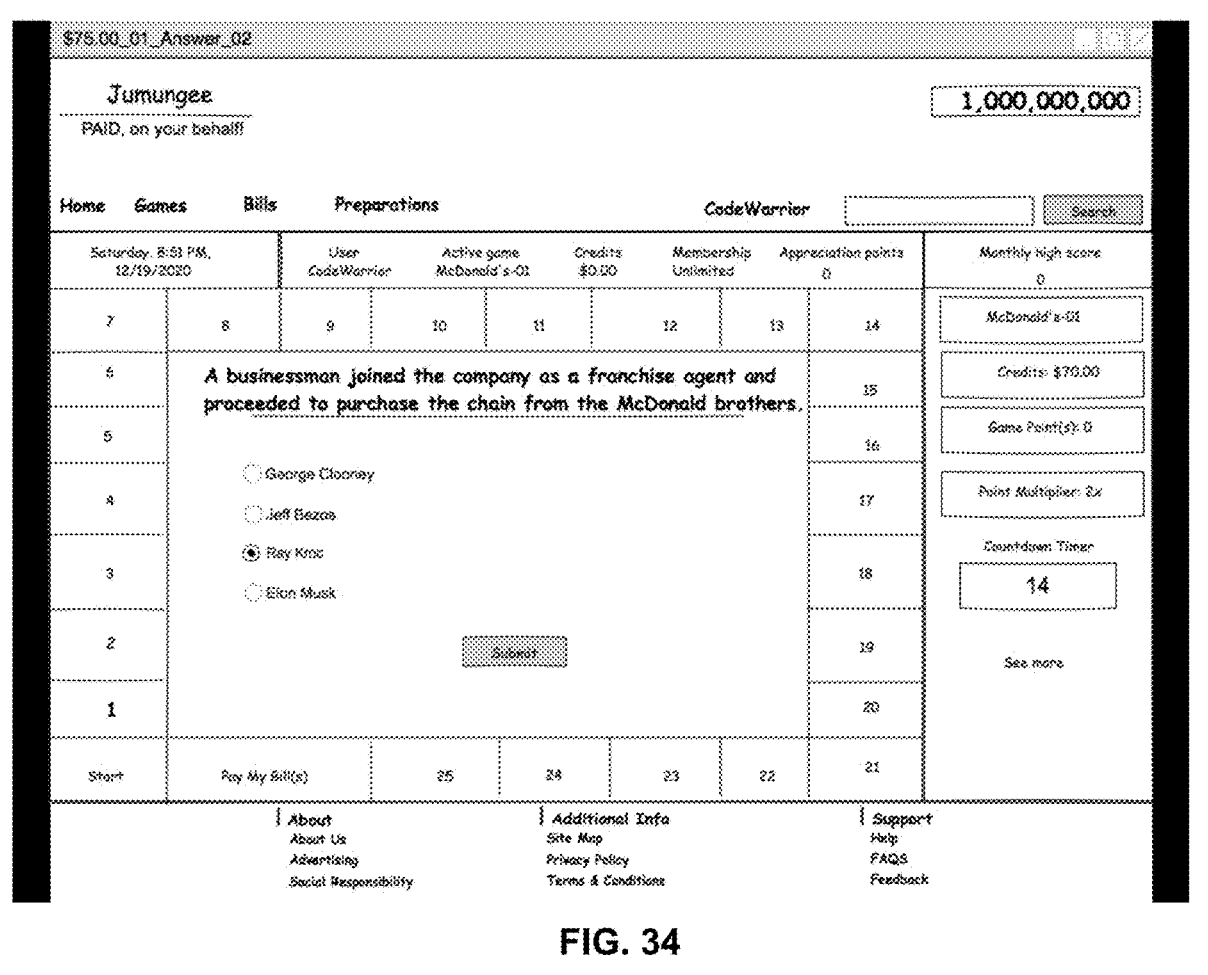

FIG. 34 shows a screen shot illustrating certain exemplary usability and functionality of the present disclosure;

FIG. 37 shows a screen shot illustrating certain exemplary usability and functionality of the present disclosure;

FIG. 38 shows a screen shot illustrating certain exemplary usability and functionality of the present disclosure;

Figure 39:
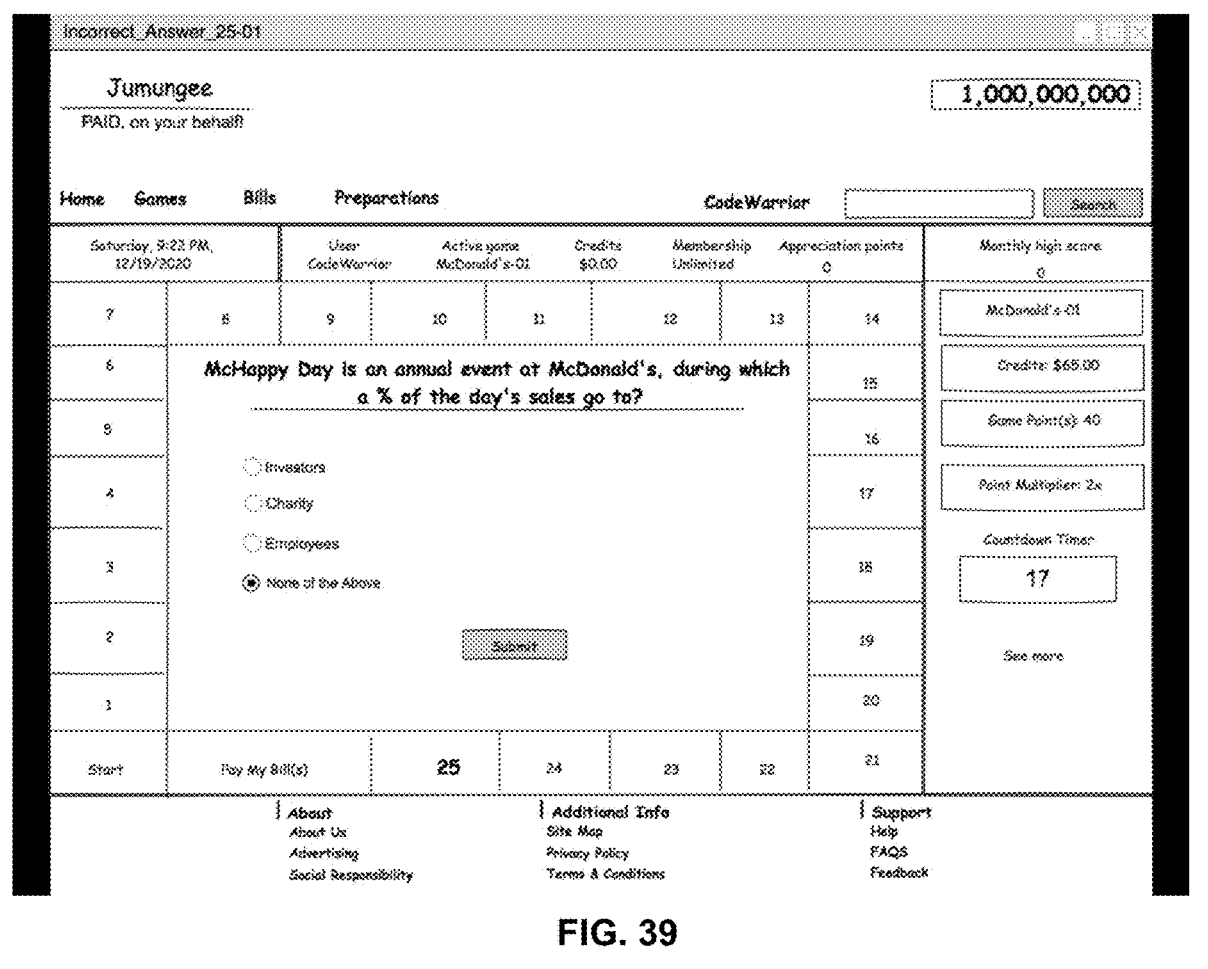

FIG. 39 shows a screen shot illustrating certain exemplary usability and functionality of the present disclosure;

FIG. 40 shows a screen shot illustrating certain exemplary usability and functionality of the present disclosure;

FIG. 43 shows a screen shot illustrating certain exemplary usability and functionality of the present disclosure;

FIG. 47 shows a screen shot illustrating certain exemplary usability and functionality of the present disclosure;

FIG. 48 shows a screen shot illustrating certain exemplary usability and functionality of the present disclosure;

FIG. 49 shows a screen shot illustrating certain exemplary usability and functionality of the present disclosure;

FIG. 50 shows a screen shot illustrating certain exemplary usability and functionality of the present disclosure;

FIG. 51 shows a screen shot illustrating certain exemplary usability and functionality of the present disclosure;

FIG. 52 shows a screen shot illustrating certain exemplary usability and functionality of the present disclosure;

FIG. 53 shows a screen shot illustrating certain exemplary usability and functionality of the present disclosure;

FIG. 55 shows a screen shot illustrating certain exemplary usability and functionality of the present disclosure;

FIG. 58 shows a screen shot illustrating certain exemplary usability and functionality of the present disclosure;

FIG. 61 shows a screen shot illustrating certain exemplary usability and functionality of the present disclosure;

FIG. 63 shows a screen shot illustrating certain exemplary usability and functionality of the present disclosure;

FIG. 70 shows a screen shot illustrating certain exemplary usability and functionality of the present disclosure;

FIG. 71 shows a screen shot illustrating certain exemplary usability and functionality of the present disclosure;

FIG. 72 shows a screen shot illustrating certain exemplary usability and functionality of the present disclosure;

FIG. 73 shows a screen shot illustrating certain exemplary usability and functionality of the present disclosure;

DETAILED DESCRIPTION OF THE INVENTION

Figure 1:
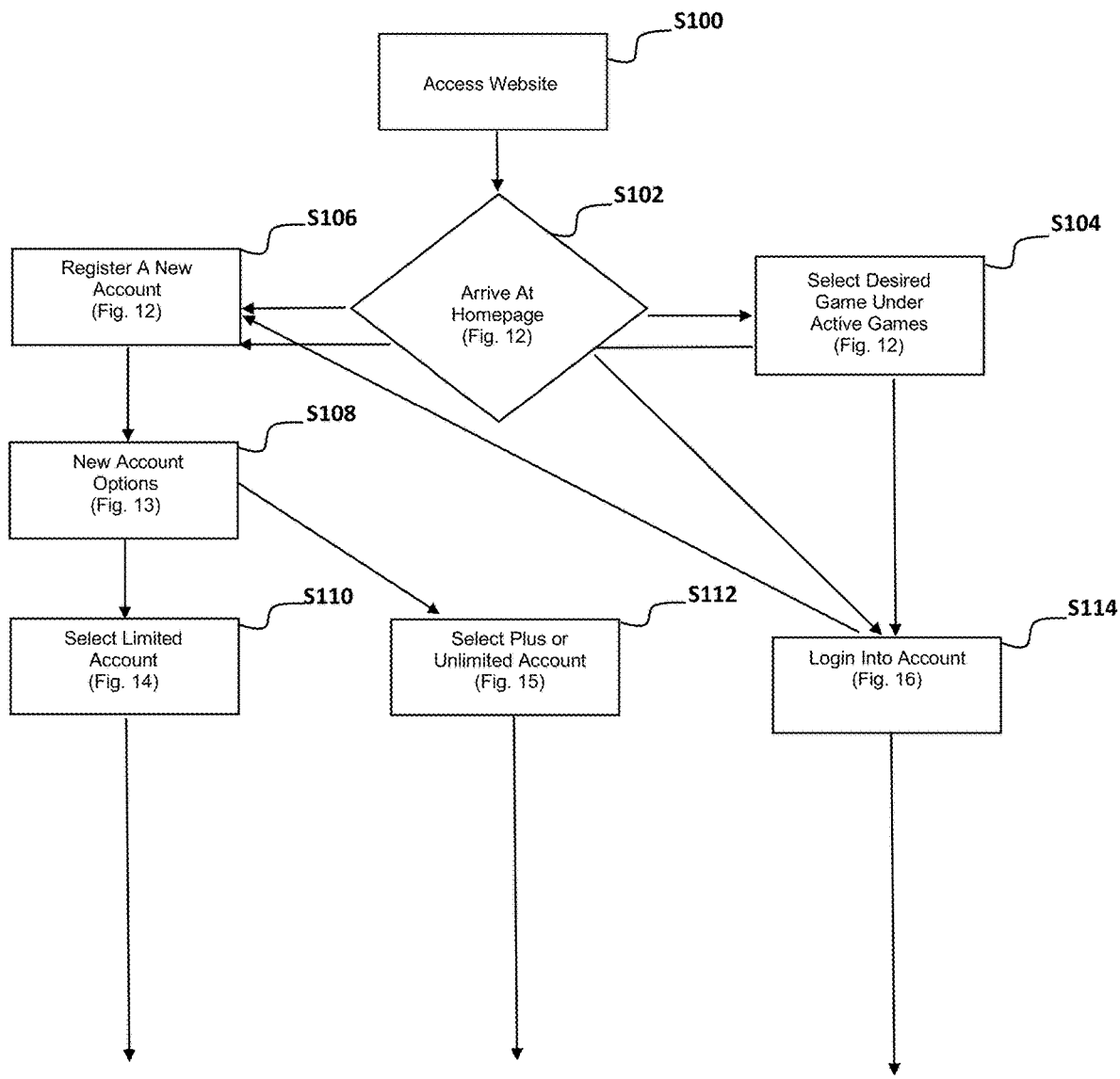
FIG. 1 shows a flowchart illustrating an exemplary embodiment of the system lifecycle functionality of the present disclosure.
Figure 2:
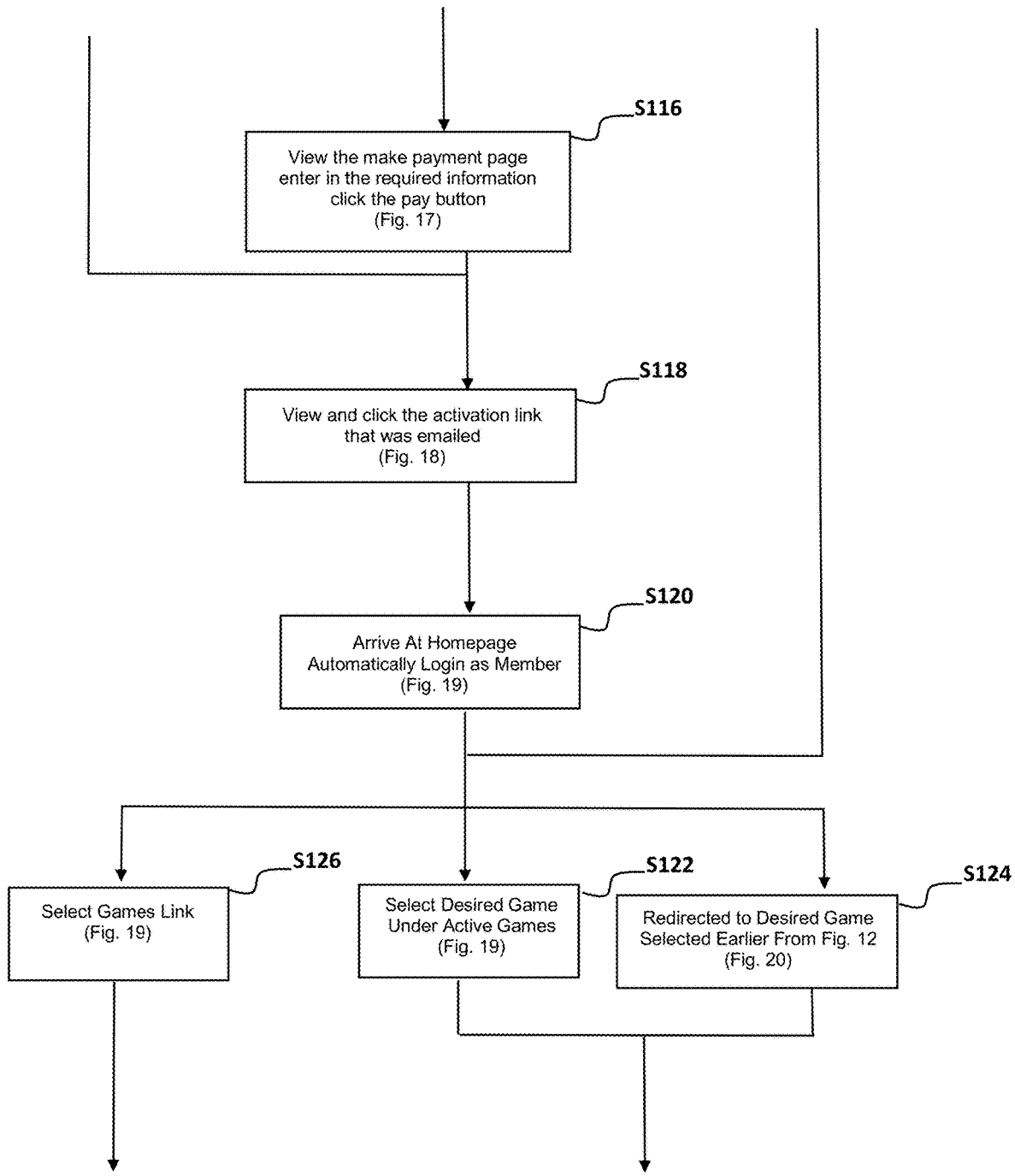
FIG. 2 shows a flowchart illustrating an exemplary embodiment of the system lifecycle functionality of the present disclosure.
Figure 3:
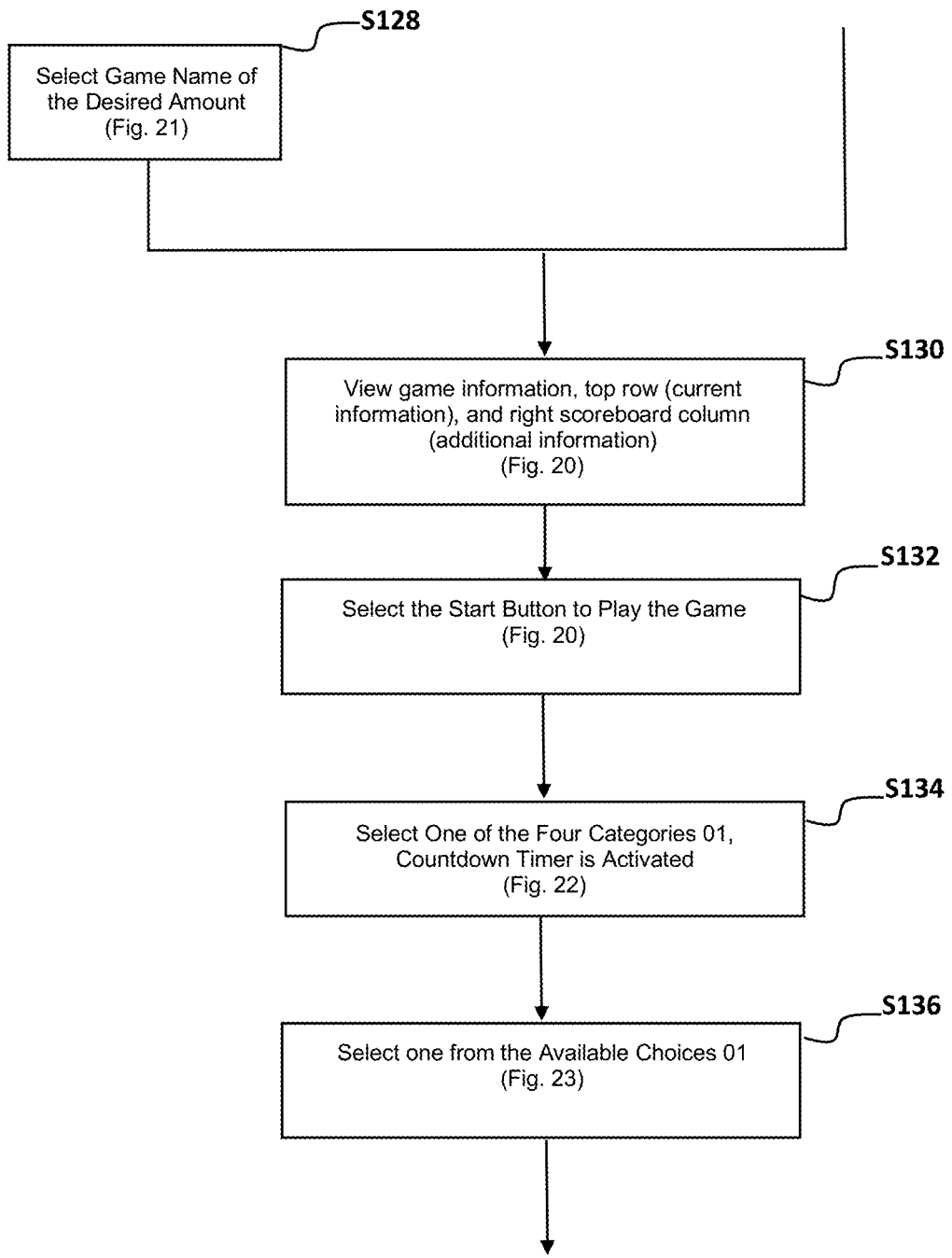
FIG. 3 shows a flowchart illustrating an exemplary embodiment of the system lifecycle functionality of the present disclosure.
Figure 4:
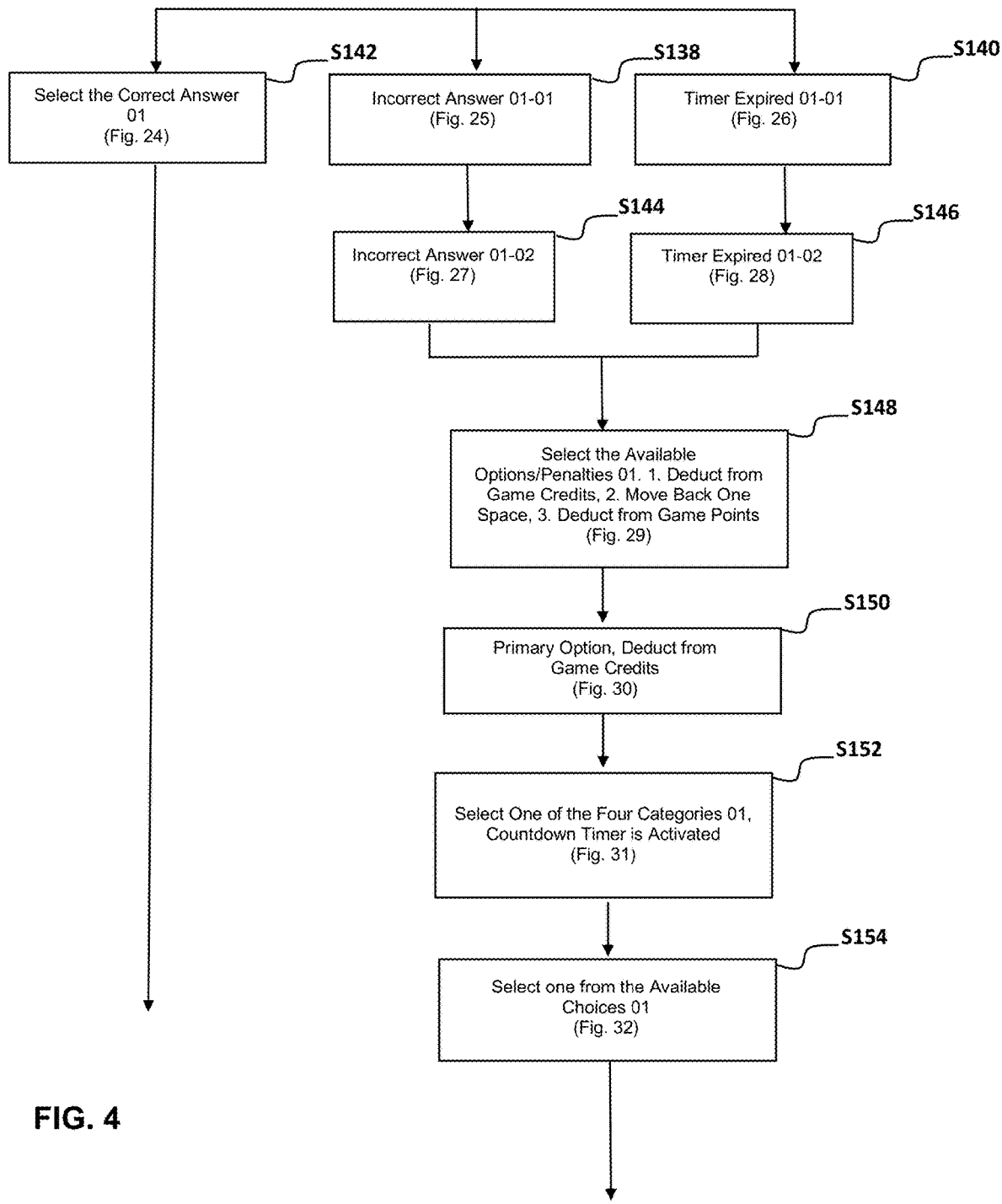
FIG. 4 shows a flowchart illustrating an exemplary embodiment of the system lifecycle functionality of the present disclosure.
Figure 5:
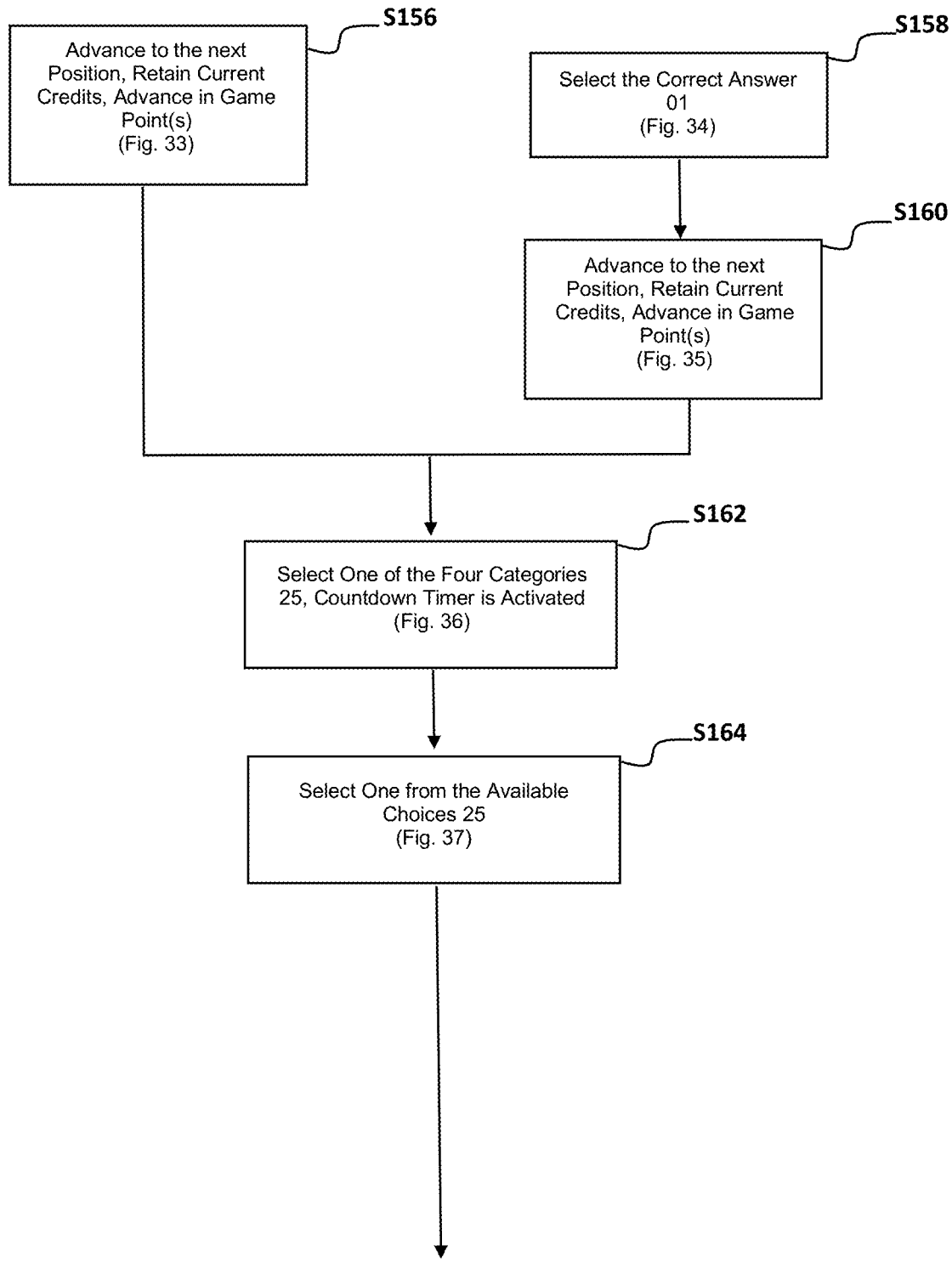
FIG. 5 shows a flowchart illustrating an exemplary embodiment of the system lifecycle functionality of the present disclosure.
Figure 6:
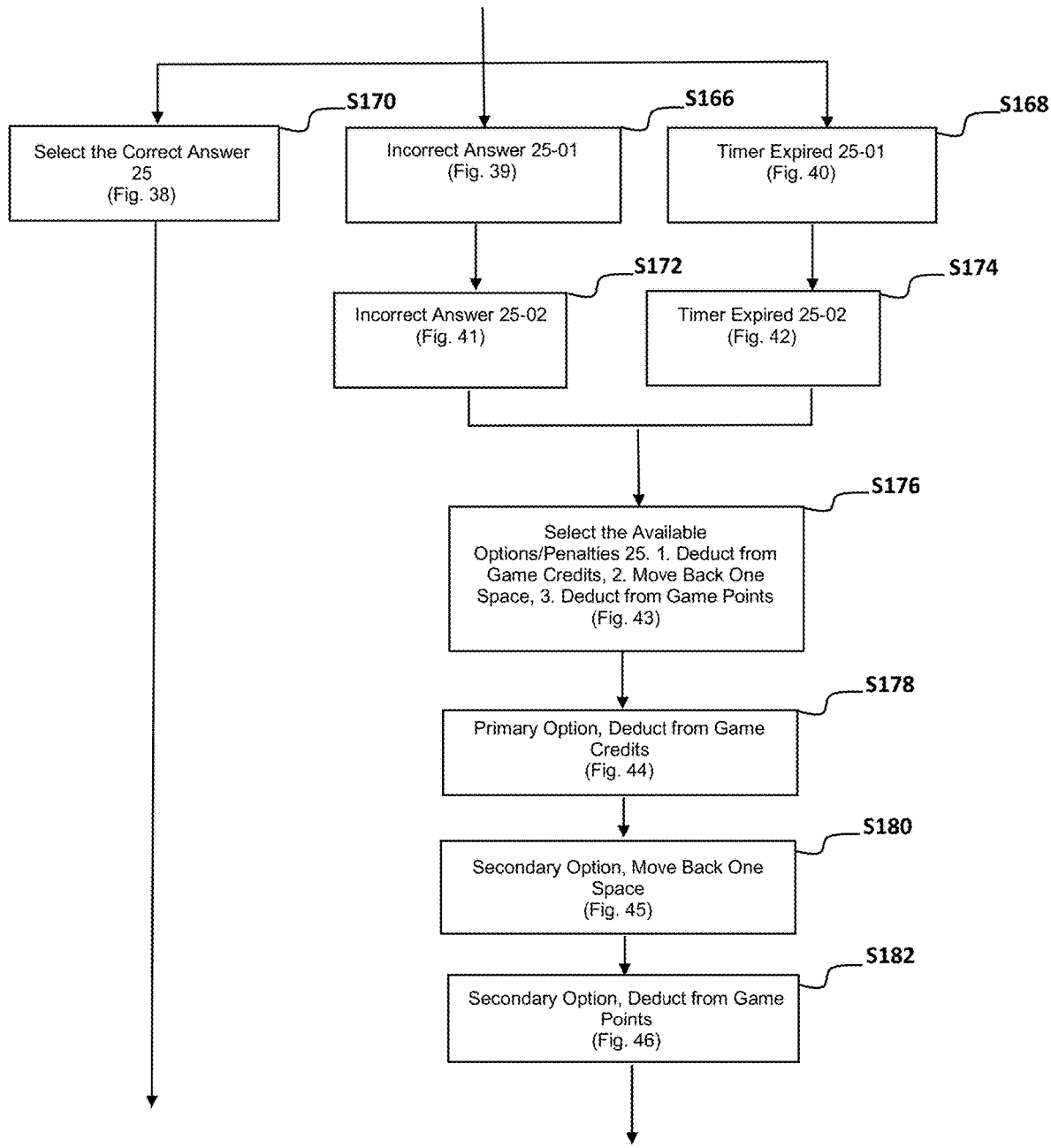
FIG. 6 shows a flowchart illustrating an exemplary embodiment of the system lifecycle functionality of the present disclosure.
Figure 7:
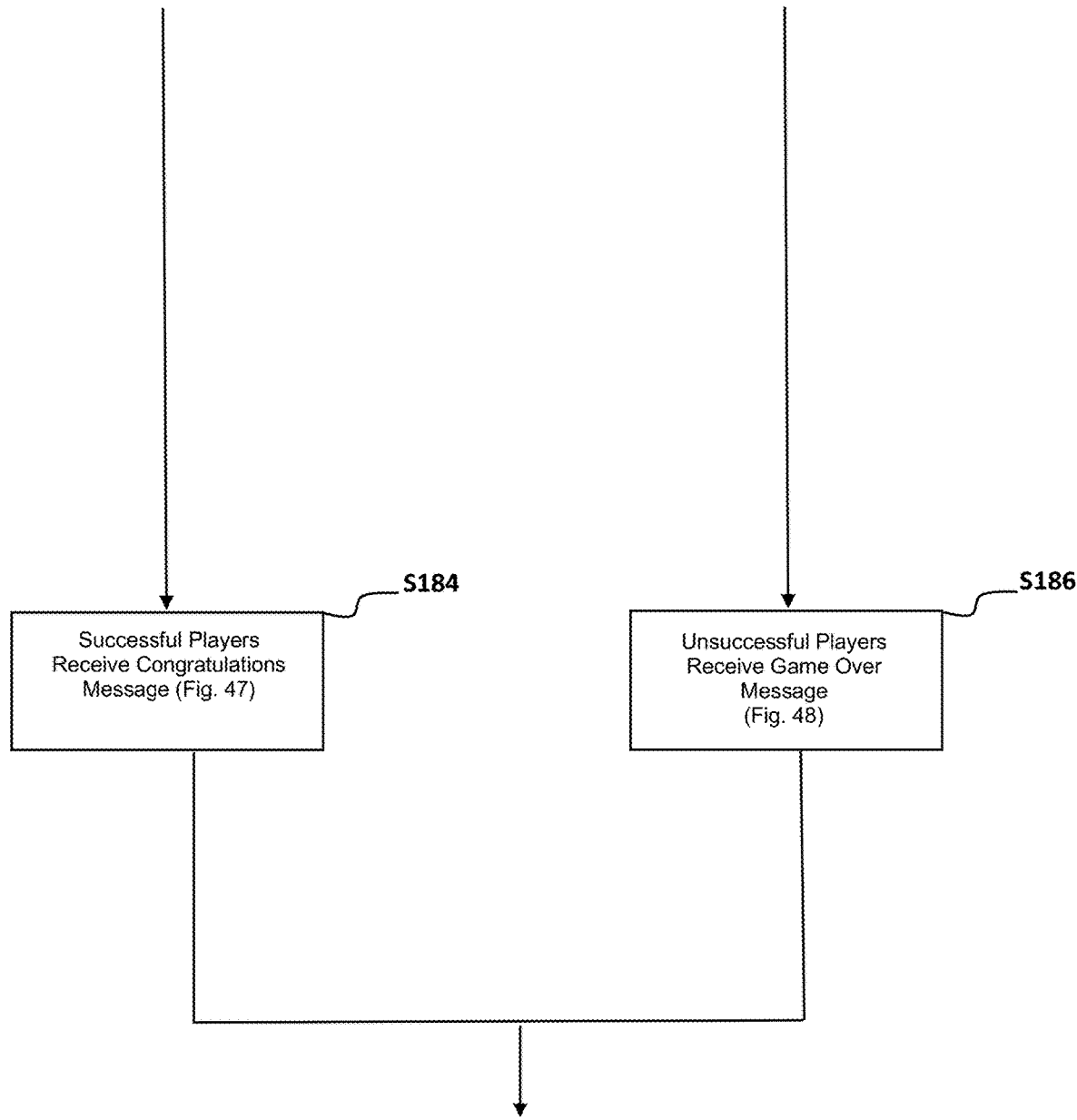
FIG. 7 shows a flowchart illustrating an exemplary embodiment of the system lifecycle functionality of the present disclosure.
Figure 8:
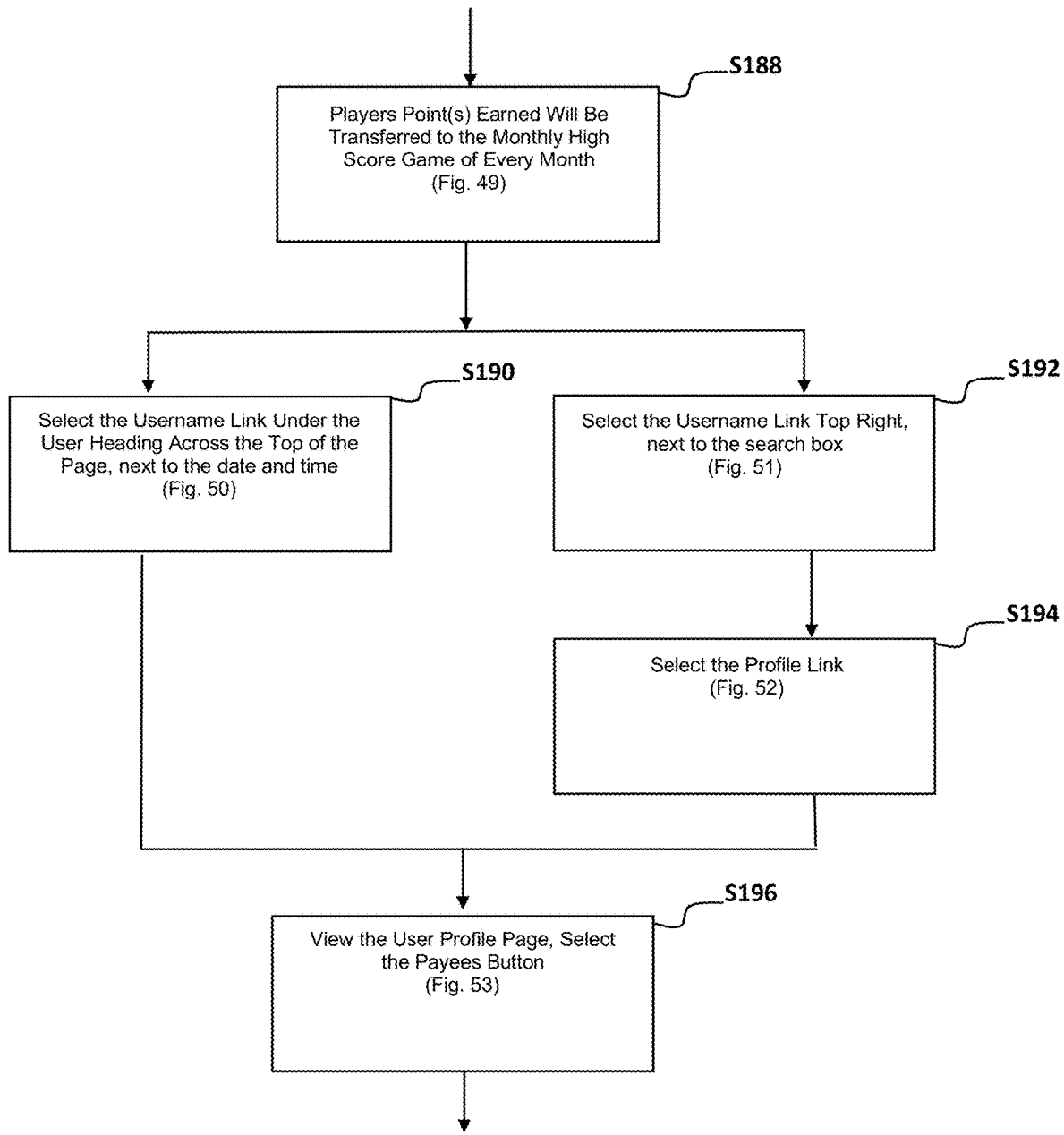
FIG. 8 shows a flowchart illustrating an exemplary embodiment of the system lifecycle functionality of the present disclosure.
Figure 9:
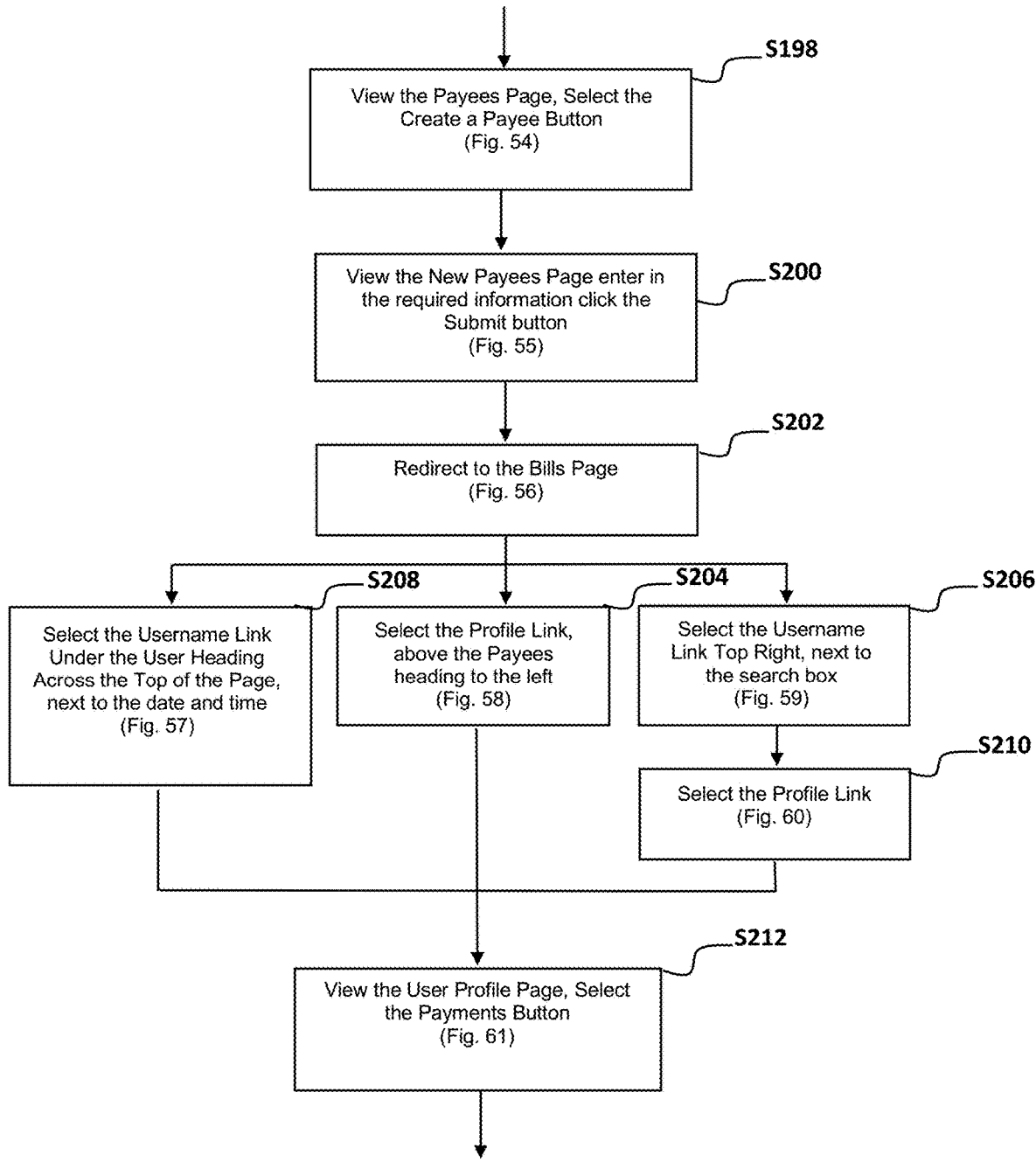
FIG. 9 shows a flowchart illustrating an exemplary embodiment of the system lifecycle functionality of the present disclosure.
Figure 10:
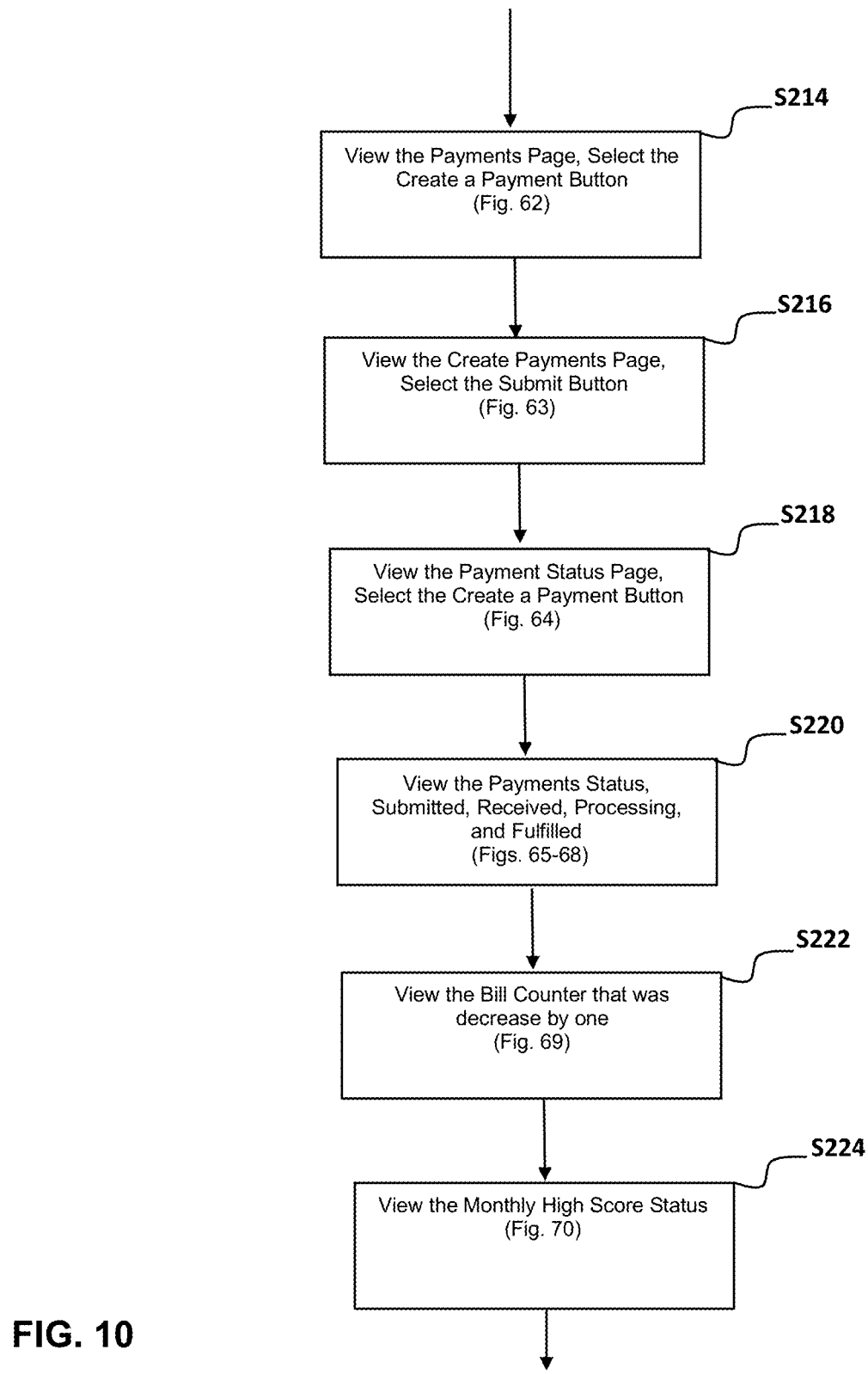
FIG. 10 shows a flowchart illustrating an exemplary embodiment of the system lifecycle functionality of the present disclosure.
Figure 11:
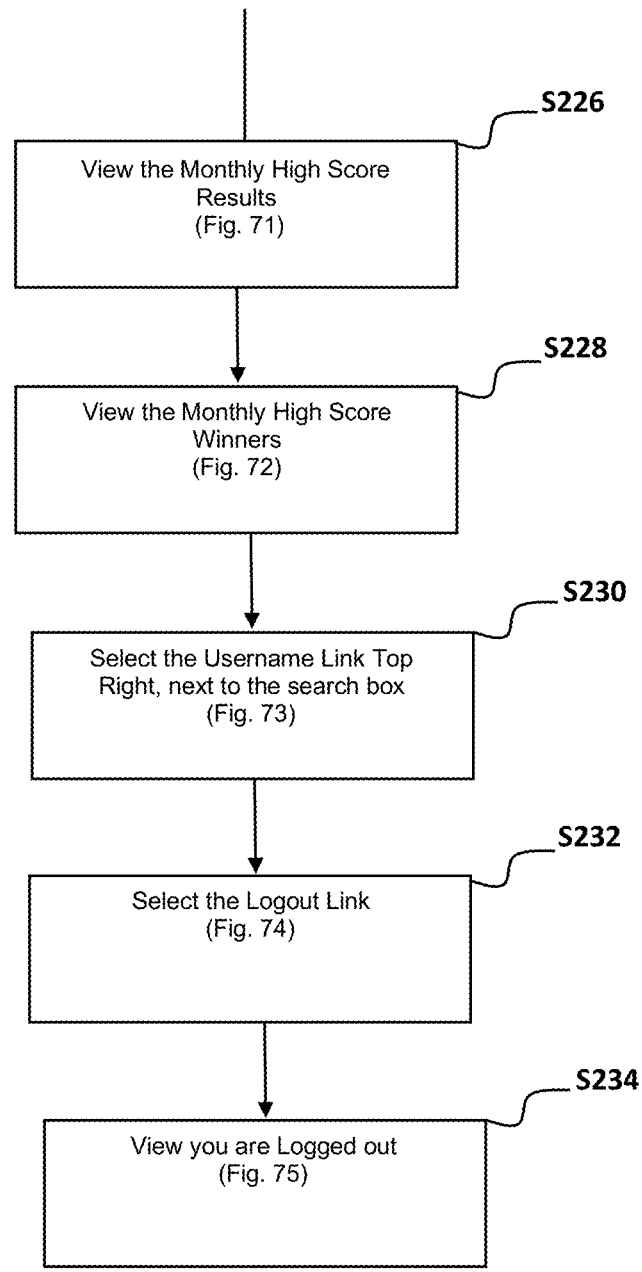
FIG. 11 shows a flowchart illustrating an exemplary embodiment of the system lifecycle functionality of the present disclosure.

For simplicity and clarification, the design factors and operating principles of the online bills payment games according to the presently disclosed systems and/or methods are explained with reference to various exemplary embodiments of an online bills payment games according to the presently disclosed systems and/or methods. The basic explanation of the design factors and operating principles of the online bills payment games is applicable for the understanding, design, and operation of the online bills payment games of the presently disclosed systems and/or methods. It should be appreciated that the online bills payment games can be adapted to many applications where an online bills payment games can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "online bills payment games", "bills", "games", and "payment" are used for basic explanation and understanding of the operation of the systems and/or methods of the presently disclosed systems and/or methods. Therefore, the terms "online bills payment games", "bills", "games", and "payment" are not to be construed as limiting the systems and/or methods of the presently disclosed systems and/or methods. Thus, for example, the term "bills" is to be understood to broadly include any current, reoccurring, or future payment, debit, or other financial obligation of a player.

For simplicity and clarification, the online bills payment games of the presently disclosed systems and/or methods will be described as being used in conjunction with games offered online, via the Internet. However, it should be appreciated that these are merely exemplary embodiments of the online bills payment games and are not to be construed as limiting the presently disclosed systems and/or methods. Thus, the online bills payment games of the presently disclosed systems and/or methods may optionally be utilized over the Internet or any other local or distributed network.

Figure 12:
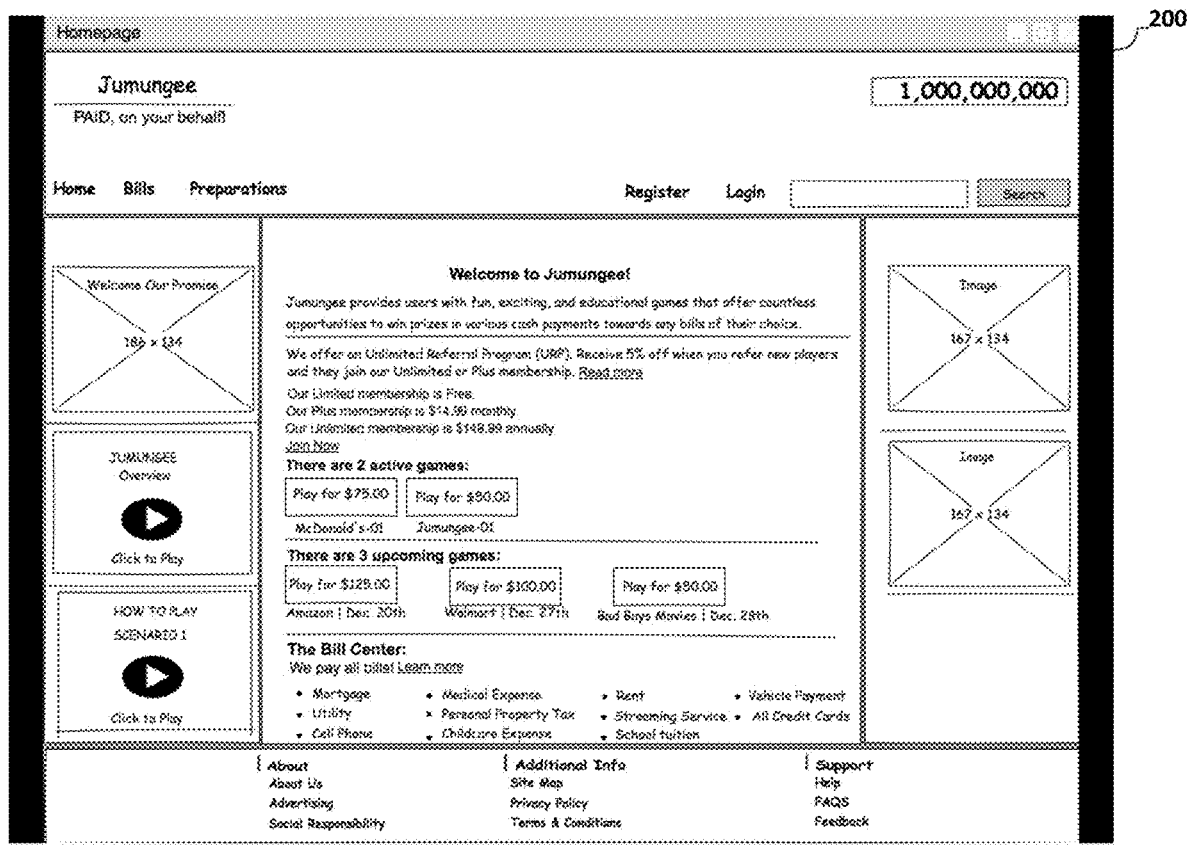
FIG. 12 shows a screen shot illustrating certain exemplary usability and functionality of the present disclosure.
Figure 75:
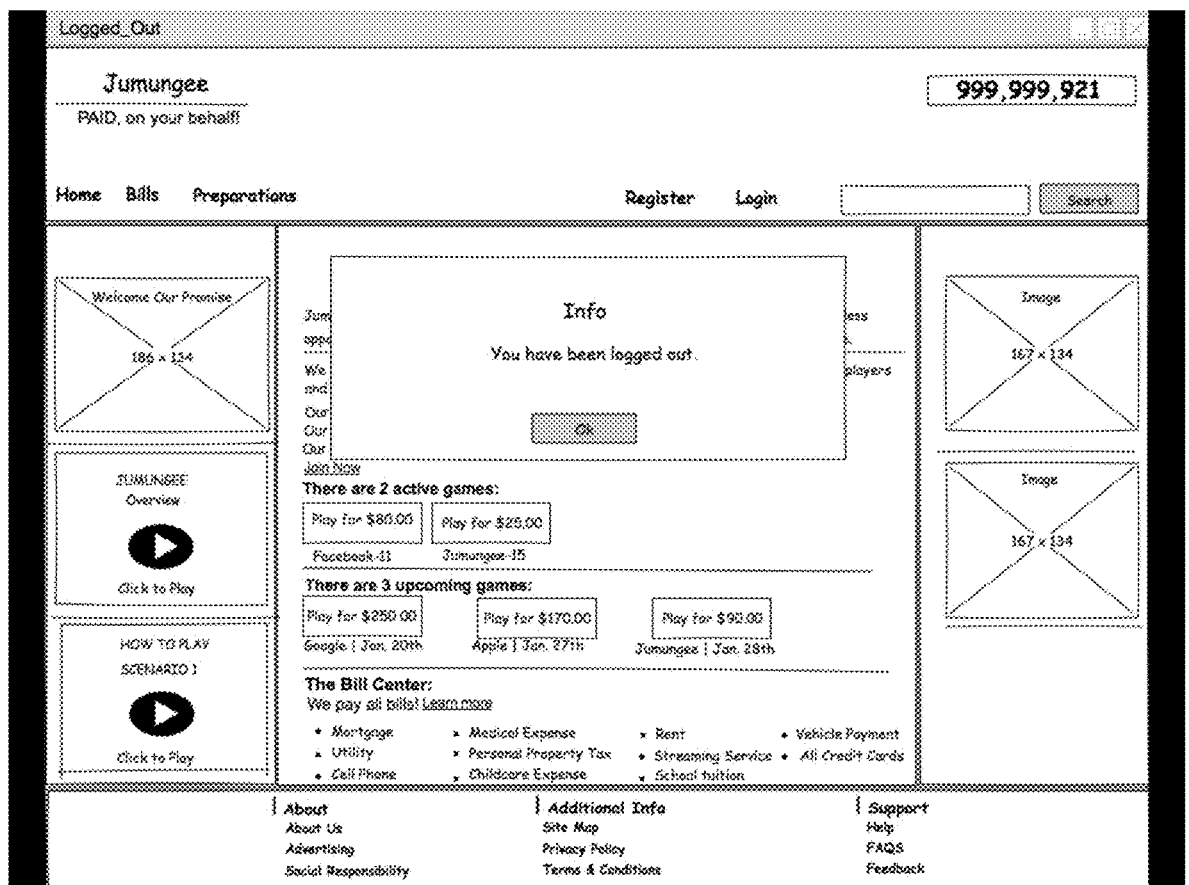
FIG. 75 shows a screen shot illustrating certain exemplary usability and functionality of the present disclosure.

Turning now to the drawing FIGS., FIGS. 1-11 illustrate principles associated with or utilized by certain exemplary embodiments associated with the system lifecycle functionality of the systems and methods of the present disclosure. FIGS. 12-75 display certain exemplary information, such as, for example, company name, tagline, register, login, a search feature, the number 1 billion represents, for example, a goal to pay one billion bills utilizing the systems and methods of the present disclosure. Once the systems and methods of the present disclosure accomplish this goal, the systems and methods of the present disclosure will continue with this purpose.

It should be appreciated that the amount and type of displayed information is optional and may vary based upon the desired usage of the systems and methods of the present disclosure. Likewise, the layout and actual display of any of such information is optional and can be displayed in various manners.

In various exemplary, nonlimiting embodiments, a navigation bar is located across or proximate the top of the pages; the systems and methods of the present disclosure may optionally present a variety of navigation options, such as, for example, home, bills, and preparation. However, the navigation bar may change such as, for example, home, games, bills and preparations when the player have logged into the site. The date and time may also optionally be presented to players based on their geographic location. In addition, the systems and methods of the present disclosure provide one or more videos. In certain exemplary embodiments, a first video may optionally be provided that explains the overview. An additional video may optionally be provided to explain how to play, using the systems and methods of the present disclosure.

In certain exemplary, nonlimiting embodiments, the systems and methods of the present disclosure offer different types of points that can be received by a player, such as, for example, appreciation and game points. The systems and methods of the present disclosure may optionally provide players with a positive outlook on paying bills.

In certain exemplary embodiments, proximate at the bottom of the pages, certain additional information may optionally be provided such as, for example, about us, advertising, social responsibility, sitemap, privacy policy, terms and conditions, help, FAQs, and feedback information.

As shown in FIGS. 1-11, beginning in step S100, the method begins and a player accesses a specific portion of a distributed network, such as, for example, a specific Internet website (such as Jumungee.com). It should be appreciated that the specific portion of the distributed network may be accessed via, for example, an intranet, an extranet, the Internet and, more particularly, the World Wide Web portion of the Internet, a Local Area Network (LAN), a Wide Area Network (WAN), or any other presently known or later developed distributed network. It should be appreciated that, in various exemplary embodiments, the distributed network may be, for example, a particular node, such as, for example, a specific web page, of a larger distributed network.

If the webpage has been accessed, control continues to step S102 and the player is directed to a discrete homepage, such as, for example, homepage 200, as illustrated in FIG. 12. In various exemplary, nonlimiting embodiments, all players are initially directed to homepage 200, upon arriving at the website. Typically, the homepage 200 represents an exemplary main page of the website. The homepage 200 typically provides information regarding a player's account, options for subscriptions or memberships. In the illustrated, nonlimiting embodiment, subscriptions or memberships that are offered are "Limited" free, play 2 games per week and win up to $50.00 in prize credits to pay bills. "Plus" $14.99 monthly, unlimited games per day, and win more than $50.00 in prize credits to pay bills. "Unlimited" $149.99 annually, unlimited games per day, win more than $50.00 in prize credits to pay bills, and access the Unlimited Referral Program (URP).

The homepage 200 optionally outlines games that are currently available to play, and games that are coming soon.

An optional bill center may be included on the homepage 200 that provides a list of potential bills that can be paid or participating bill pay partners that can be utilized through the game. It should be appreciated that the systems and methods of the present disclosure can be utilized to pay any bill, so long as a valid payee is able to receive a payment primarily online and secondarily in no particular order through mail or phone.

Figure 16:
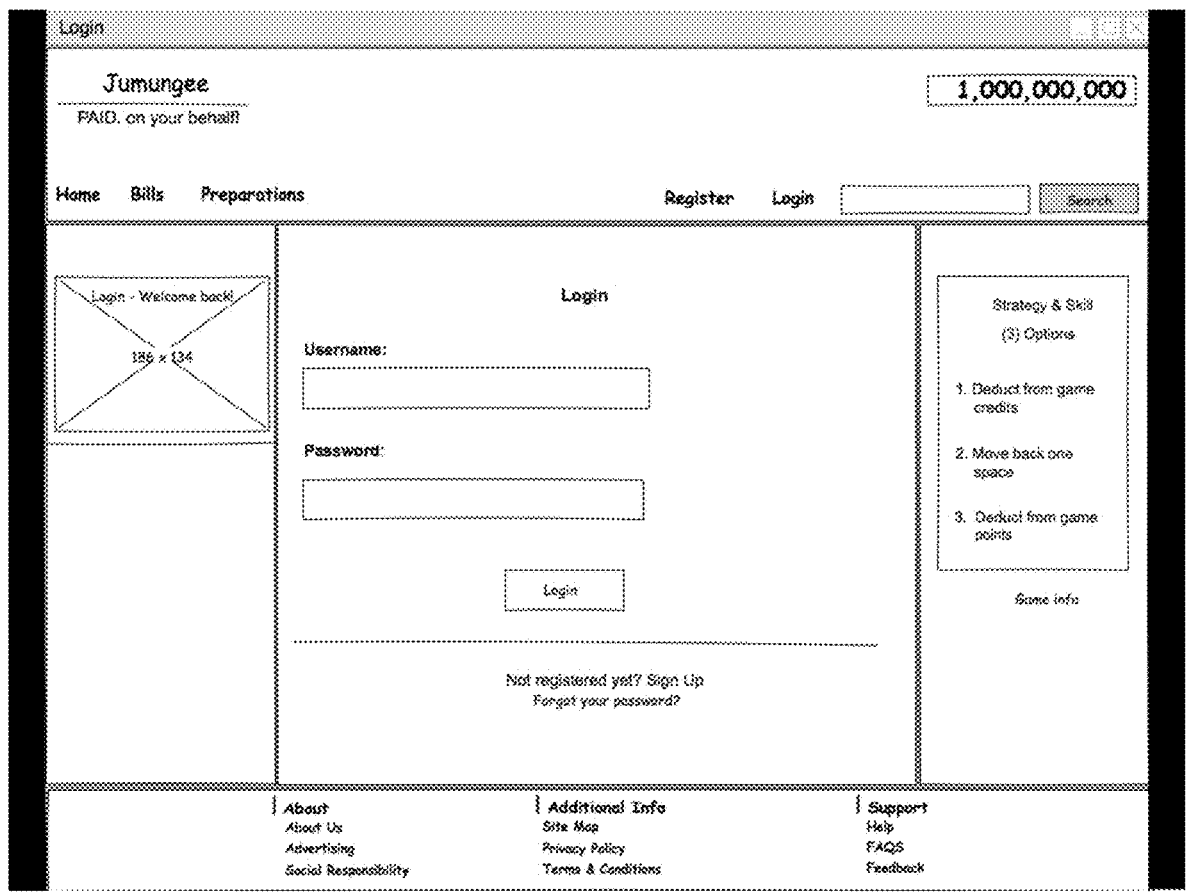
FIG. 16 shows a screen shot illustrating certain exemplary usability and functionality of the present disclosure.

While on the homepage 200, a player may optionally select a desired game in step S104. If, in step S104 the player selects a desired game, the method advances to step S114 and the player is directed to log into his or her account, as illustrated in FIG. 16. If the player has not yet established an account, control continues to step S106 and the player is allowed to register a new account, as further illustrated in FIG. 12.

Figure 13:
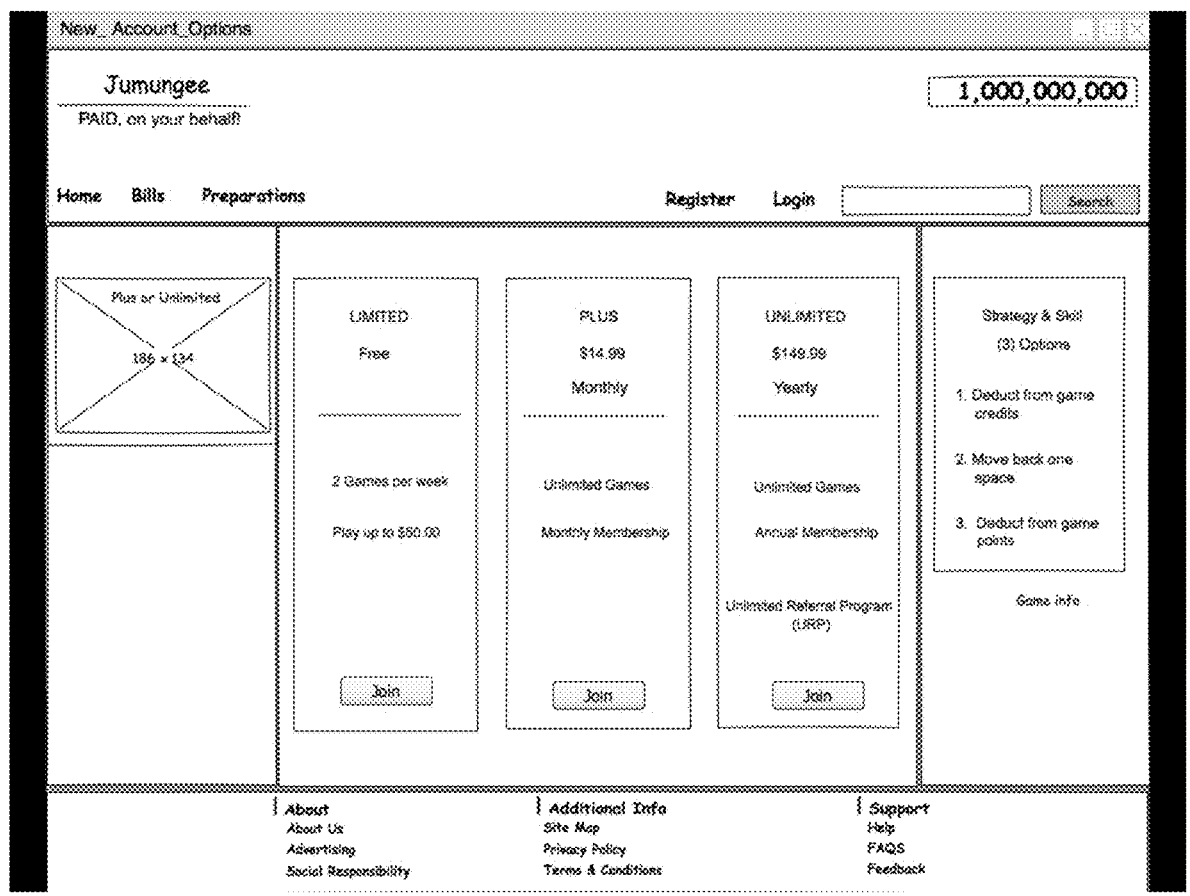
FIG. 13 shows a screen shot illustrating certain exemplary usability and functionality of the present disclosure.

FIG. 13 represents an exemplary new account options page, on this page new players may select an account. All new players will be required to register for the first time to create a new account. The player is then able to select the join button to advance the method.

Figure 14:
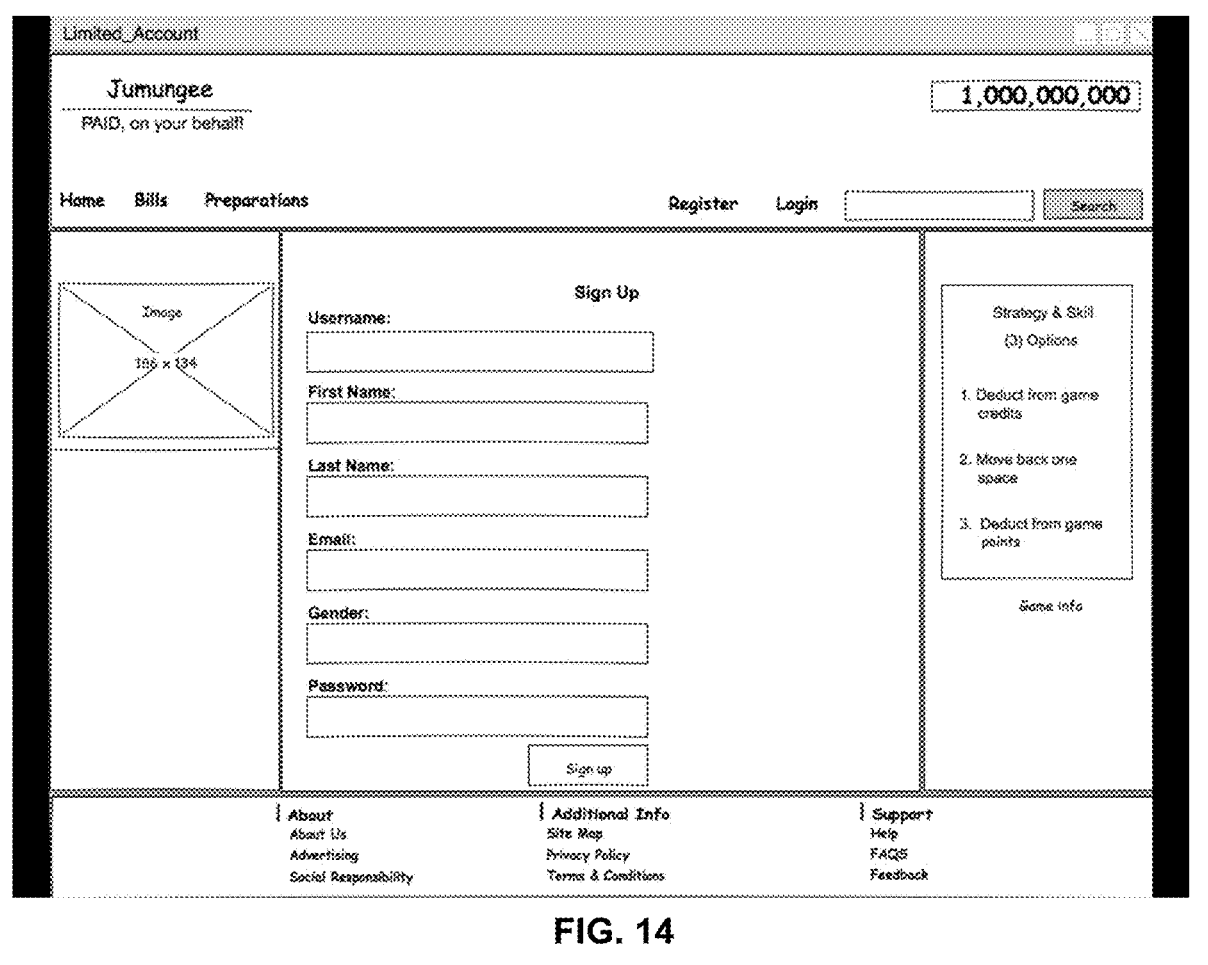
Figure 15:
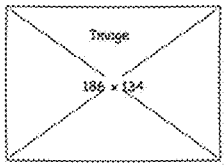
FIG. 15 shows a screen shot illustrating certain exemplary usability and functionality of the present disclosure.
Figure 17:
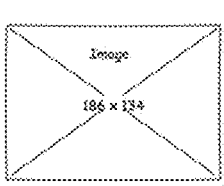
FIG. 17 shows a screen shot illustrating certain exemplary usability and functionality of the present disclosure.

Selection of one of the join buttons in step S108 advances the player to step S110, as illustrated in FIG. 14, or step S112, as illustrated in FIG. 15. FIGS. 14 and 15 represents an exemplary create my account page, on these pages new players must enter in all required information, and agree to terms, respectfully. Player in step S112, as illustrated in FIG. 15, advances to step S116, as illustrated in FIG. 17. FIG. 17 represents an exemplary unlimited account payment page, on this page new players must enter in all required information, and select the pay button.

Figure 18:
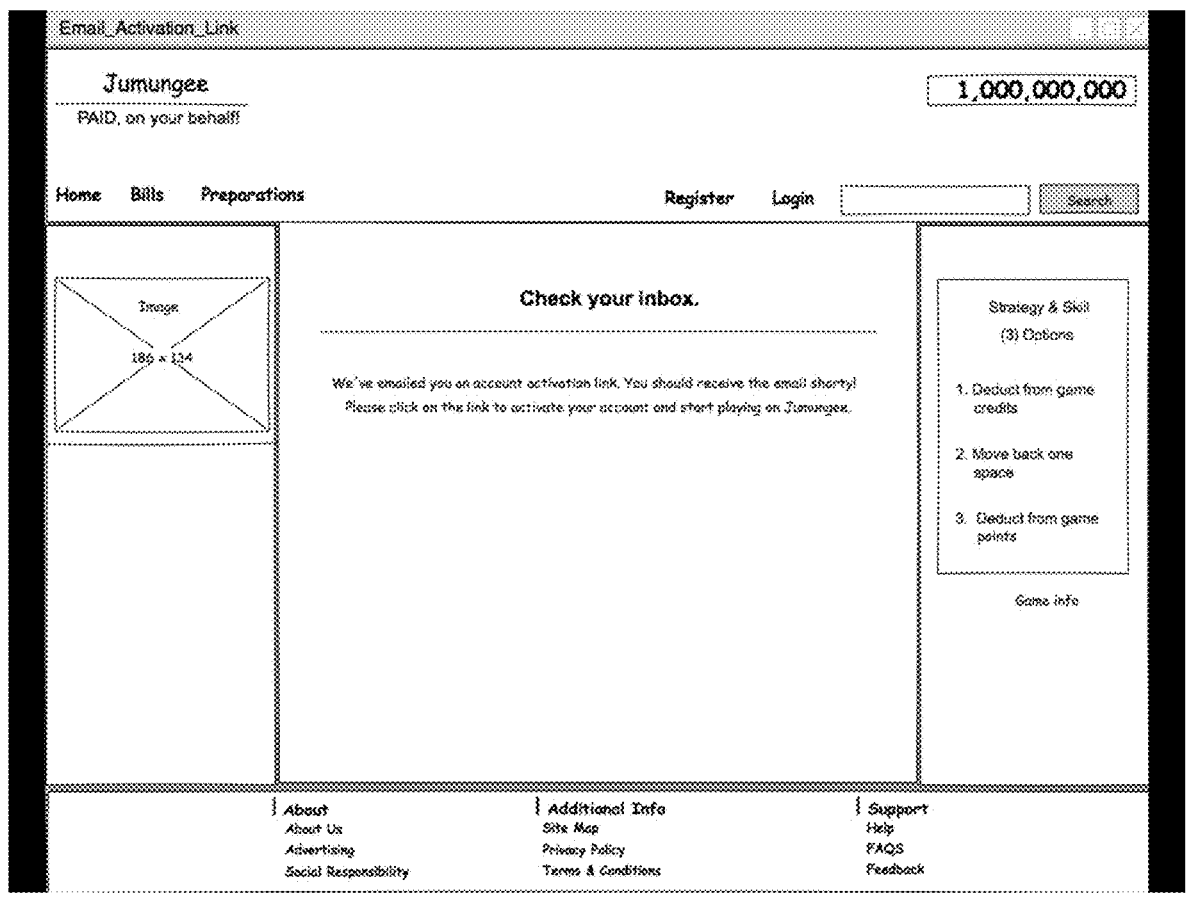
FIG. 18 shows a screen shot illustrating certain exemplary usability and functionality of the present disclosure.

Steps S110 and S116 advances to step S118, the player is able to activate the new account by clicking on the activation link that was emailed to them, as illustrated in FIG. 18. In various exemplary, nonlimiting embodiments, as illustrated in FIG. 18, the systems and methods may provide an email link to be selected by the player to activate the new account.

Figure 19:
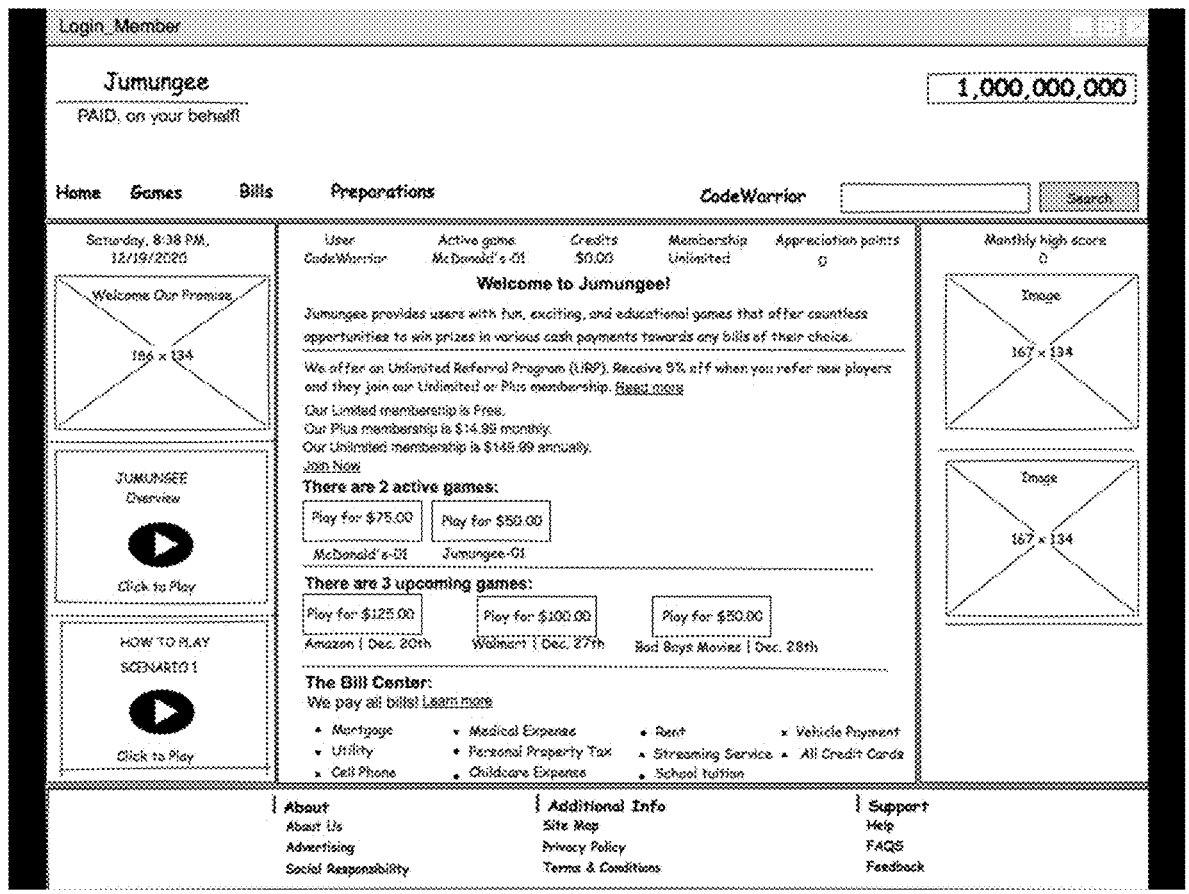
FIG. 19 shows a screen shot illustrating certain exemplary usability and functionality of the present disclosure.

In step S120, the player is logged into an account, as illustrated in FIG. 19. The player have three options to start a game as illustrated in FIG. 19, steps S126, S122, and S124. In step S126 the player may select the games link in the navigation bar, as illustrated in FIG. 19. The method advances to step S128, as illustrated in FIG. 21, game list page 300. The method advances to step S130, as illustrated in FIG. 20.

Figure 20:
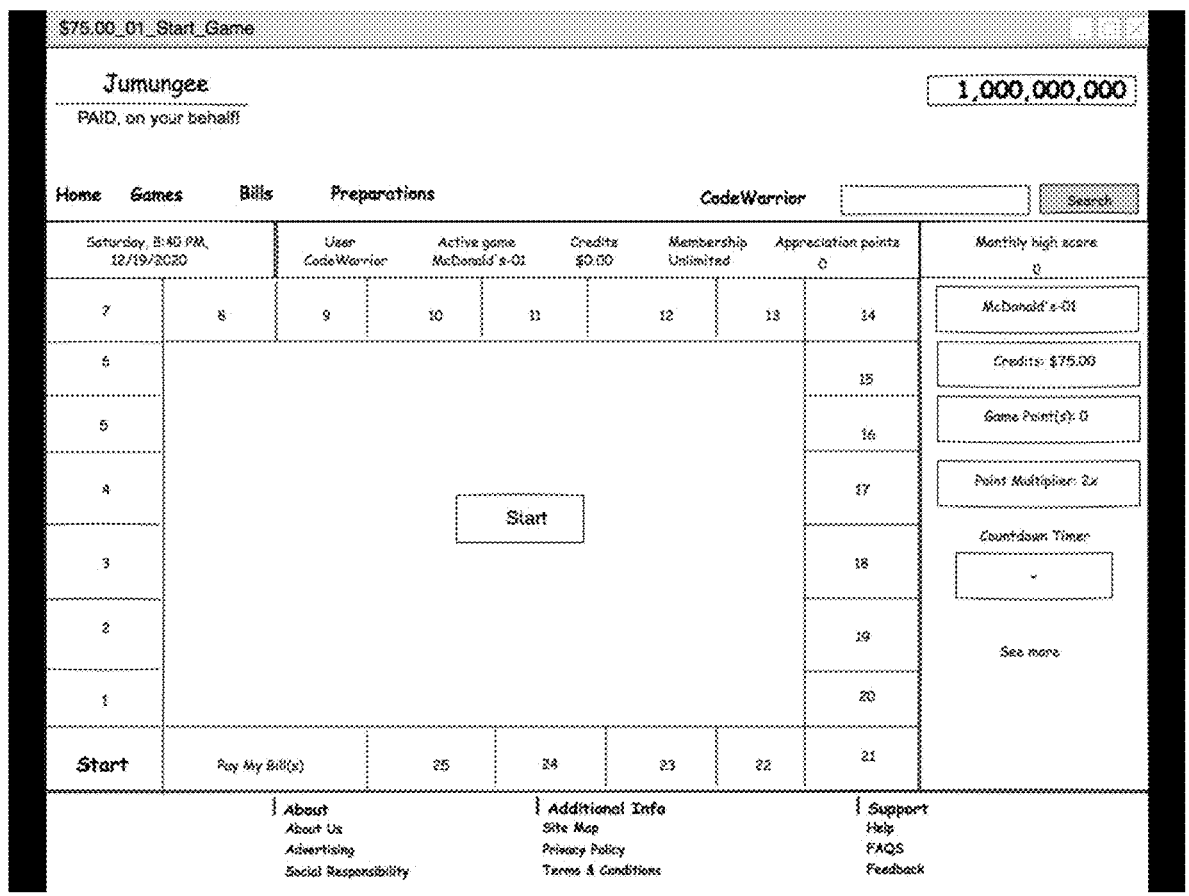
FIG. 20 shows a screen shot illustrating certain exemplary usability and functionality of the present disclosure.
Figure 21:
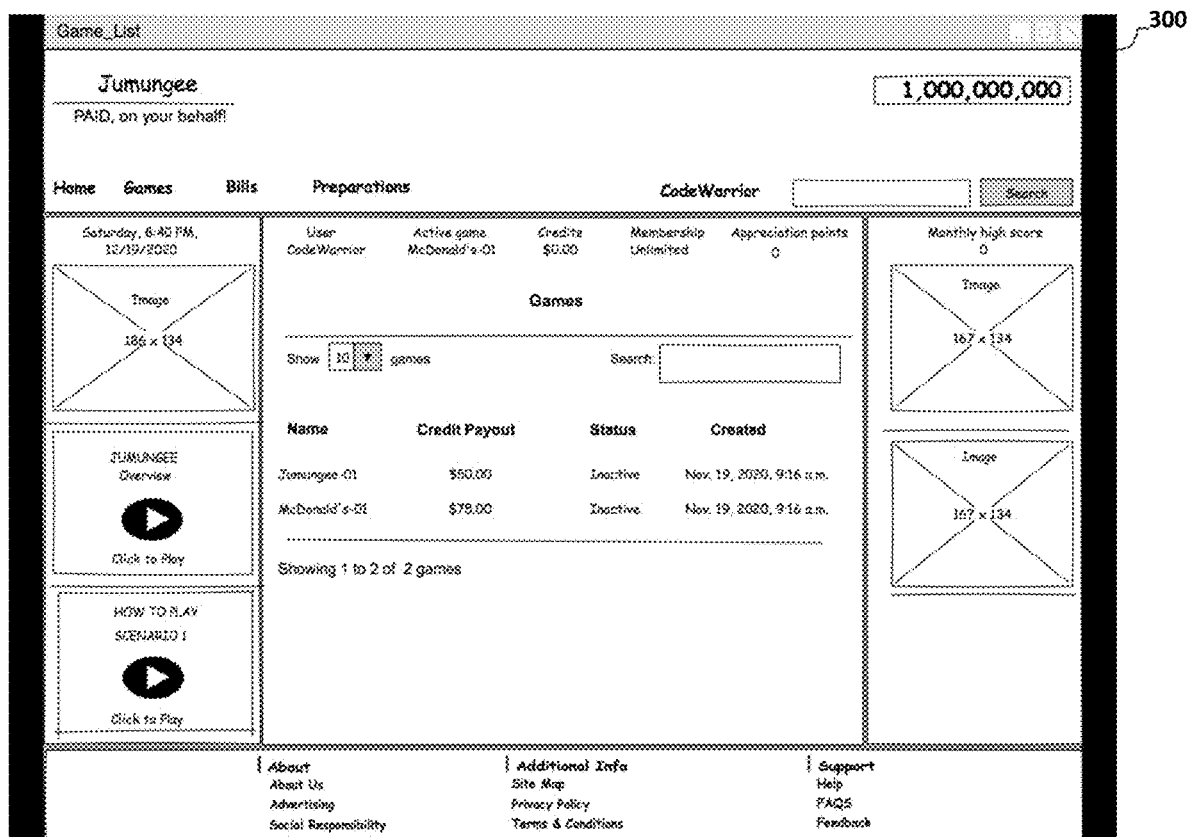
FIG. 21 shows a screen shot illustrating certain exemplary usability and functionality of the present disclosure.

In step S122, FIG. 19, the player select the desire game and advances to step S130, as illustrated in FIG. 20.

In step S124, as illustrated in FIG. 20, the method advances to step S130, as illustrated in FIG. 20. This is a continuation from steps S104 and S114, as illustrated in FIGS. 12 and 16, before the player created an account.

Figure 22:
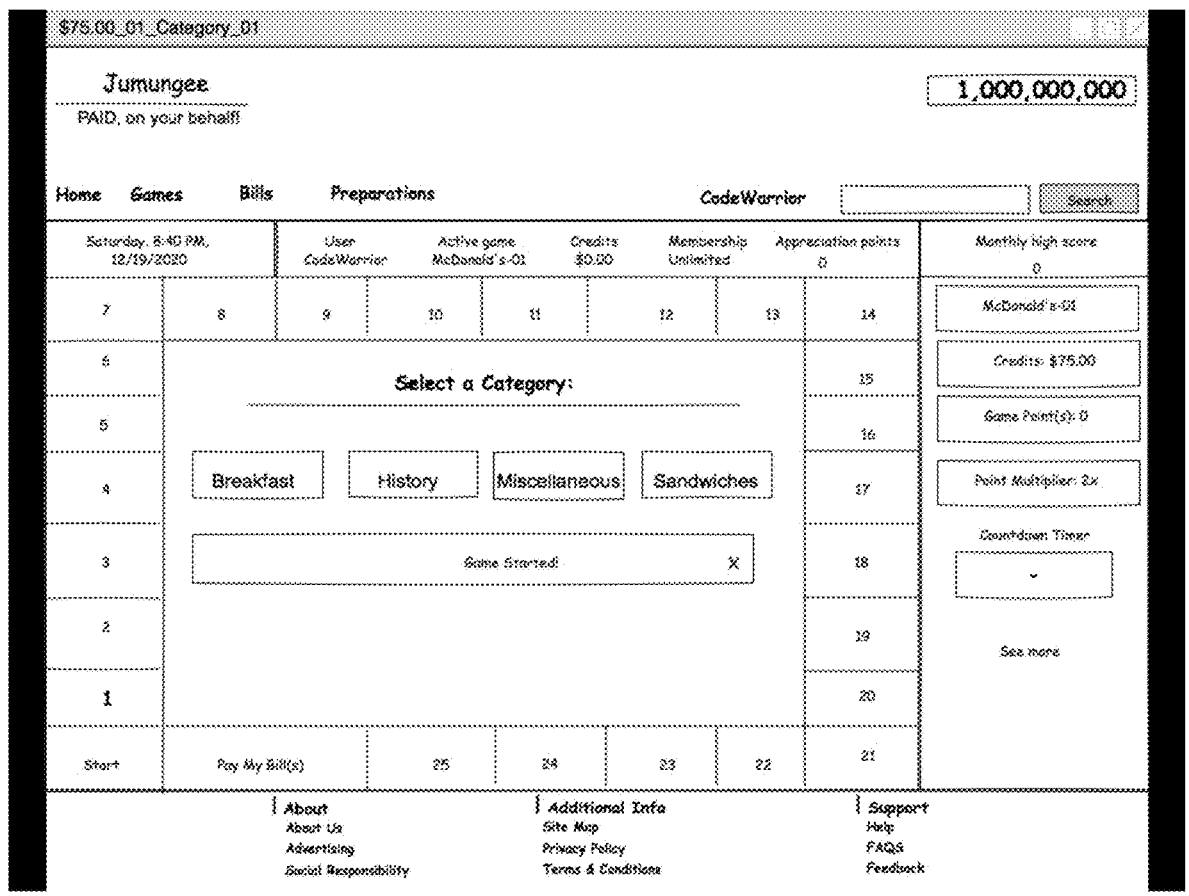
FIG. 22 shows a screen shot illustrating certain exemplary usability and functionality of the present disclosure.
Figure 23:
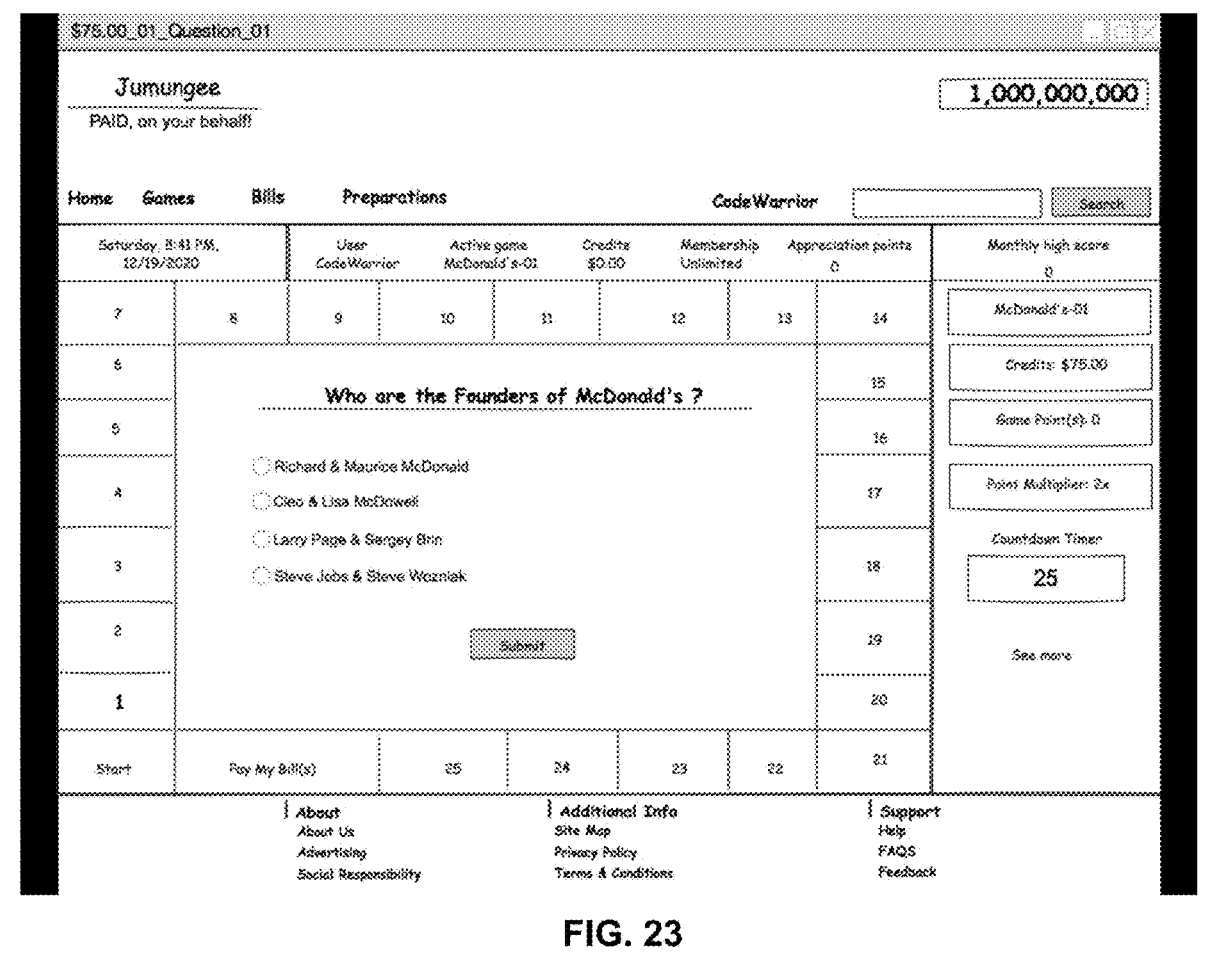
Figure 24:
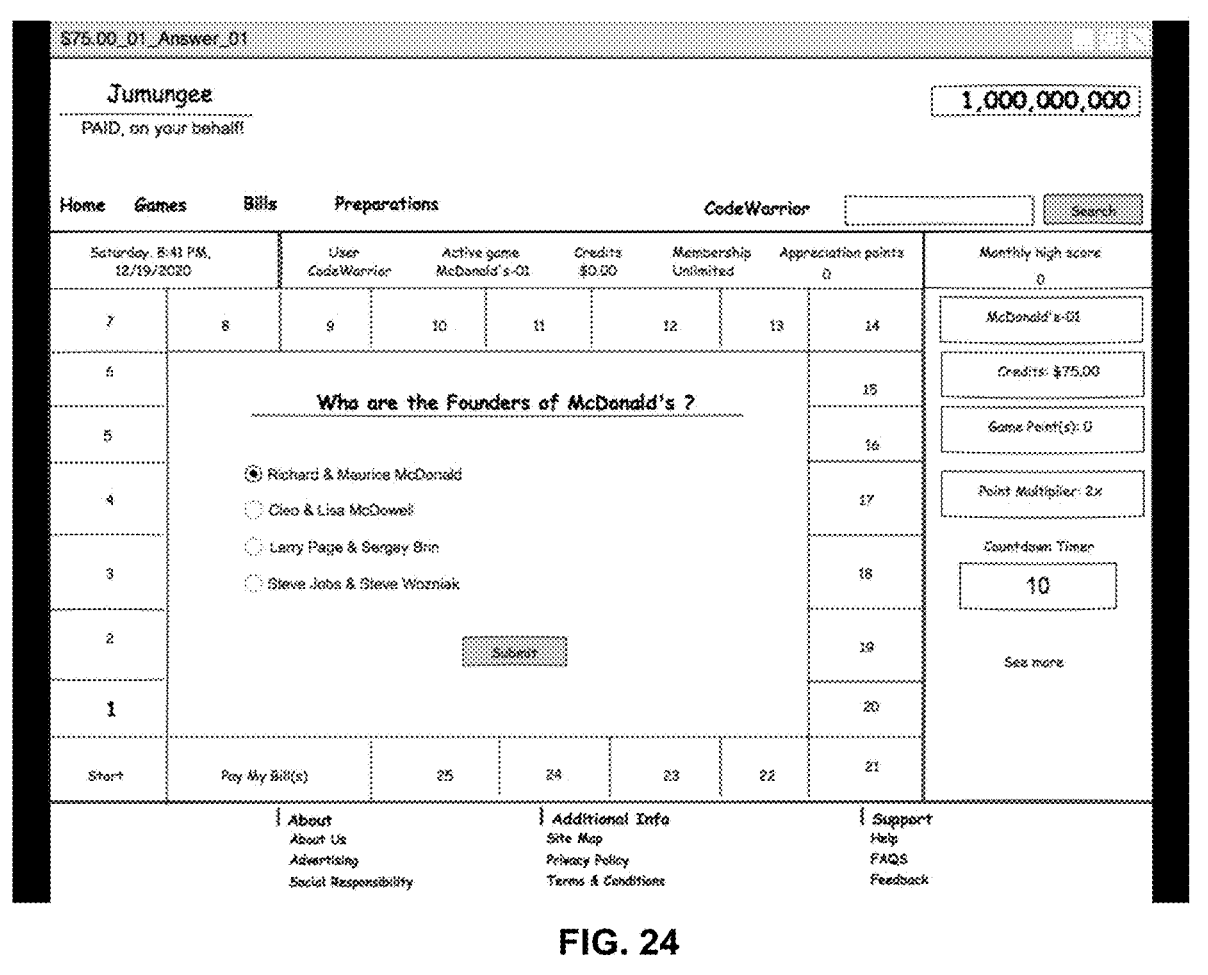
Figure 33:
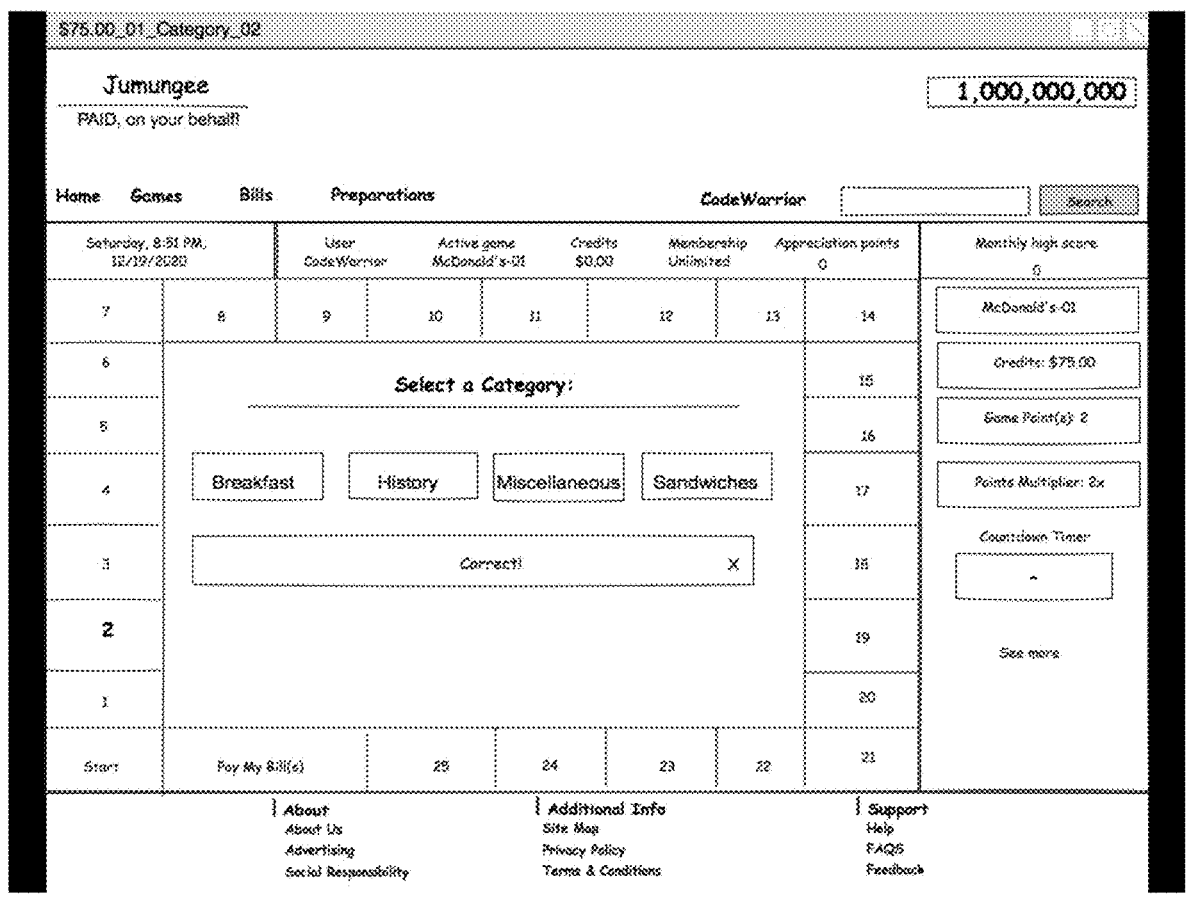
FIG. 33 shows a screen shot illustrating certain exemplary usability and functionality of the present disclosure.

In step S130, the player will be provided with an overview of the game information, top row displays, date and time, username, game status, credits, membership, appreciation points, and the right scoreboard column displays monthly high score, game name, total game credits to pay bills, game points, point multiplier and the countdown timer. The method advances to step S132, to start the game select the start button, as illustrated in FIG. 20. The method advances to step S134, select one of the four categories, as illustrated in FIG. 22. The method advances to step S136, as illustrated in FIG. 23. select one of the four options to answer the question. However, there are three available options that will determine the progress of the player. The first option will produce a positive outcome. The systems and methods advances to step S142, select one of the four options, the question has been answered correctly, as illustrated in FIG. 24. The method advances to step S156, as illustrated in FIG. 33. The player will advance to the next position, for example position 2, retain current credits, for example, credits $75.00 and advance in game points, for example 2 game points. This is also illustrated in FIG. 33.

Figure 36:
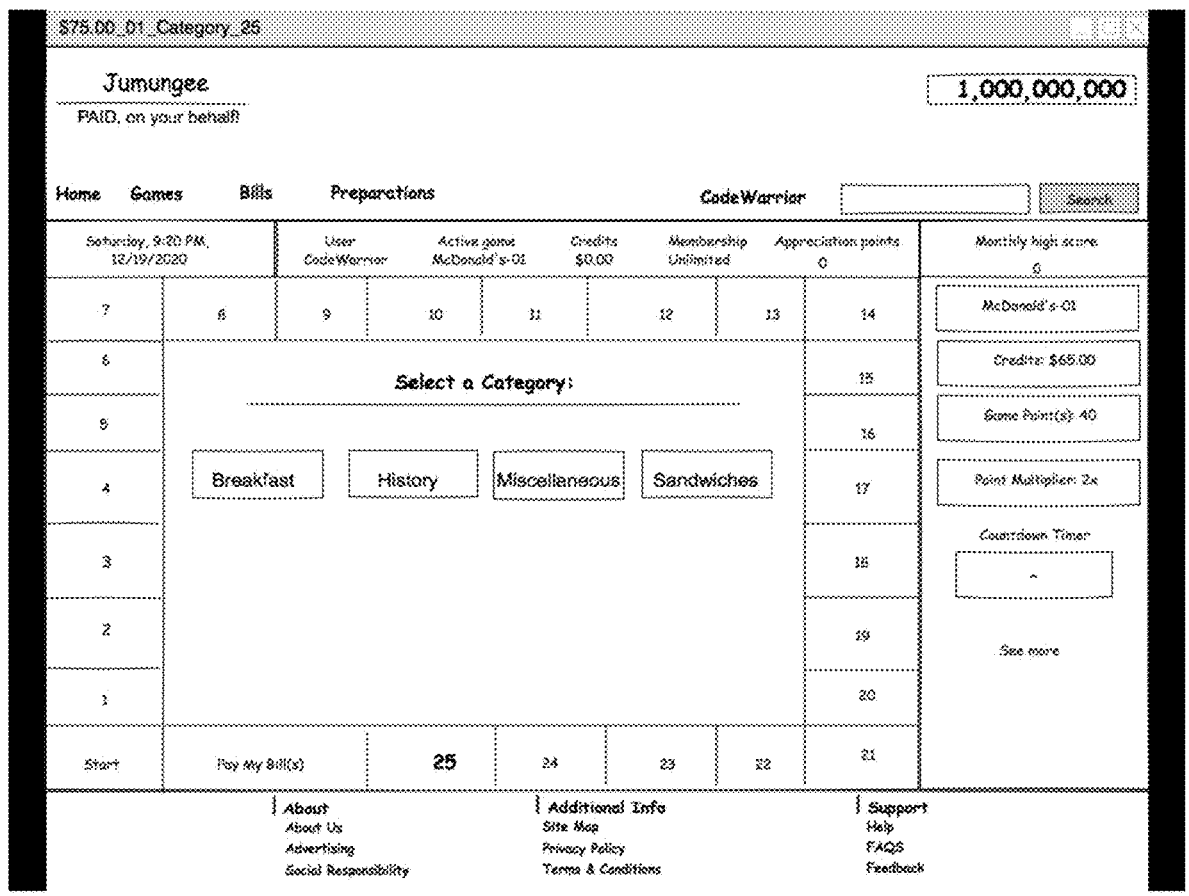
FIG. 36 shows a screen shot illustrating certain exemplary usability and functionality of the present disclosure.
Figure 37:
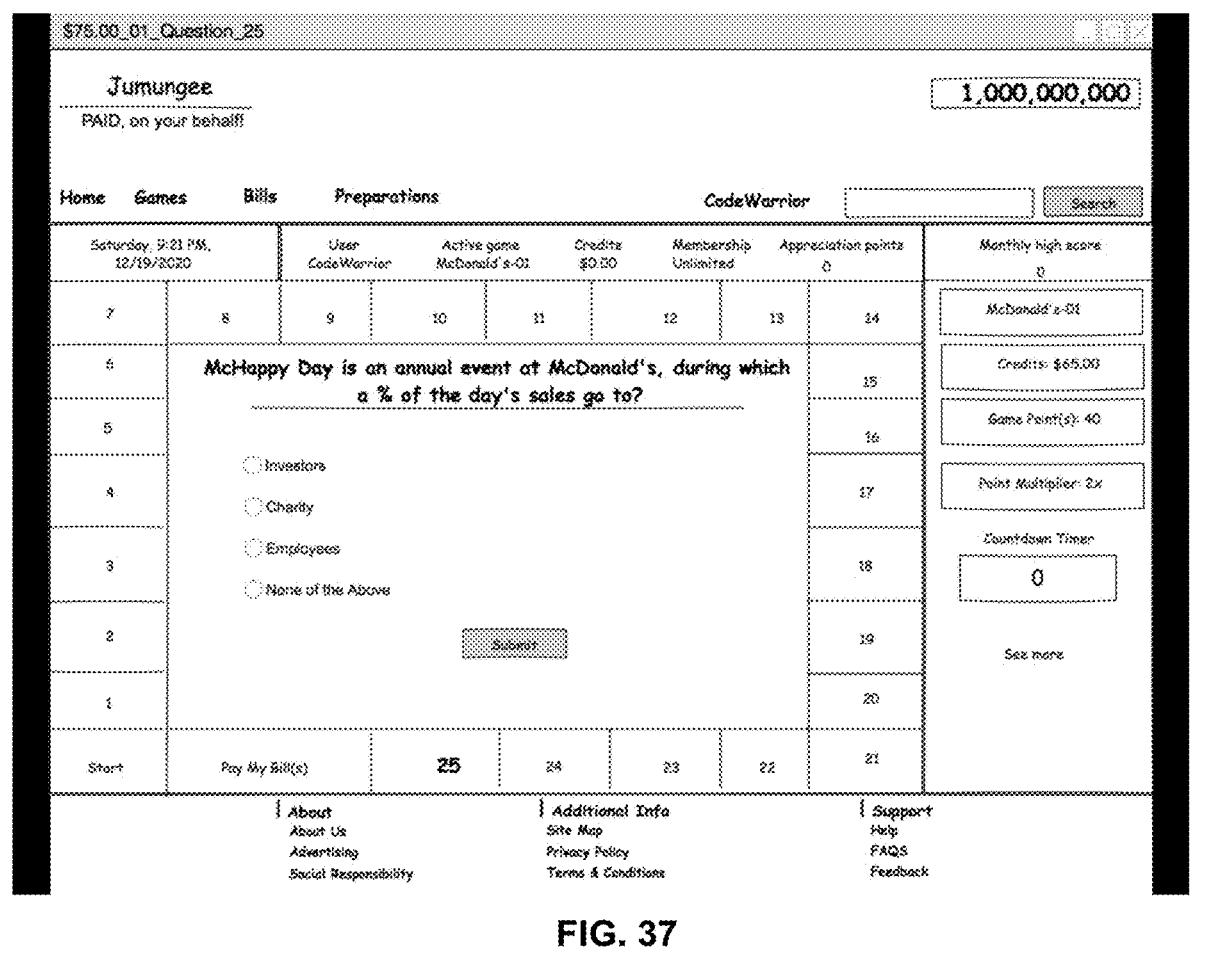
Figure 38:
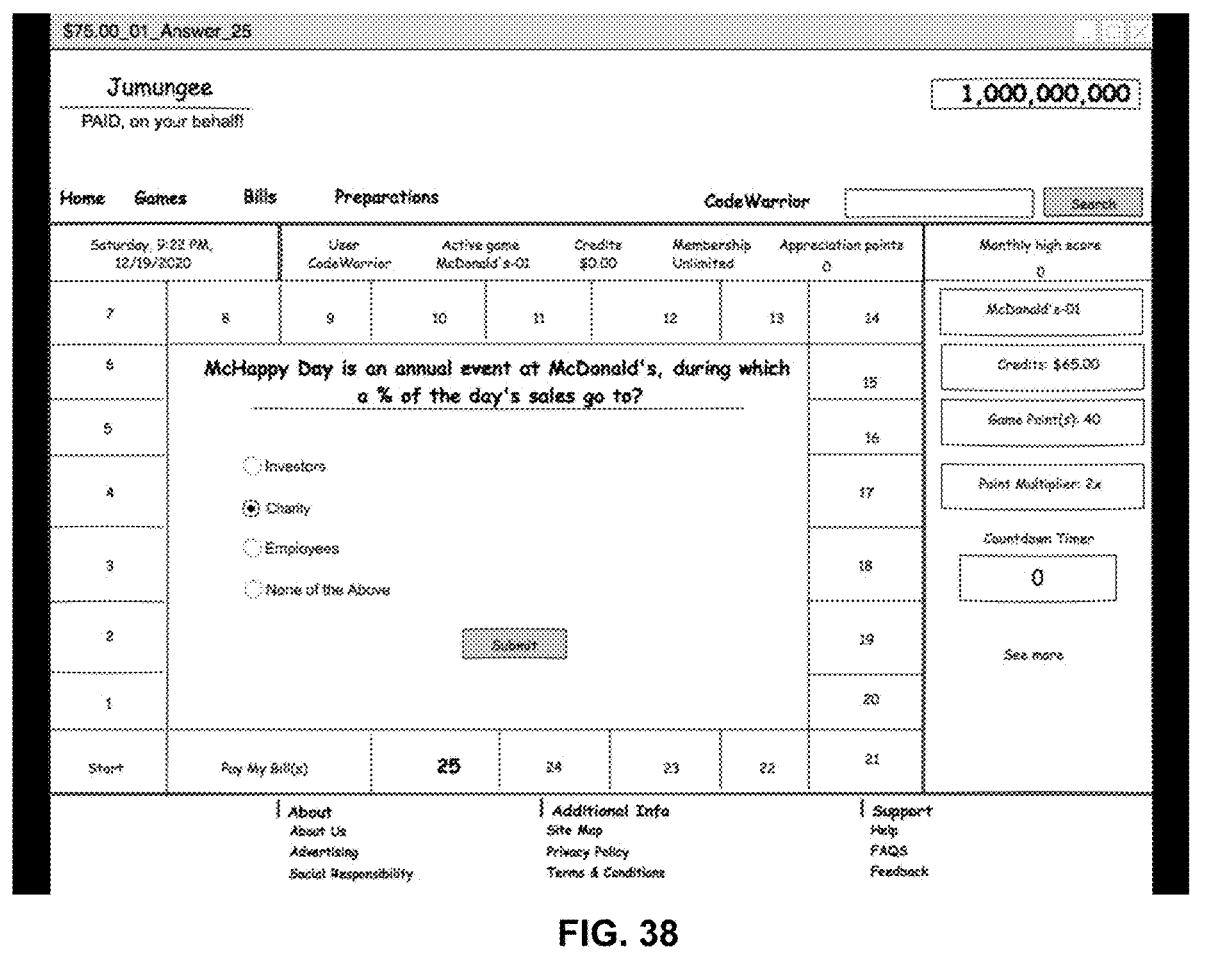
Figure 47:
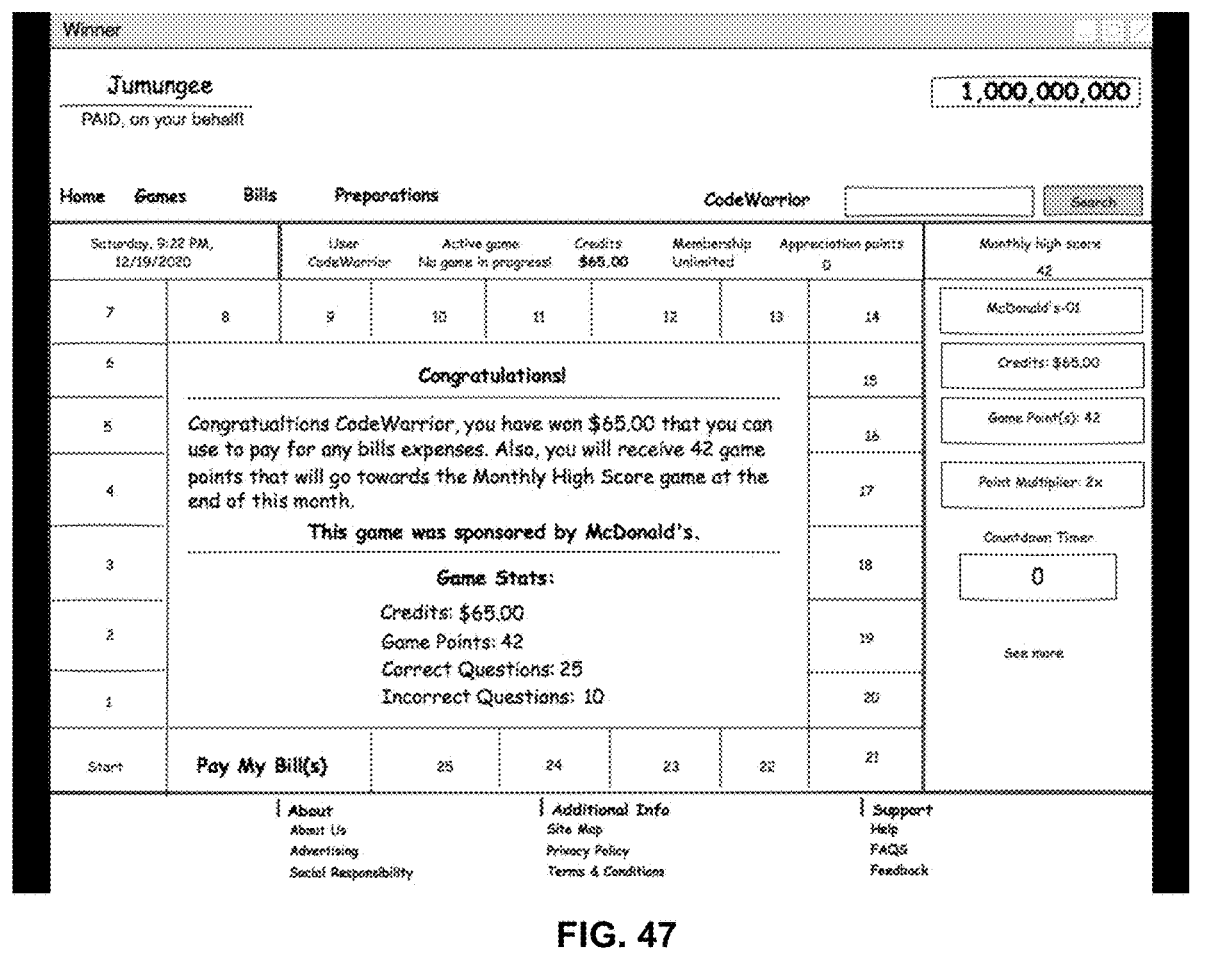

To save time on the game complete process explanation, the method advances to step S162, as illustrated in FIG. 36. Select one of the four categories. However, each player is required to select and answer 25 categories and questions. The method advances to step S164, as illustrated in FIG. 37. Select one of the four options to answer the question. As before, there are three available options that will determine the progress of the player. The first option will be continuing to produce a positive outcome. The systems and methods advances to step S170, select one of the four options, the question has been answered correctly, as illustrated in FIG. 38. The method advances to steps S184, as illustrated in FIG. 47.

Figure 27:
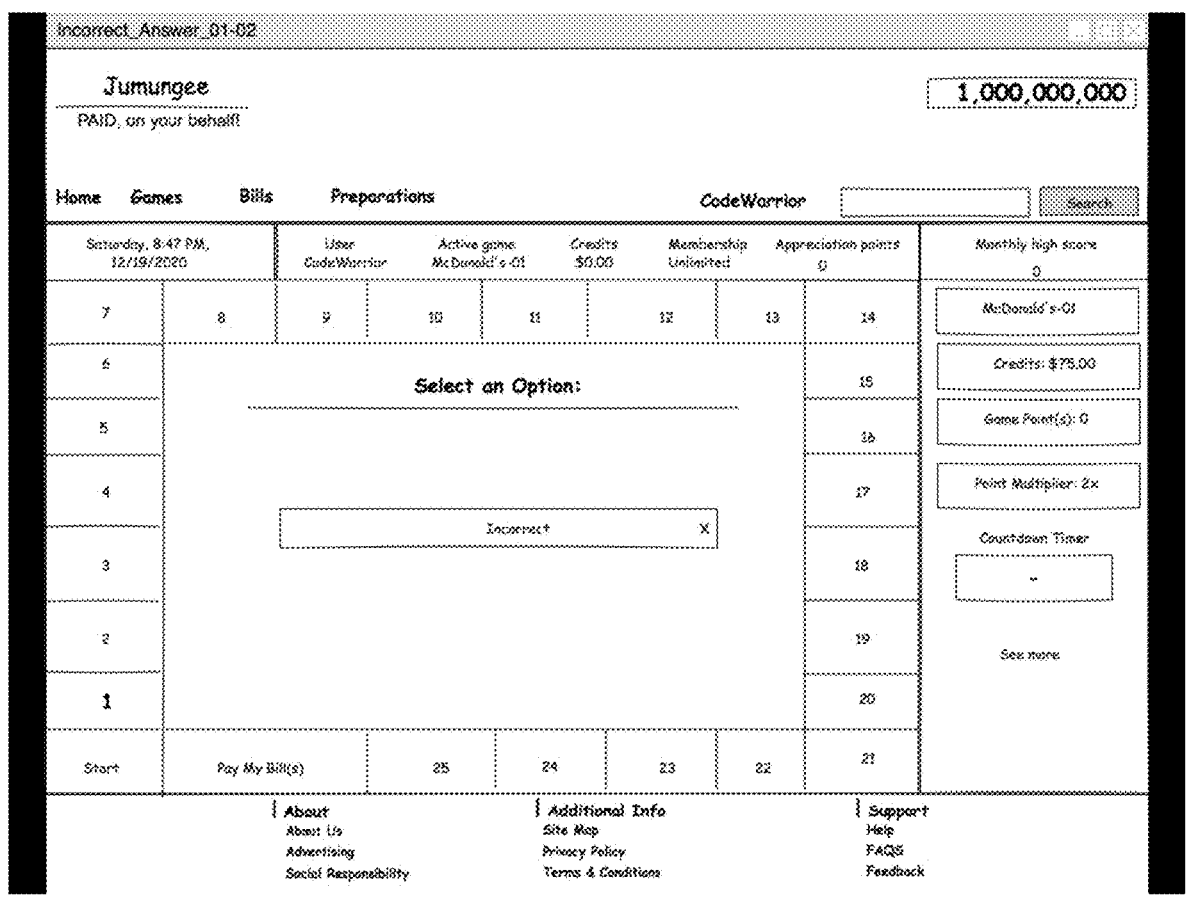
FIG. 27 shows a screen shot illustrating certain exemplary usability and functionality of the present disclosure.
Figure 28:
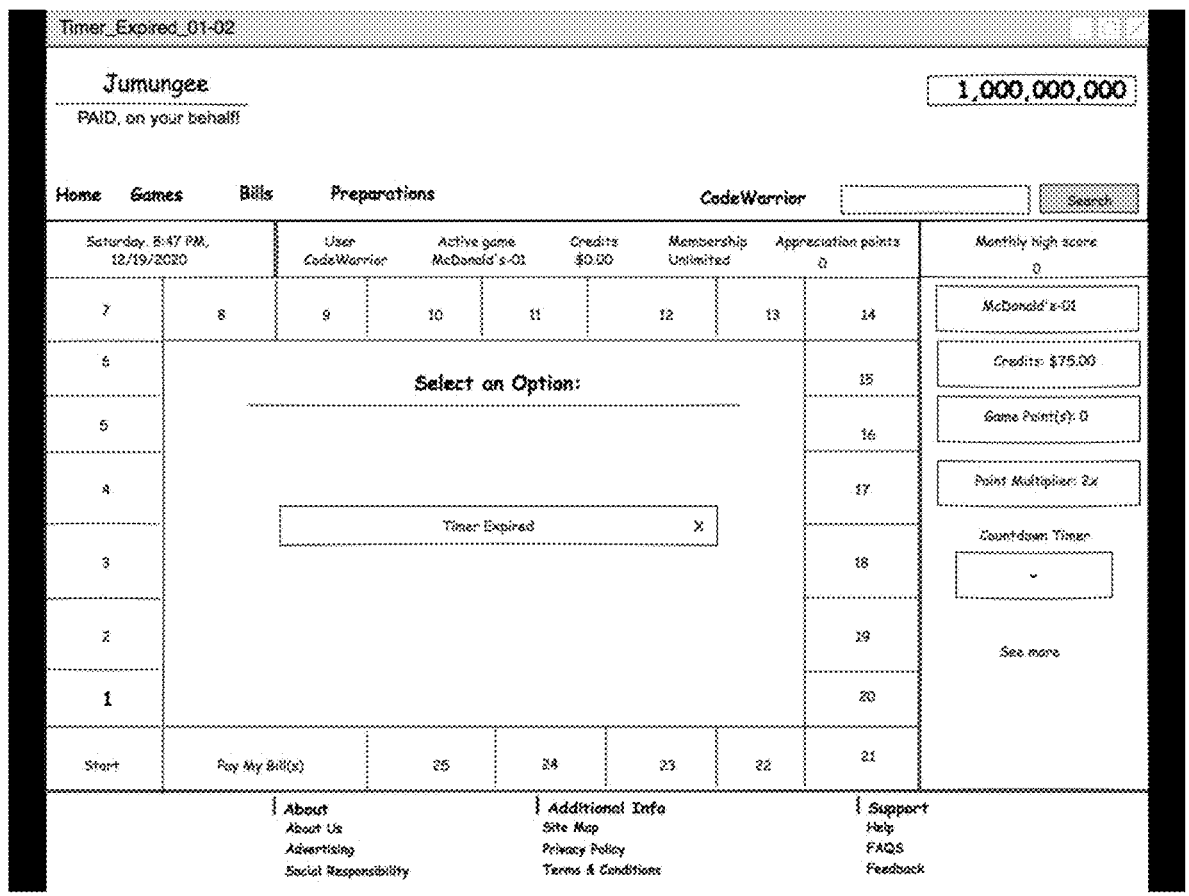
FIG. 28 shows a screen shot illustrating certain exemplary usability and functionality of the present disclosure.
Figure 29:
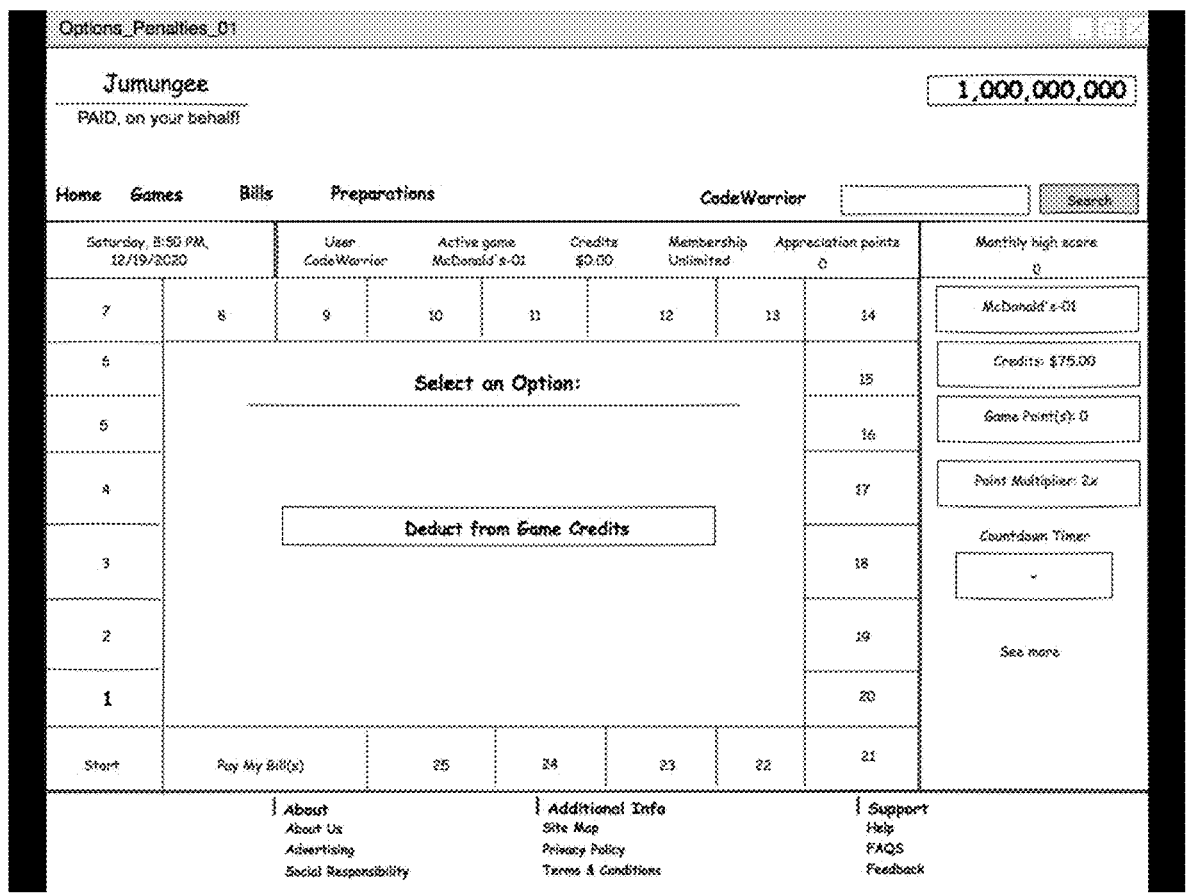
FIG. 29 shows a screen shot illustrating certain exemplary usability and functionality of the present disclosure.
Figure 30:
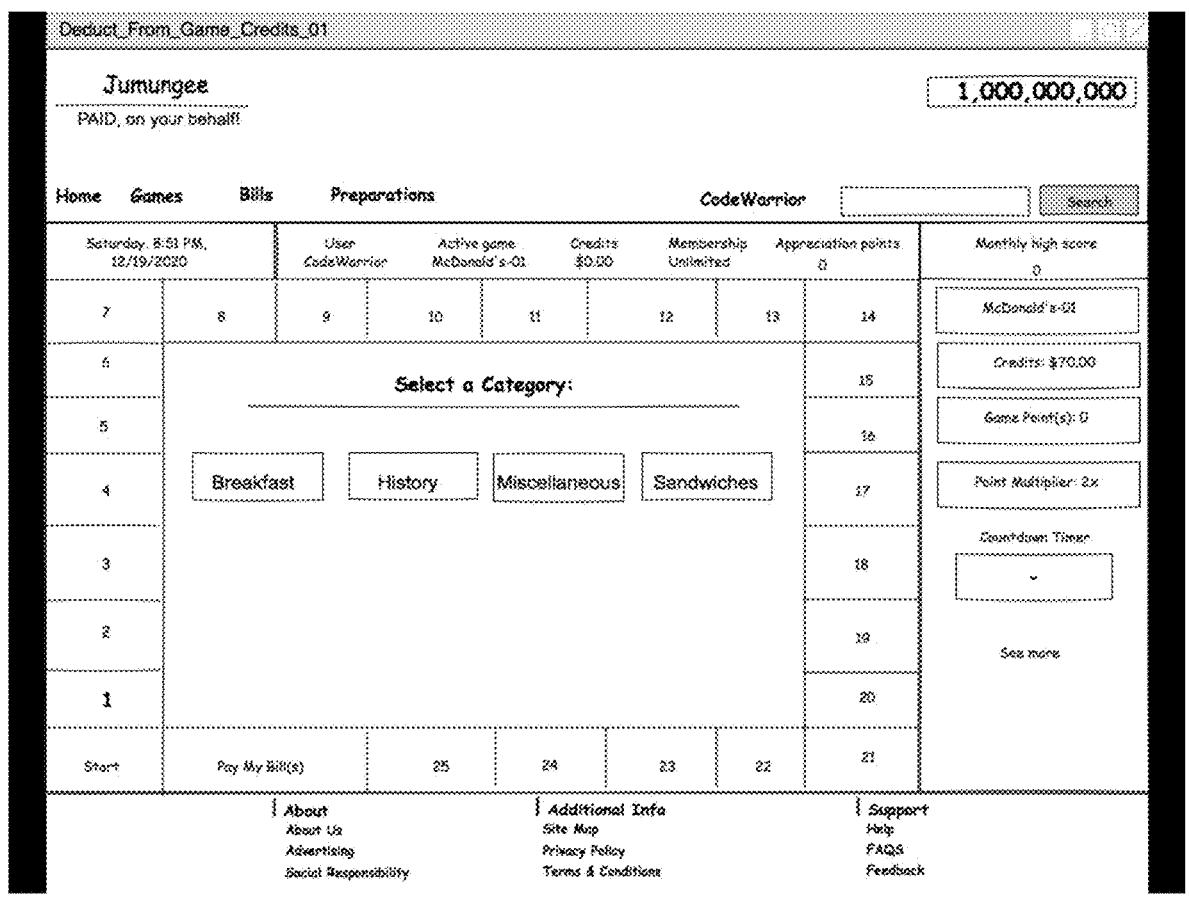
FIG. 30 shows a screen shot illustrating certain exemplary usability and functionality of the present disclosure.
Figure 35:
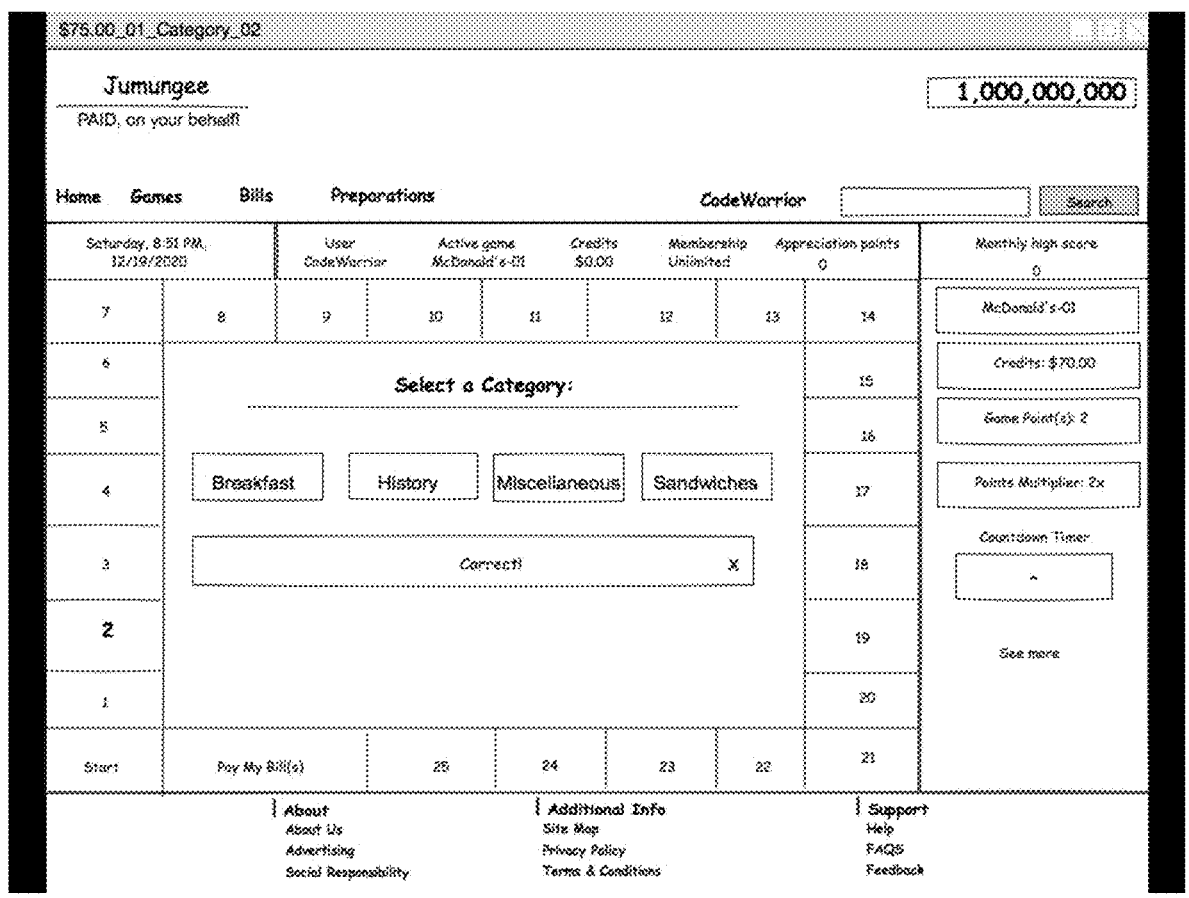
FIG. 35 shows a screen shot illustrating certain exemplary usability and functionality of the present disclosure.
Figure 41:
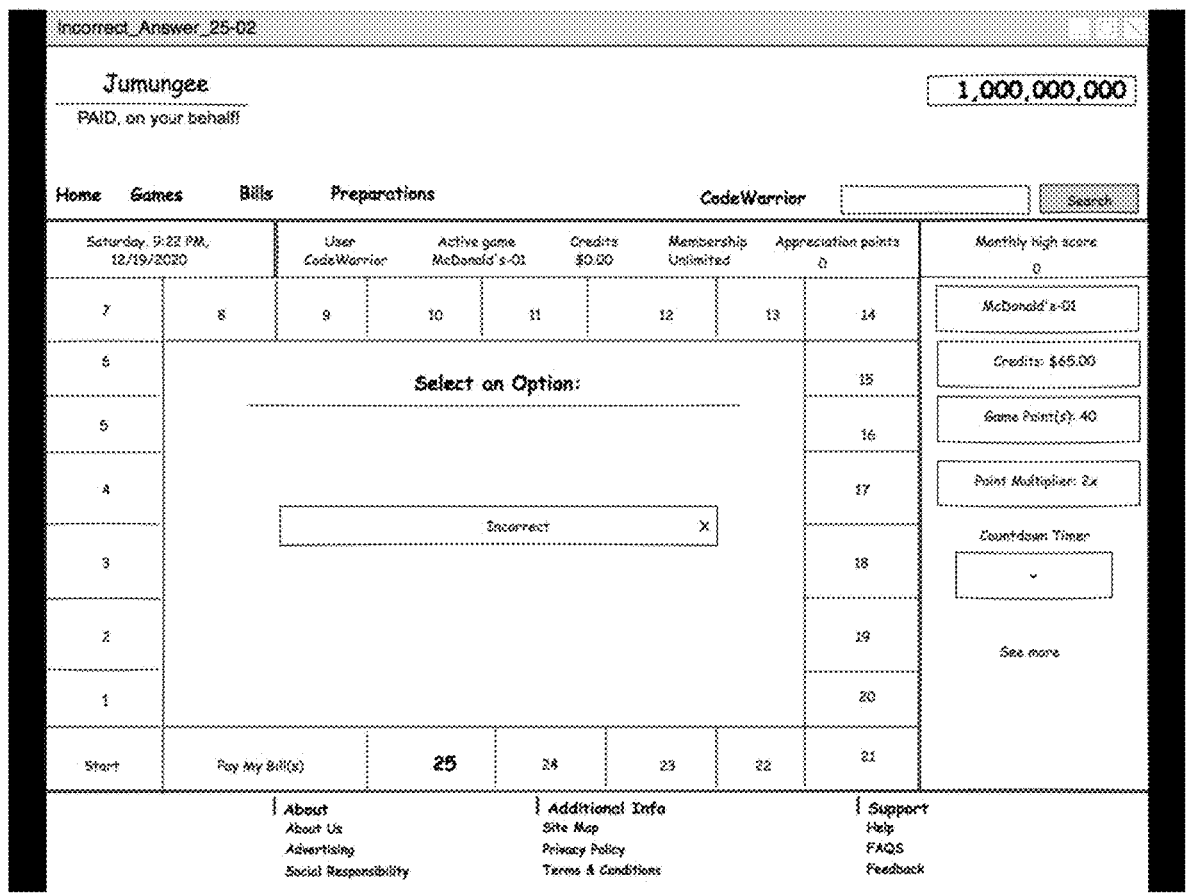
FIG. 41 shows a screen shot illustrating certain exemplary usability and functionality of the present disclosure.

This is the first continuation earlier from referencing the three available options. The second and third options respectfully, incorrect answer or timer expires may produce a negative outcome. From step S136 and FIG. 23. The method advances to step S138, as illustrated in FIG. 25. The method advances to step S144, as illustrated in FIG. 27. Or in step S140, as illustrated in FIG. 26. The method advances to step S146, as illustrated in FIG. 28. The method advances to step S148, the player will be provided with options or penalties, as illustrated in FIG. 29. For example, in step S148, 1. deduct from game credits, as illustrated in FIG. 29 is the only available option at the current time. The reason that this is the only option at the current time is because the player is on position 1 and can't go backwards, and because the player has no game points to deduct from. The method advances to step S150, as illustrated in FIG. 30. The game credits has been deducted from $75.00 to $70.00. The method advances to step S152, select one of the four categories, as illustrated in FIG. 31. The method advances to step S154, as illustrated in FIG. 32. select one of the four options to answer the question. The method advances to step S158, select one of the four options, the question has been answered correctly, as illustrated in FIG. 34. The method advances to step S160, as illustrated in FIG. 35. To save time on the game complete process explanation, the method advances to step S162, as illustrated in FIG. 36. Select one of the four categories. However, each player is required to select and answer 25 categories and questions. The method advances to step S164, as illustrated in FIG. 37. Select one of the four options to answer the question. This is the second continuation earlier from referencing the three available options. The second and third options respectfully, incorrect answer or timer expires may produce a negative outcome. From step S164 and FIG. 37. The method advances to step S166, as illustrated in FIG. 39. The method advances to step S172, as illustrated in FIG. 41.

Figure 40:
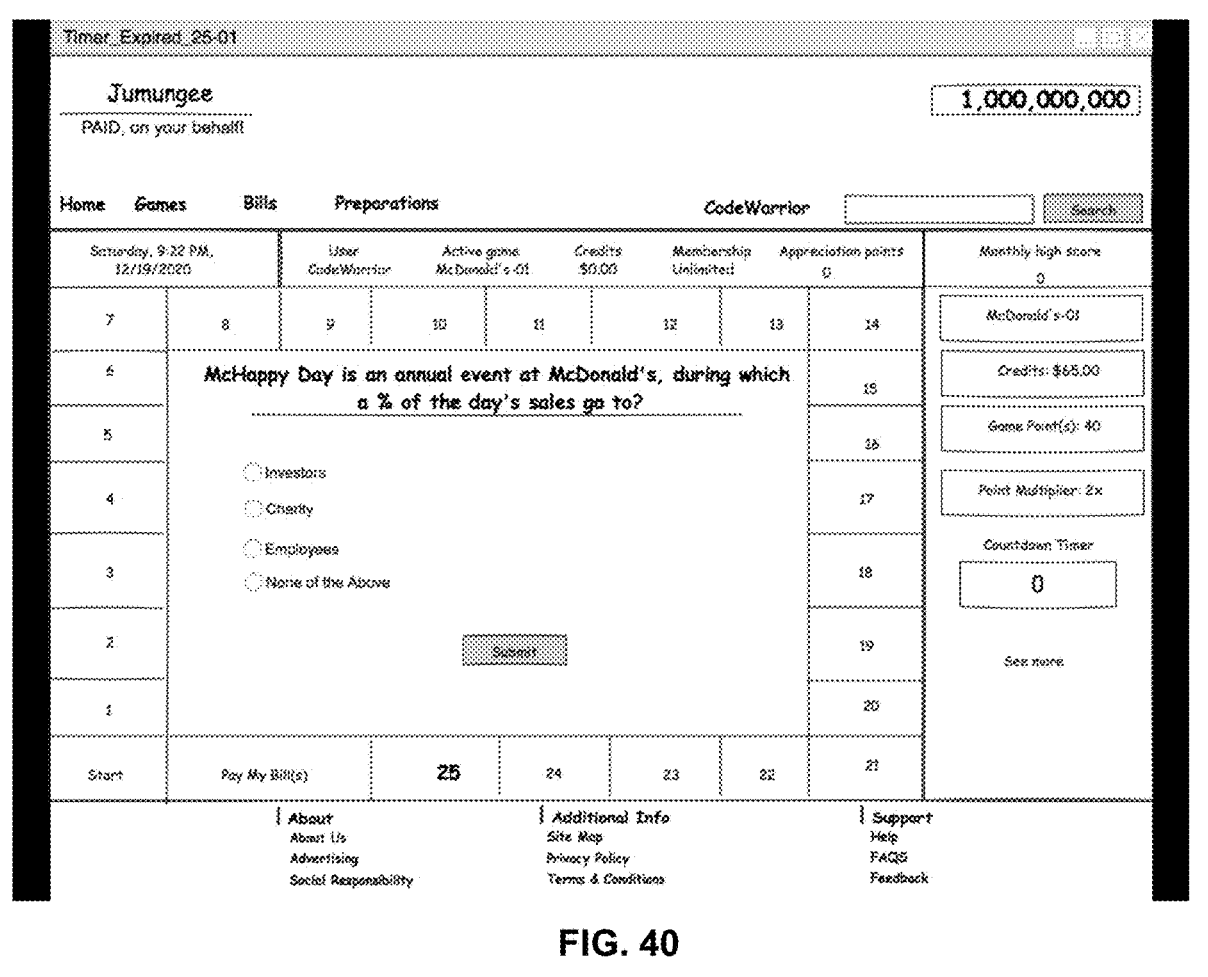
Figure 42:
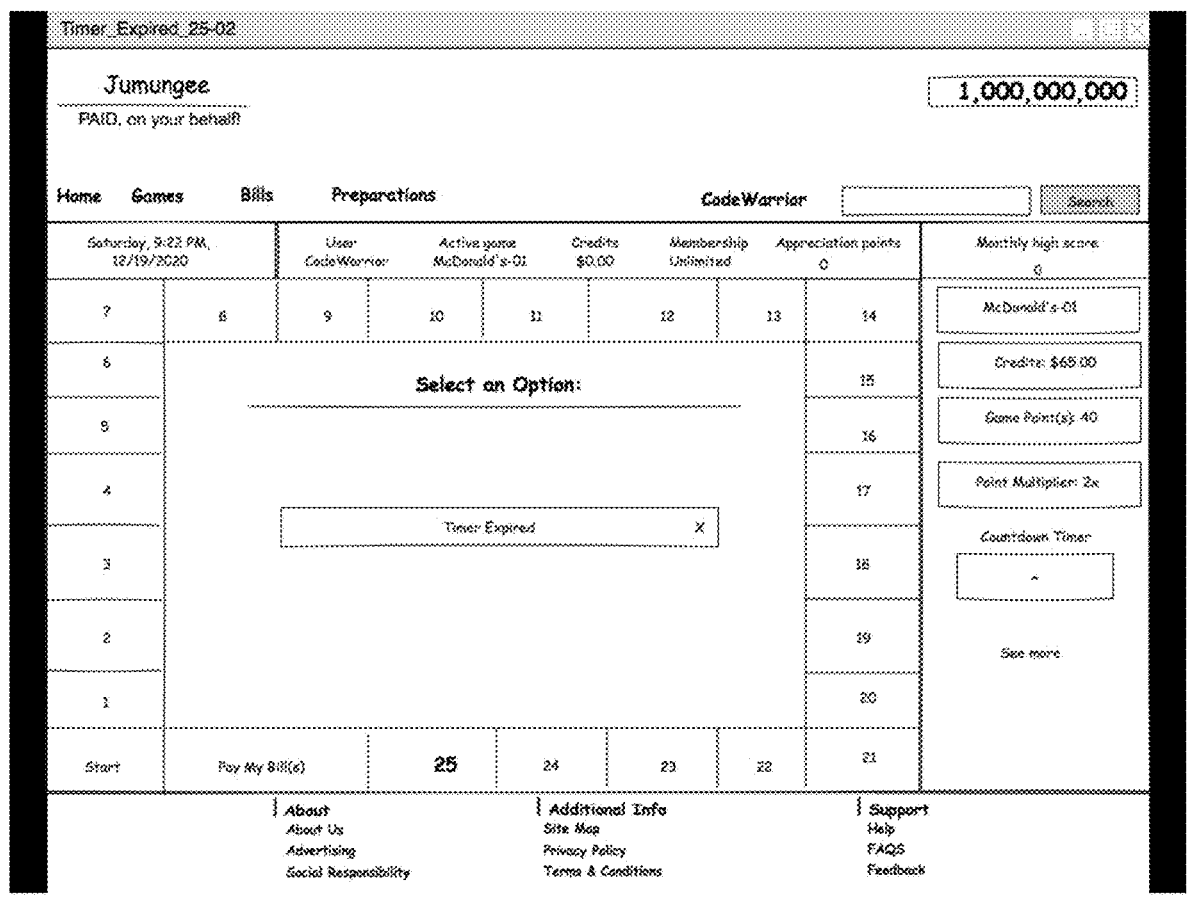
FIG. 42 shows a screen shot illustrating certain exemplary usability and functionality of the present disclosure.
Figure 43:
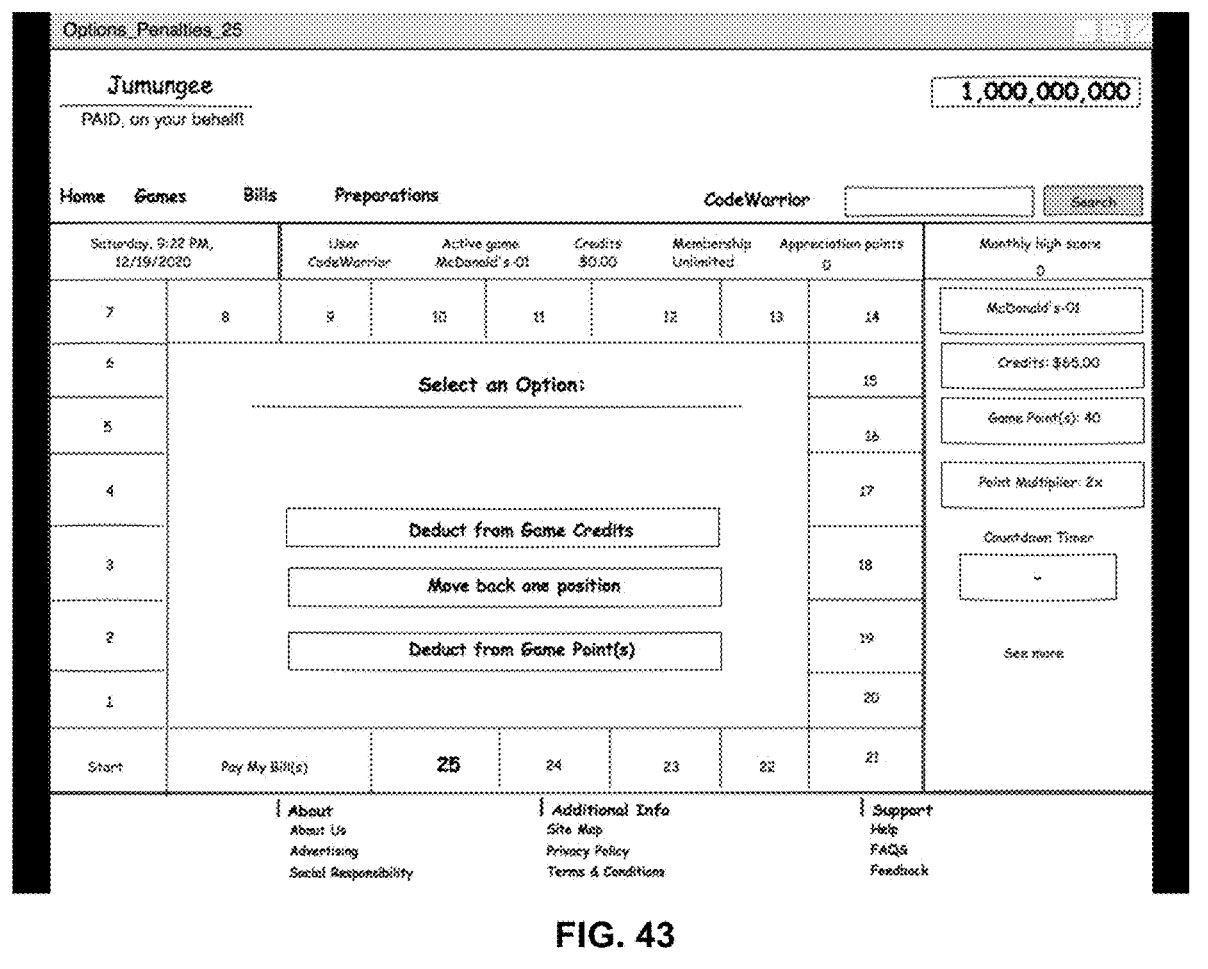
Figure 44:
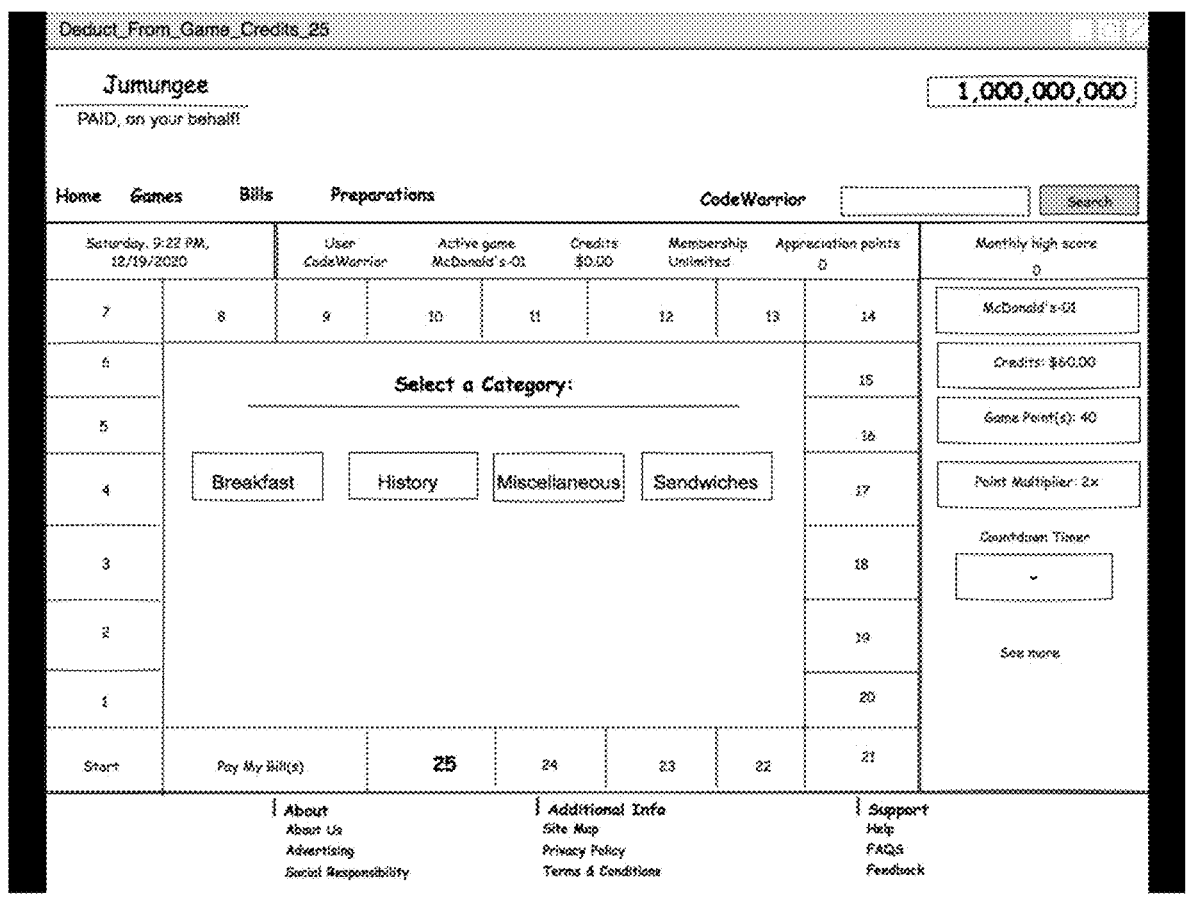
FIG. 44 shows a screen shot illustrating certain exemplary usability and functionality of the present disclosure.
Figure 45:
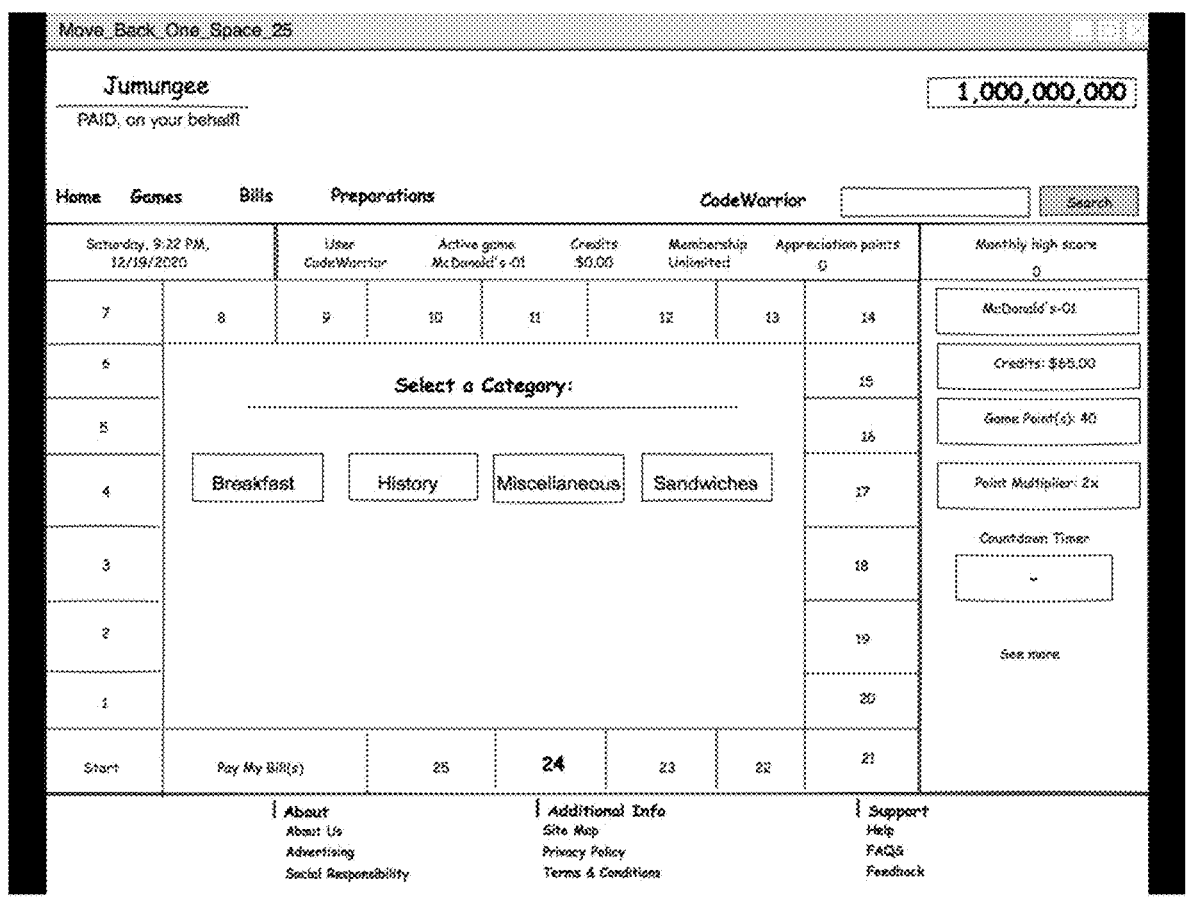
FIG. 45 shows a screen shot illustrating certain exemplary usability and functionality of the present disclosure.
Figure 46:
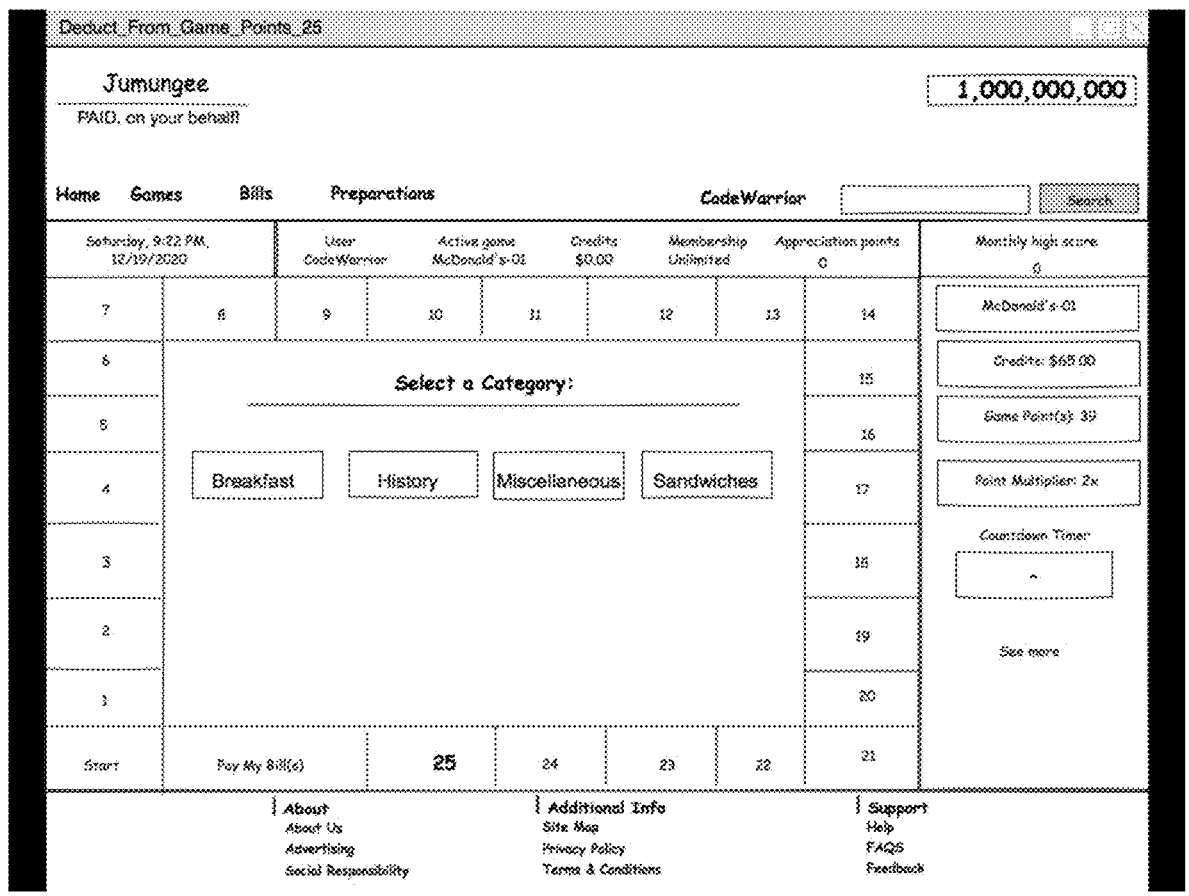
FIG. 46 shows a screen shot illustrating certain exemplary usability and functionality of the present disclosure.
Figure 48:
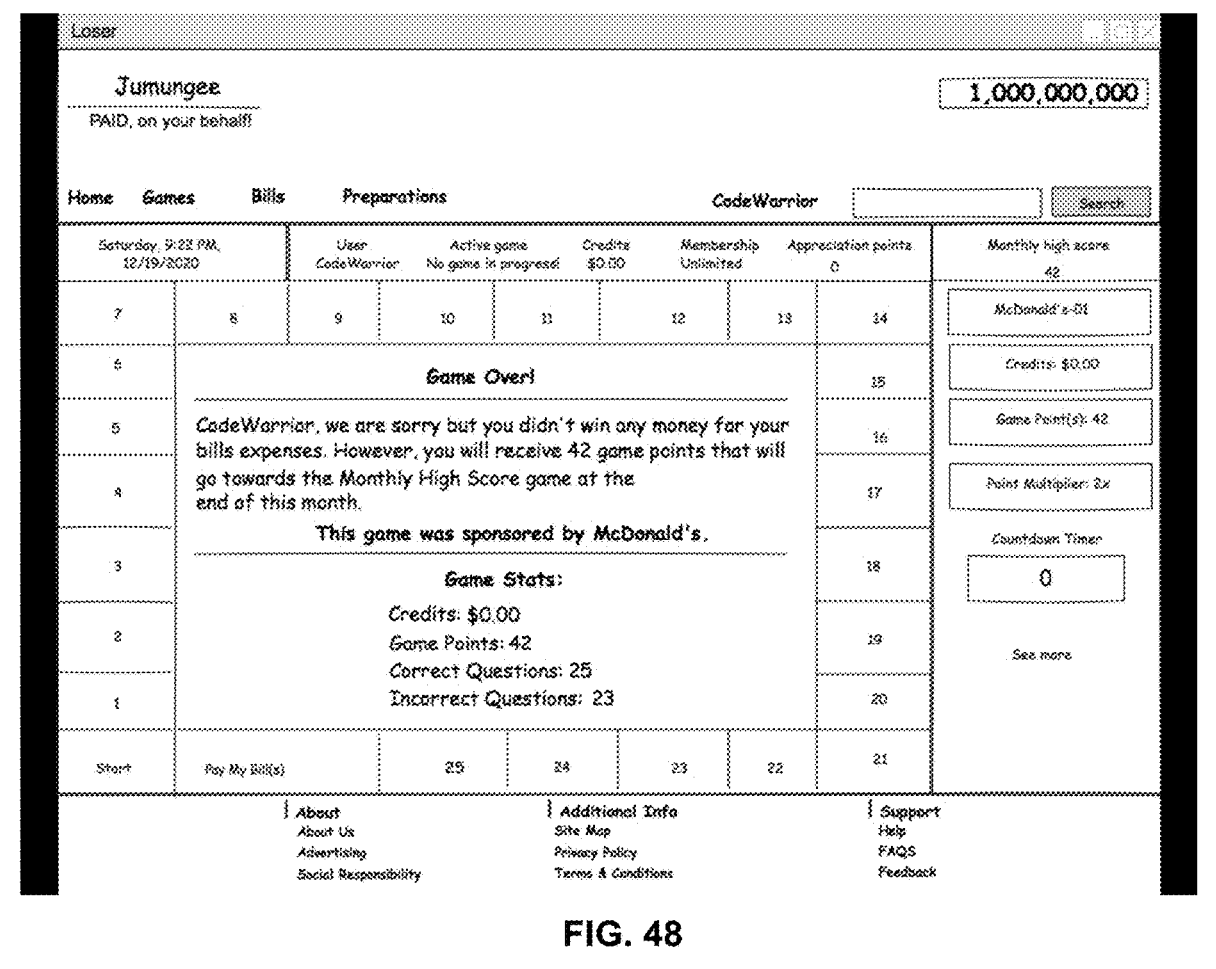

Or in step S168, as illustrated in FIG. 40. The method advances to step S174, as illustrated in FIG. 42. The method advances to step S176, the player will be provided with options or penalties, as illustrated in FIG. 43. For example, in step S178, 1. deduct from game credits, as illustrated in FIG. 44, The game credits has been deducted from $65.00 to $60.00. In step S180, 2. move back one space, as illustrated in FIG. 45. The player was on position 25 now the player is on position 24. In step S182, 3. Deduct from game points, as illustrated in FIG. 46. The player had 40 points but now they have 39 because 1 point was deducted from the game points. The method advances to step S186, as illustrated in FIG. 48.

The game example start and ends with FIGS. 20-48.

Figure 49:
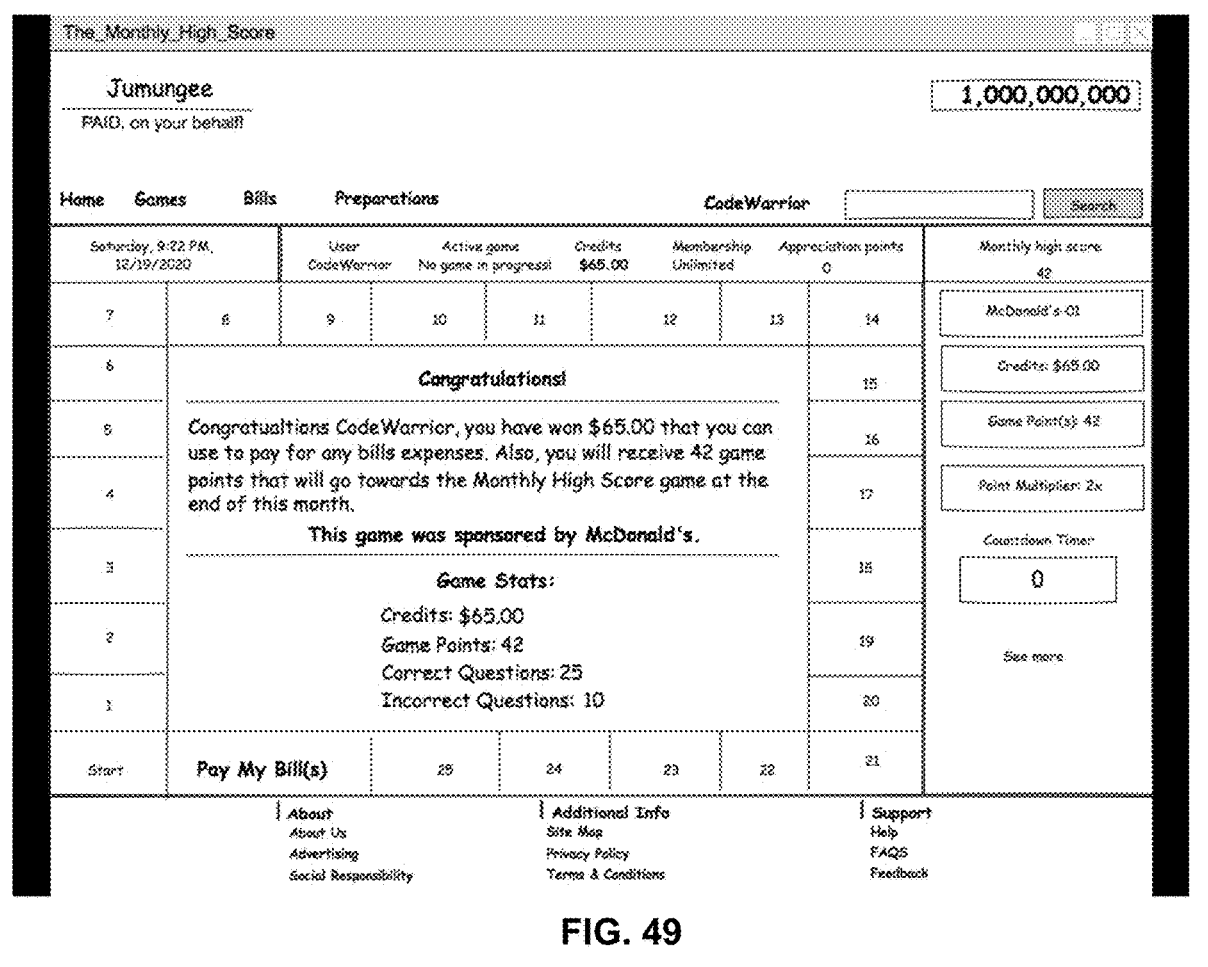
Figure 50:
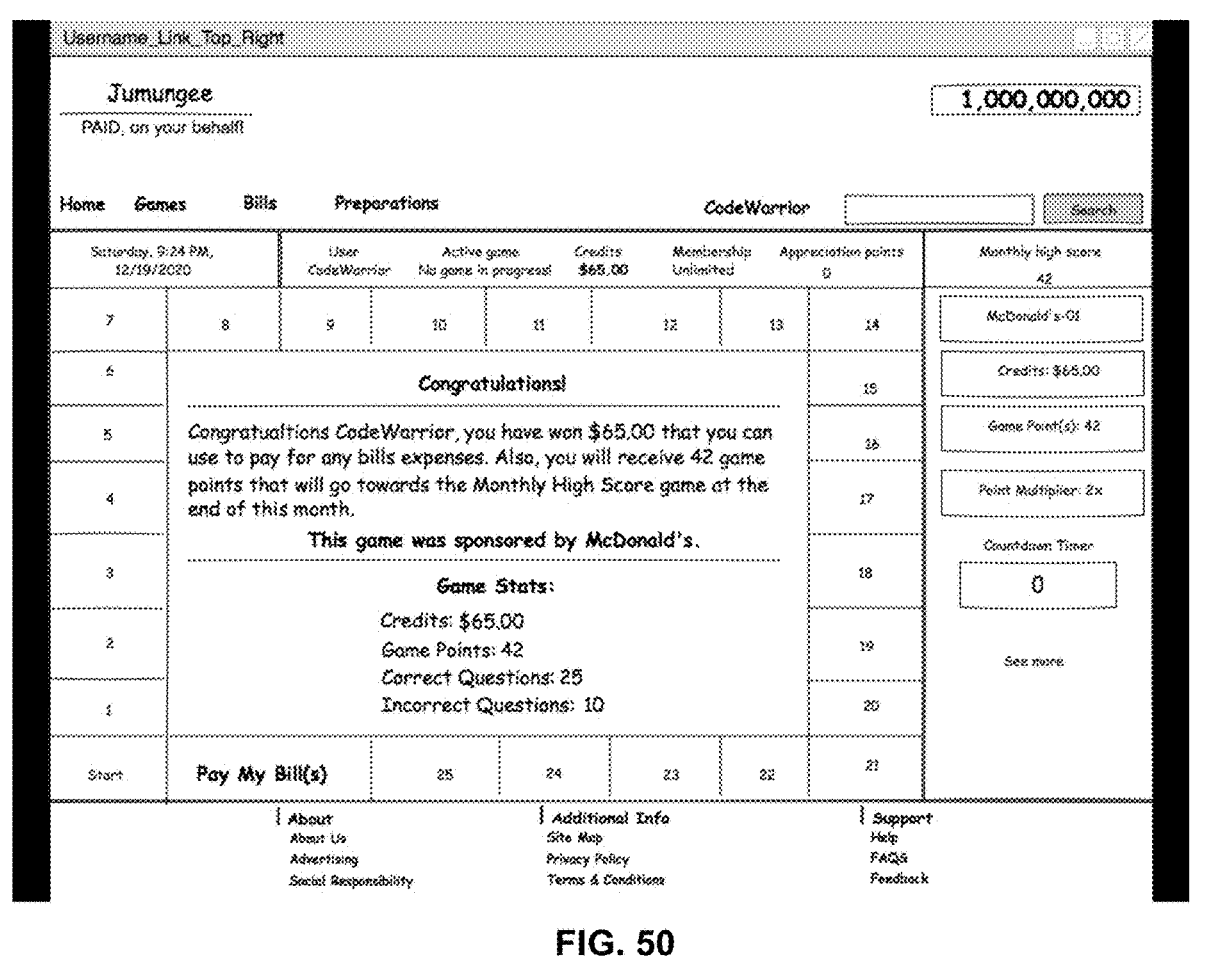
Figure 51:
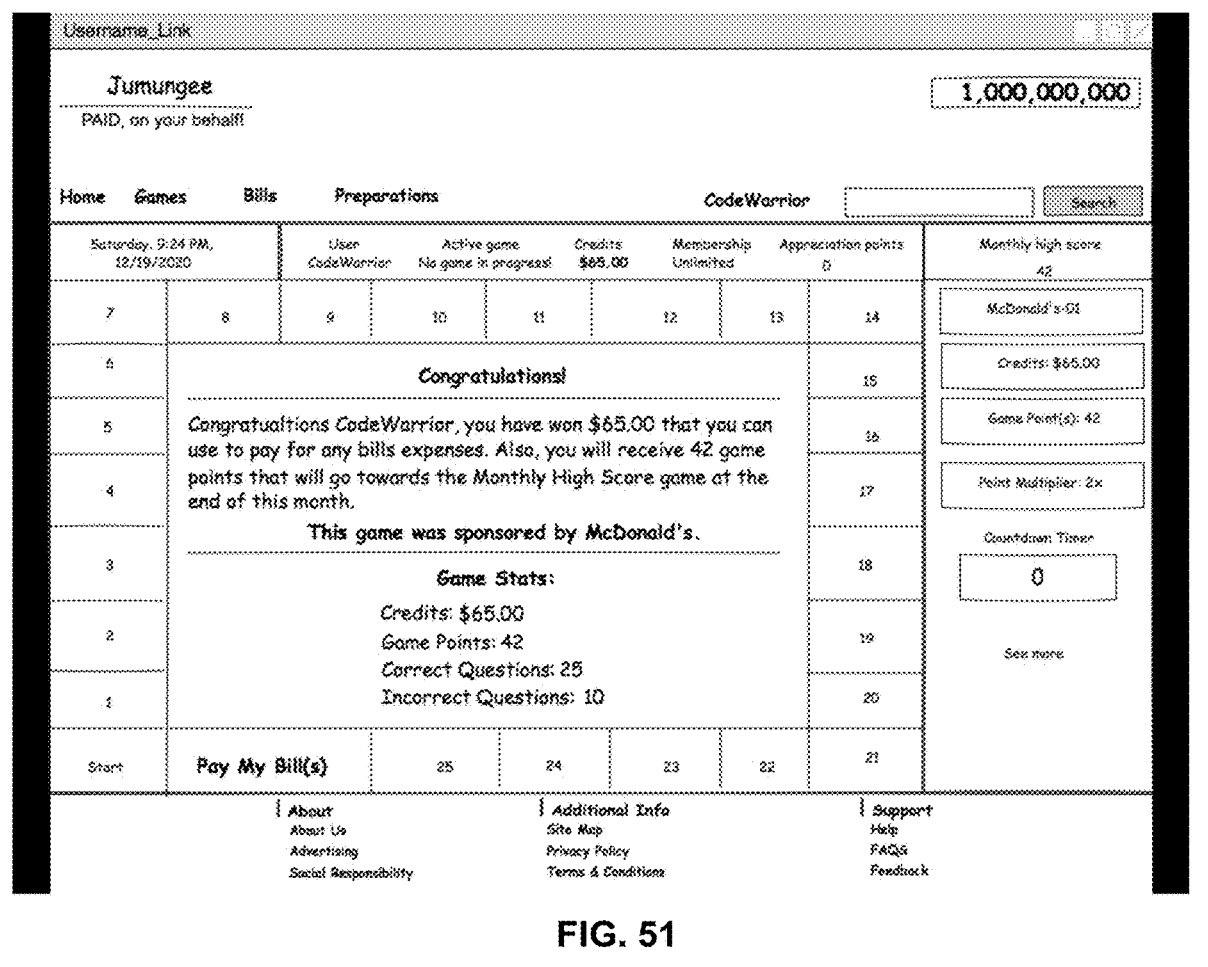
Figure 52:
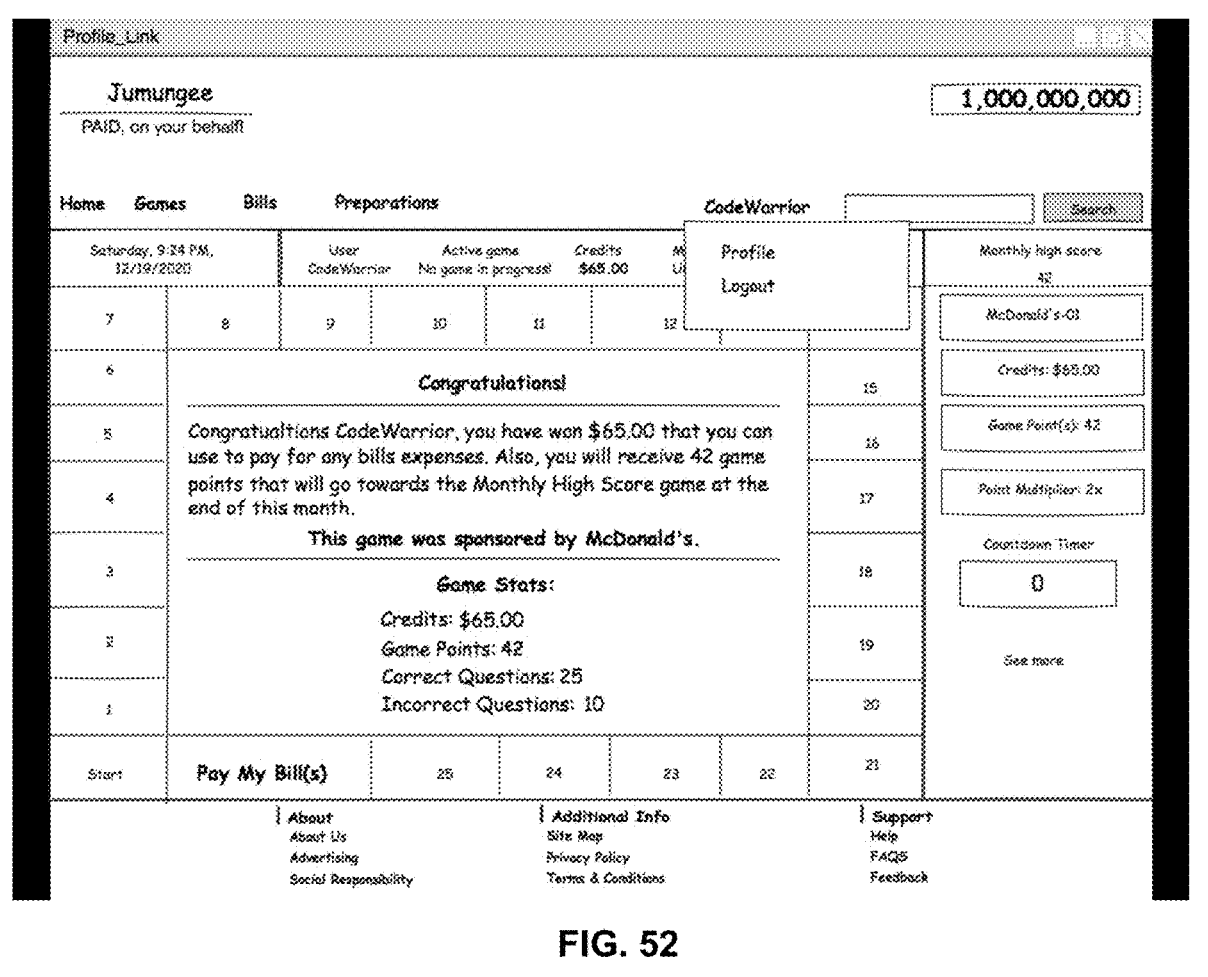

The method advances to step S188, as illustrated in FIG. 49, after the game is over, all winners available game credits will transfer to their winning game credits prize amount. Also, the game credits will be transferred to the winners and losers Monthly High Score. The player is presented with options and, in step S190, the player is able to, as illustrated in FIG. 50, select the username link under the user heading across the top of the page. Or in step S192, as illustrated in FIG. 51, select the username link top right, the player is then able to select the profile link to advance the method in step S194, as illustrated in FIG. 52.

Figure 53:
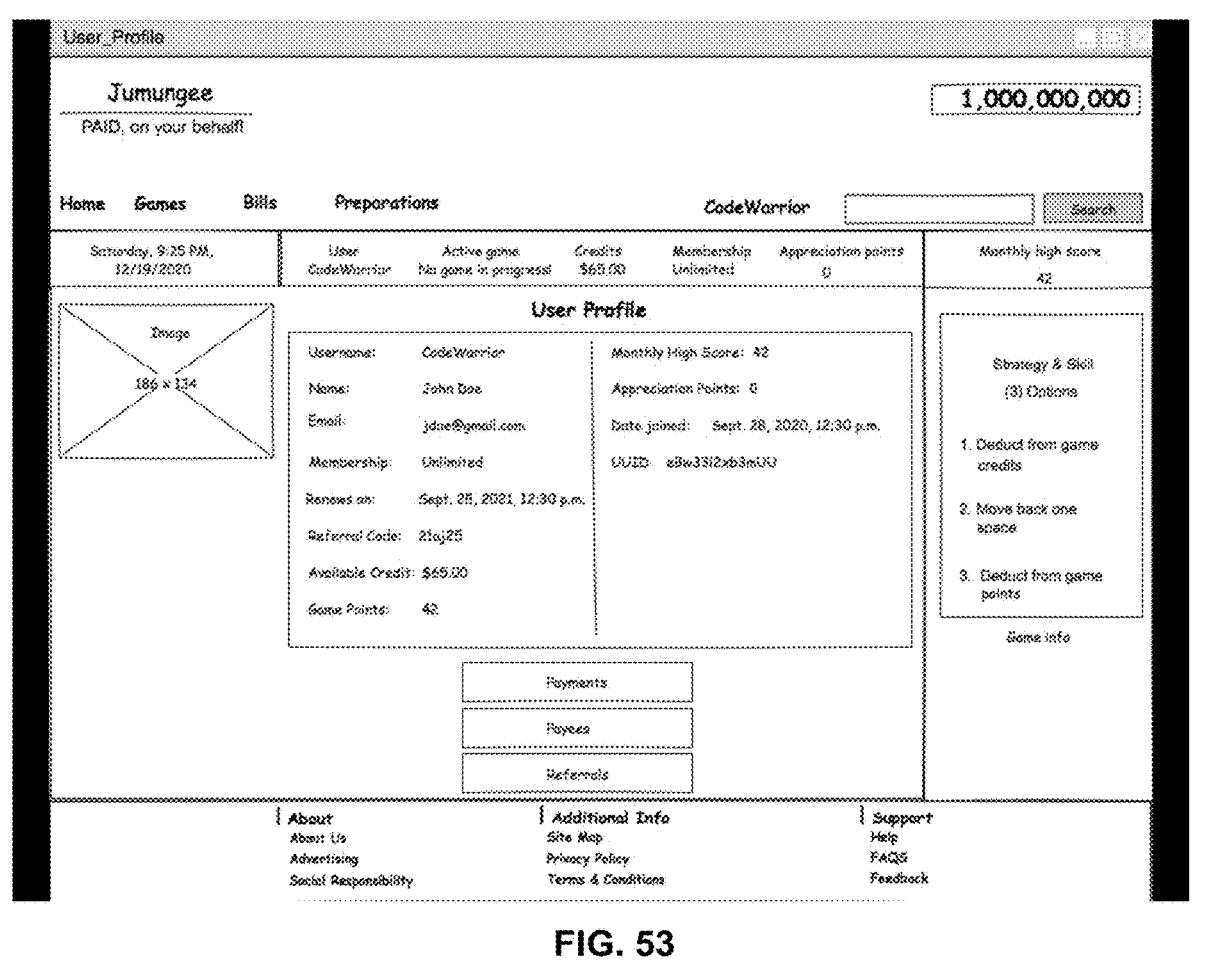
Figure 54:
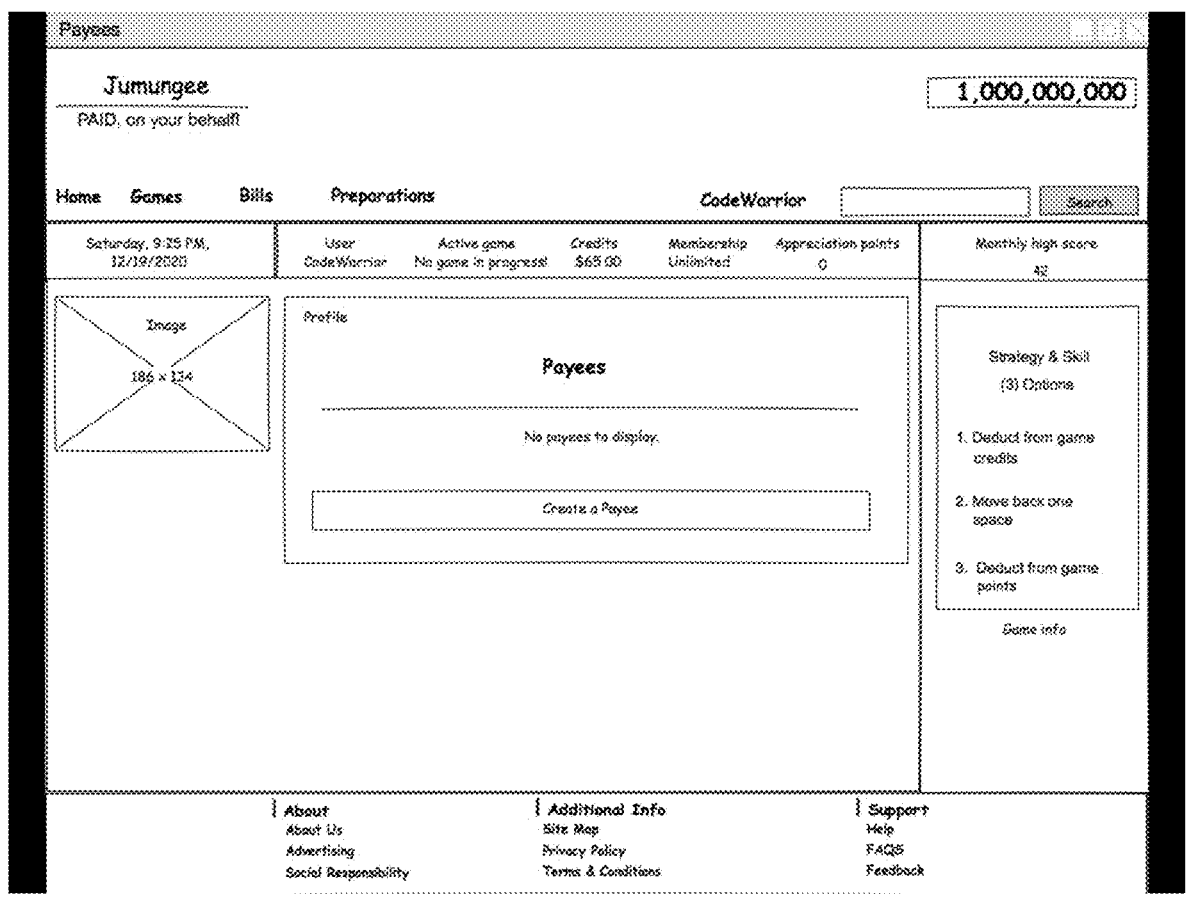
FIG. 54 shows a screen shot illustrating certain exemplary usability and functionality of the present disclosure.

In step S196, as illustrated in FIG. 53, the player is able to view important information about their account and if desire to click the payees button, the method advances to, for example, in step S198, as optionally illustrated in FIG. 54, and the player is able to select the create a payee button. The method advance to step S200.

Figure 55:
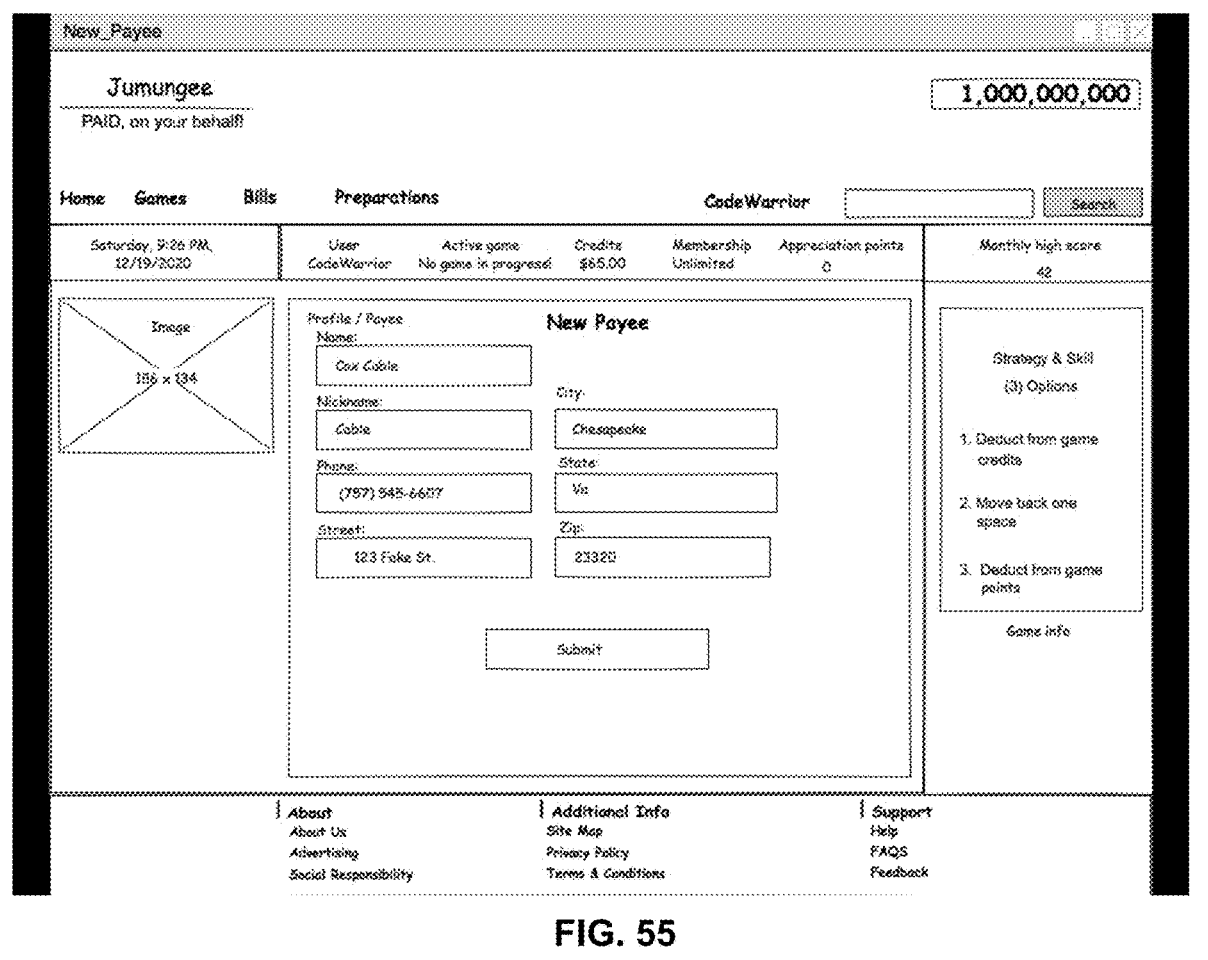

In step S200, the player is able to enter information regarding the new payee page, as illustrated in FIG. 55, and the player is able to select the submit button. The method advance to step S202.

Figure 56:
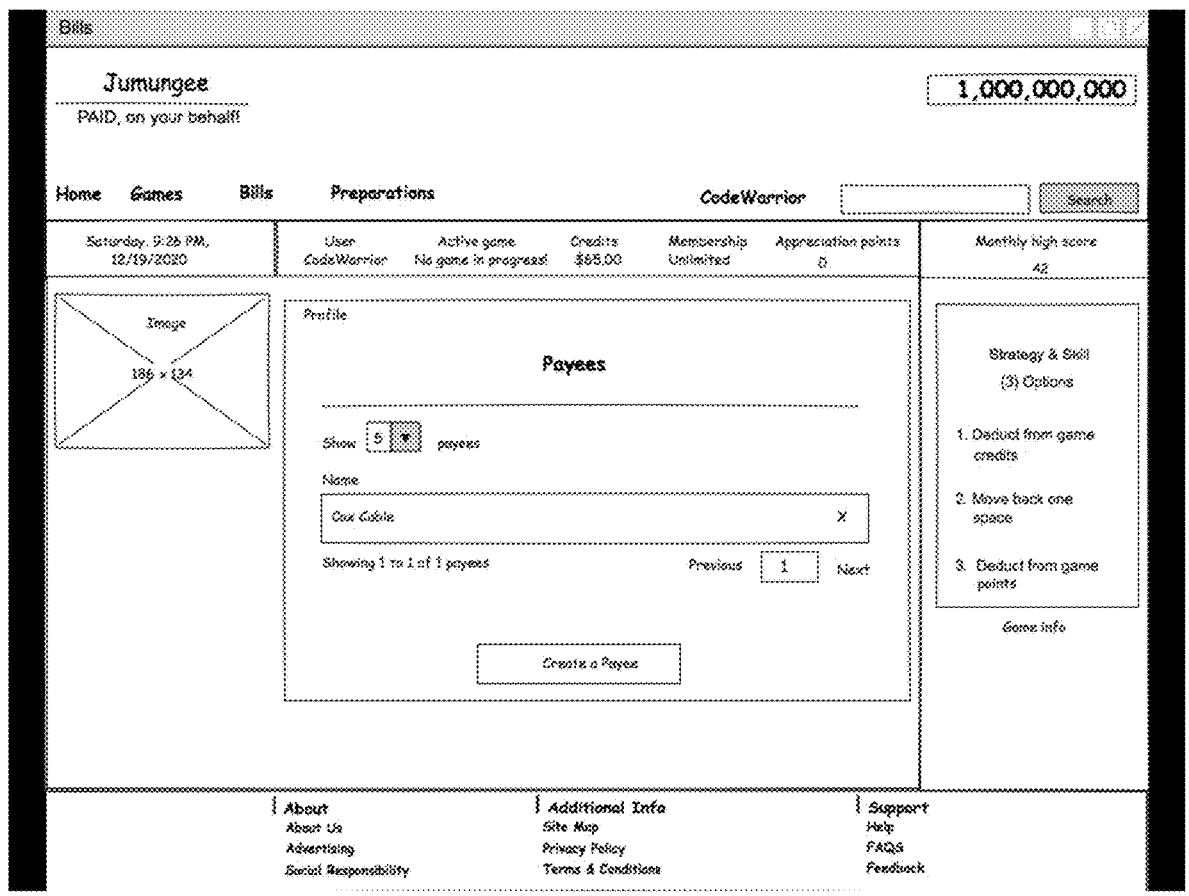
FIG. 56 shows a screen shot illustrating certain exemplary usability and functionality of the present disclosure.
Figure 57:
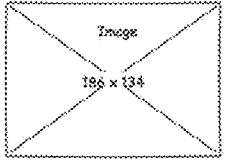
FIG. 57 shows a screen shot illustrating certain exemplary usability and functionality of the present disclosure.
Figure 58:
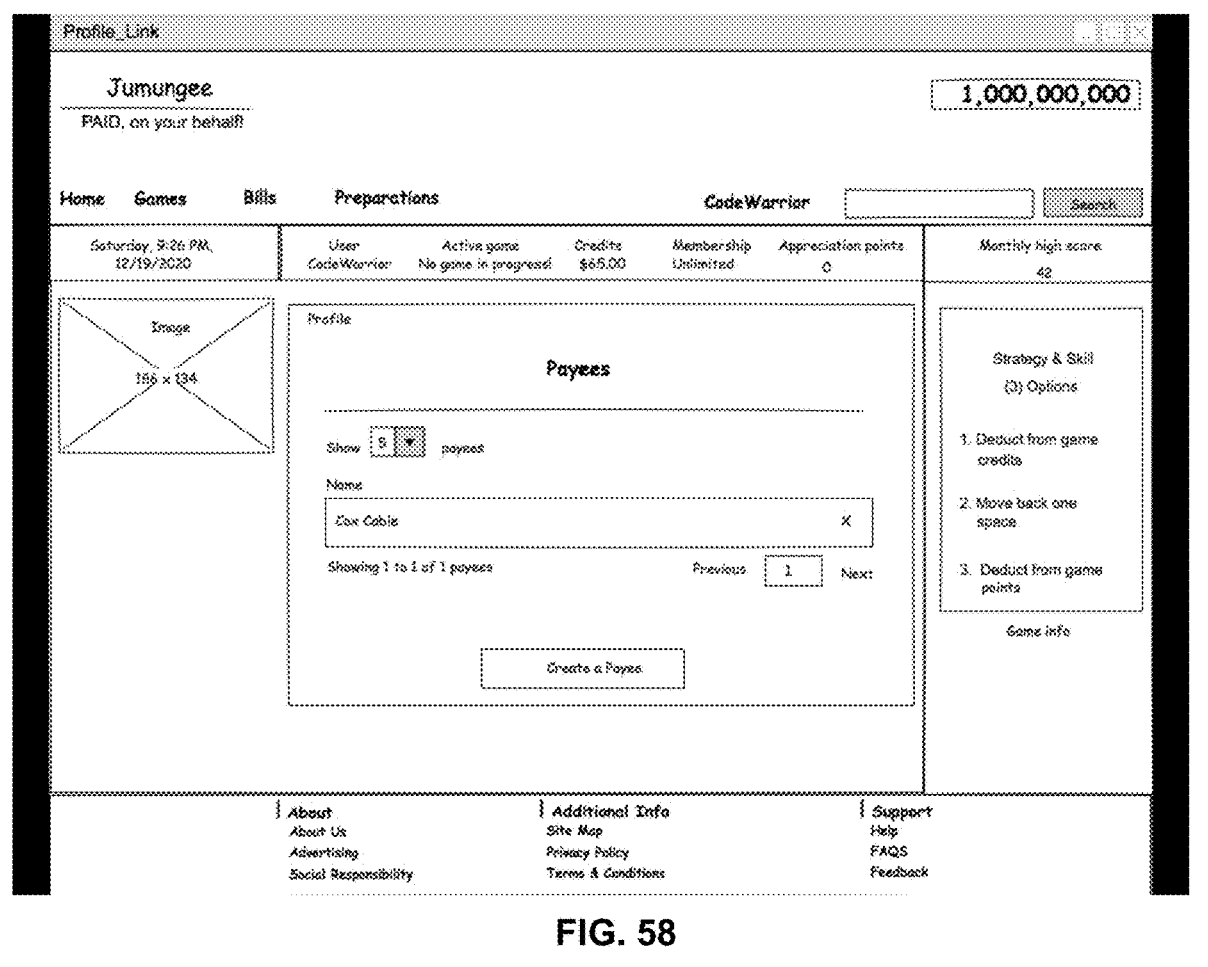
Figure 59:
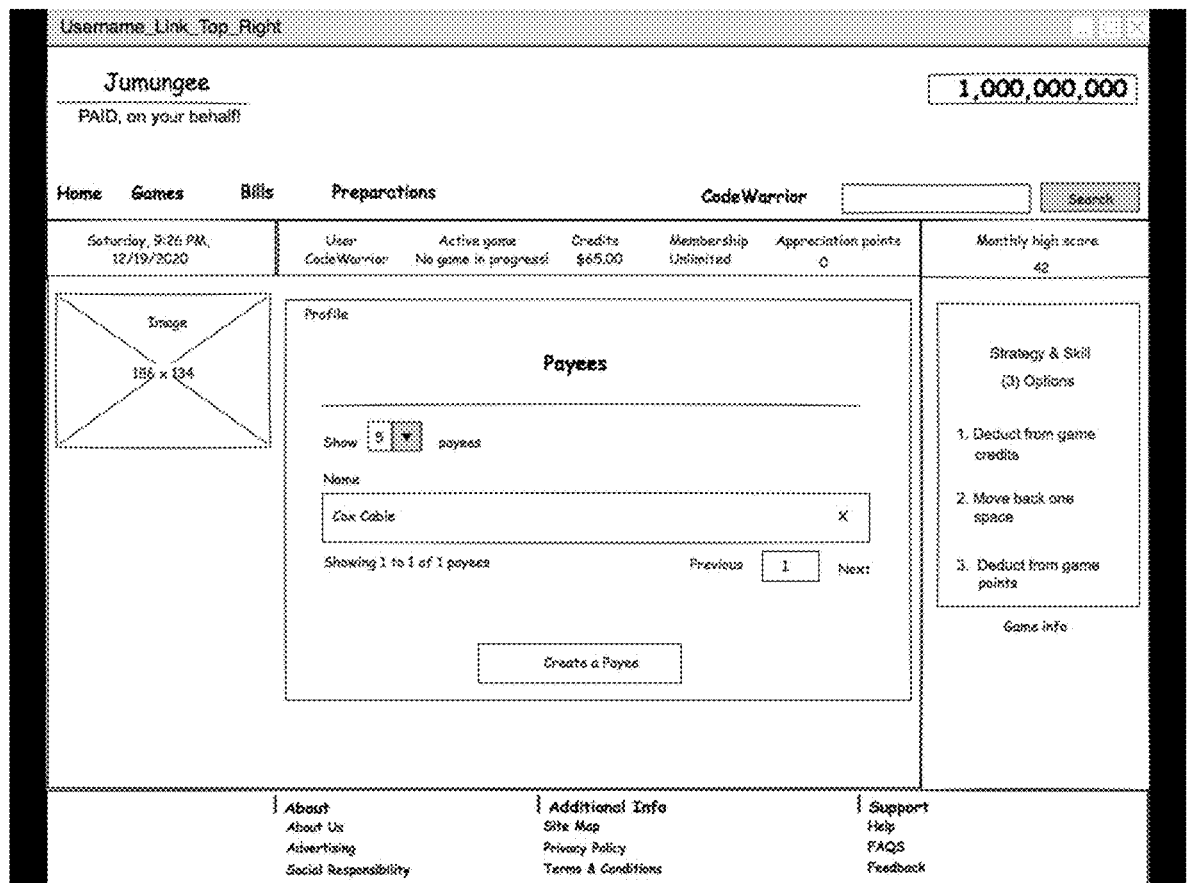
FIG. 59 shows a screen shot illustrating certain exemplary usability and functionality of the present disclosure.
Figure 60:
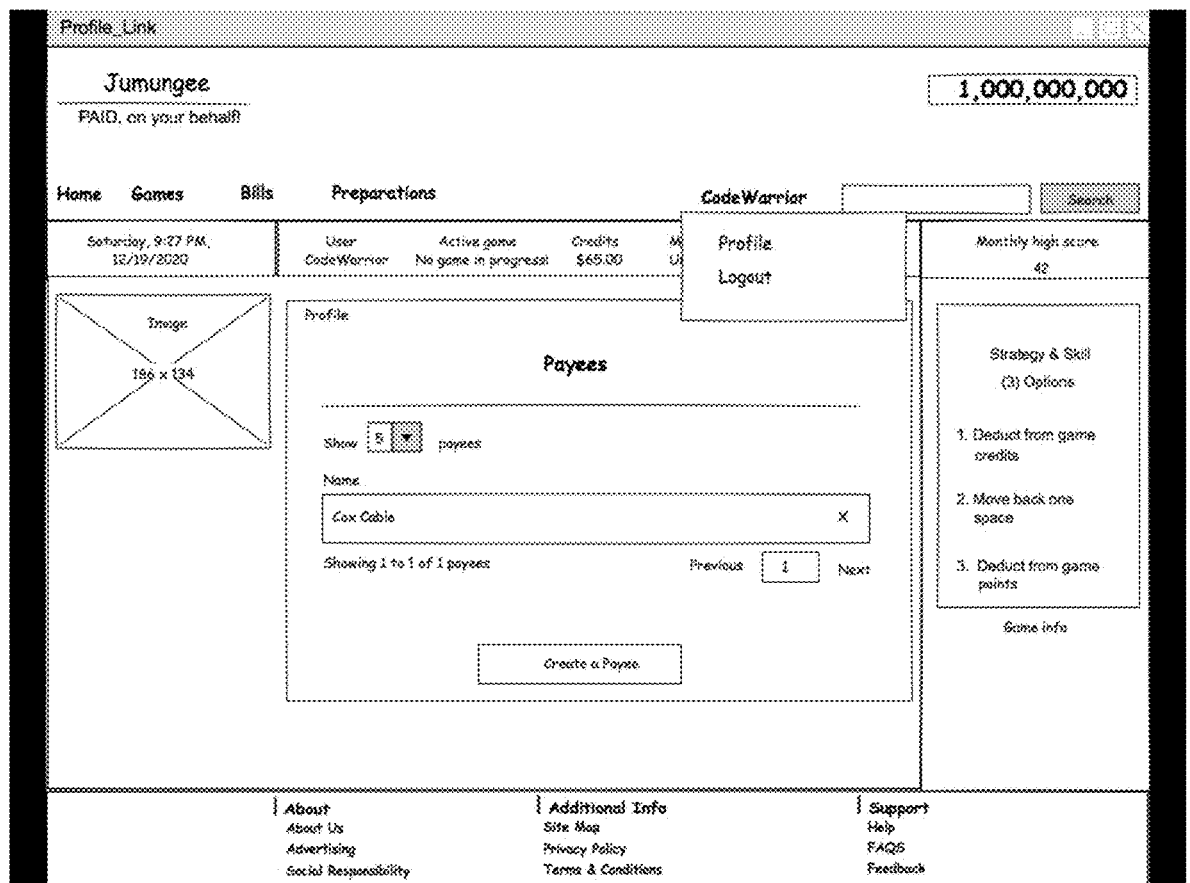
FIG. 60 shows a screen shot illustrating certain exemplary usability and functionality of the present disclosure.

In step S202, as illustrated in FIG. 56, the player is directed to the bills page to confirm that the payee entered was included. To continue to add new payees the player, may optionally select the create a payee button. Also, in step S202, the player is presented with options and, in step S208, the player is able to, as illustrated in FIG. 57, select the username link under the user heading across the top of the page. Or in step S204, as illustrated in FIG. 58, select the profile link. And in step S206, as illustrated in FIG. 59, select the username link top right, the player is then able to select the profile link to advance the method in step S210, as illustrated in FIG. 60. The method advance to step S212.

Figure 61:
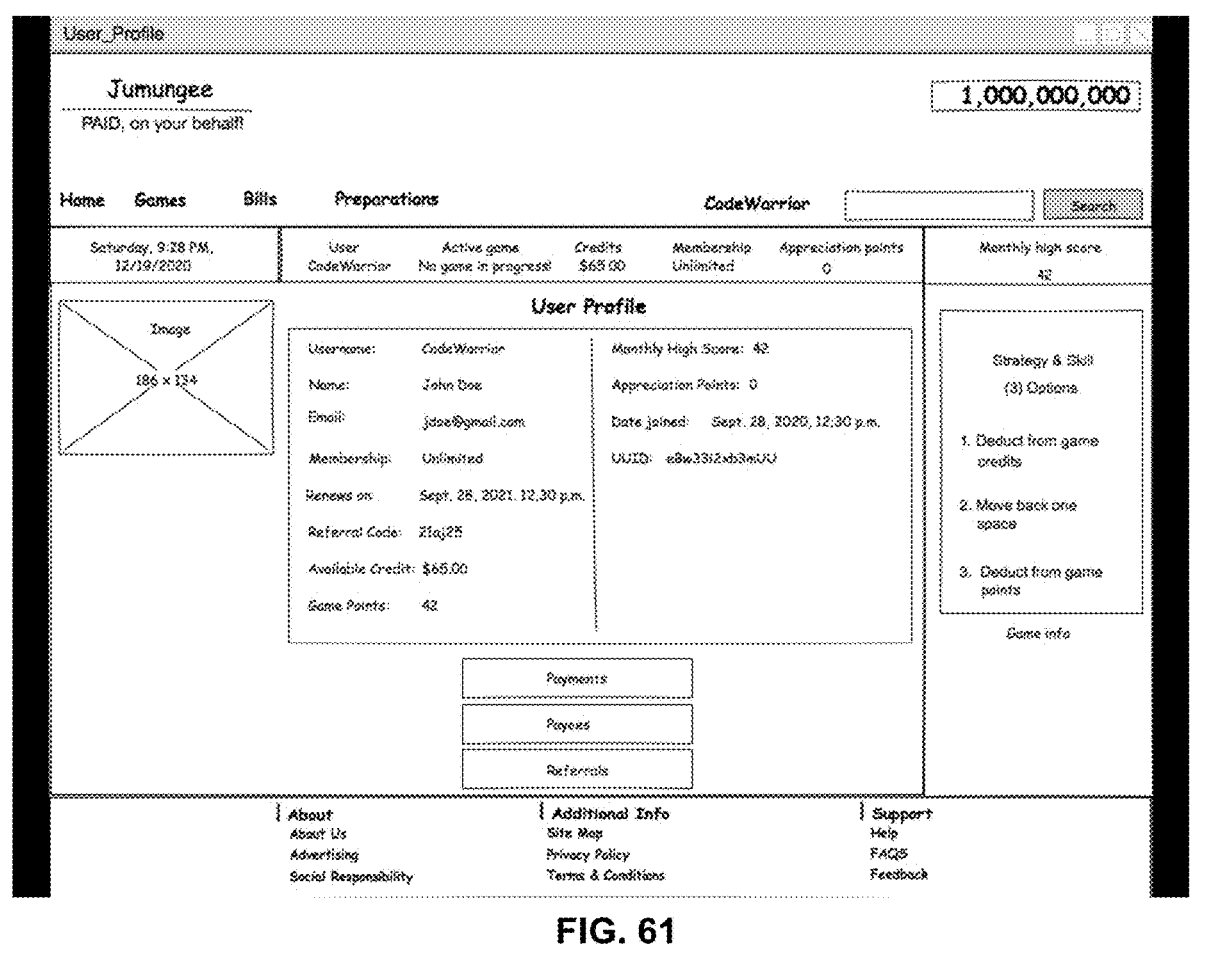
Figure 62:
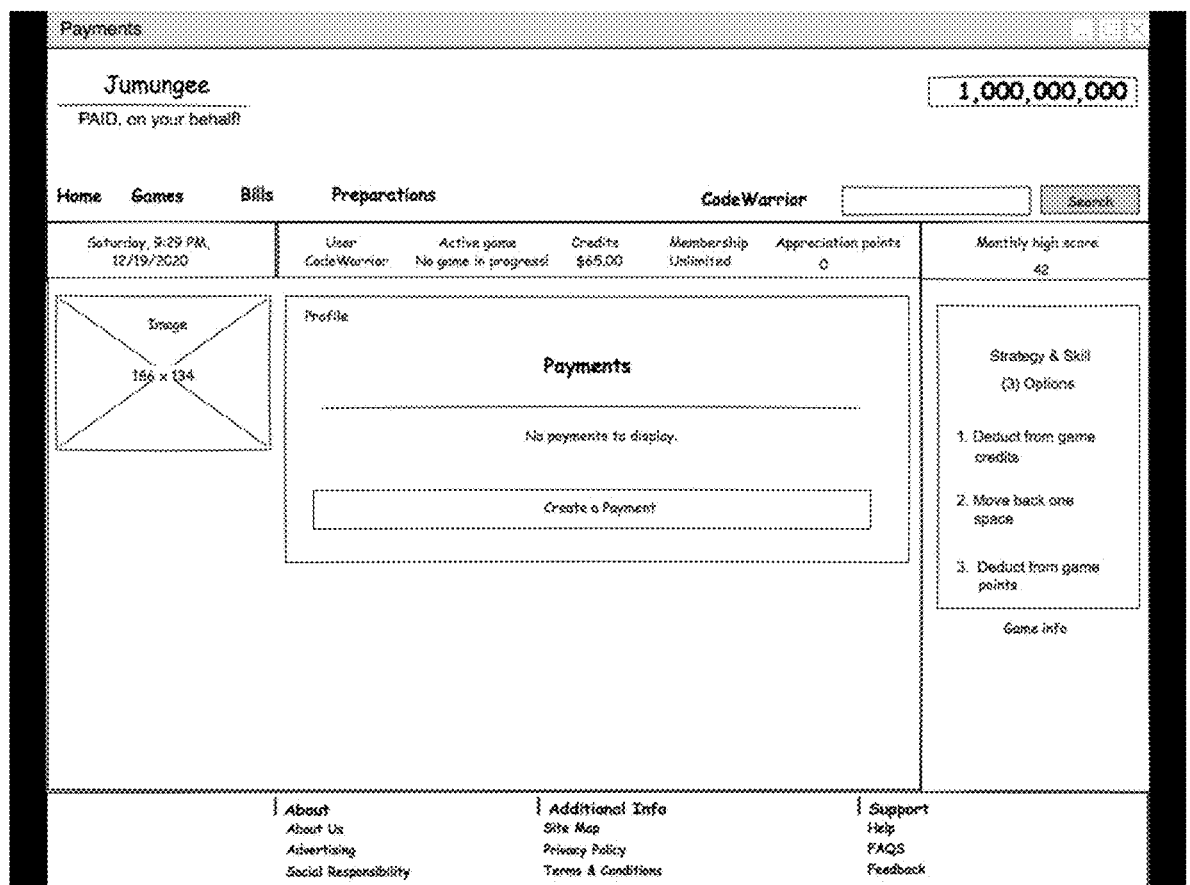
FIG. 62 shows a screen shot illustrating certain exemplary usability and functionality of the present disclosure.

In step S212, as illustrated in FIG. 61, the player is able to view important information about their account and if desire to click the payments button, the method advances to, for example, steps S214, as optionally illustrated in FIG. 62, and the player is able to select the create a payment button. The method advance to step S216.

Figure 63:
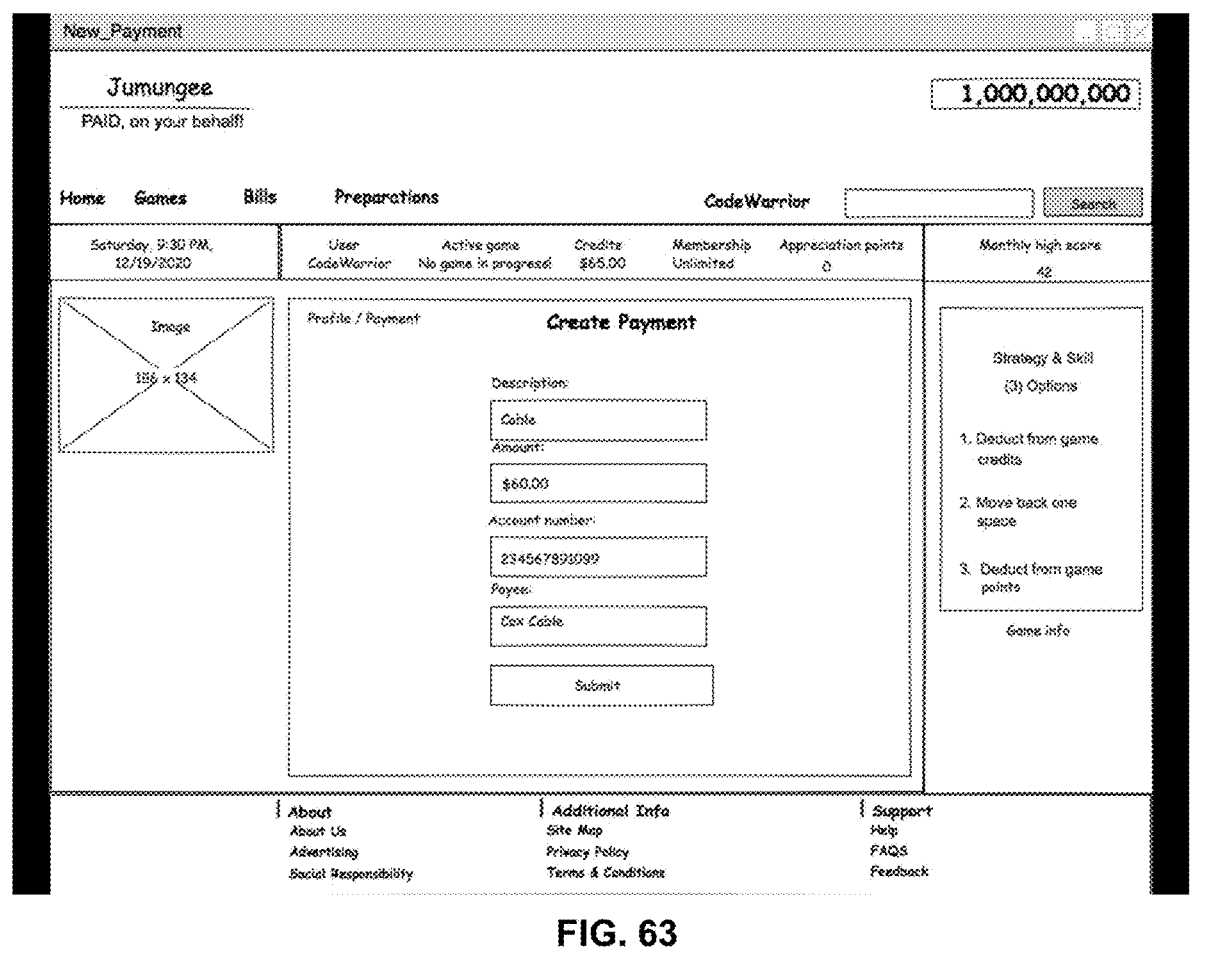

In step S216, the player is able to enter information regarding the create payment page, as illustrated in FIG. 63, the player is able to select the submit button. The method advance to step S218.

Figure 64:
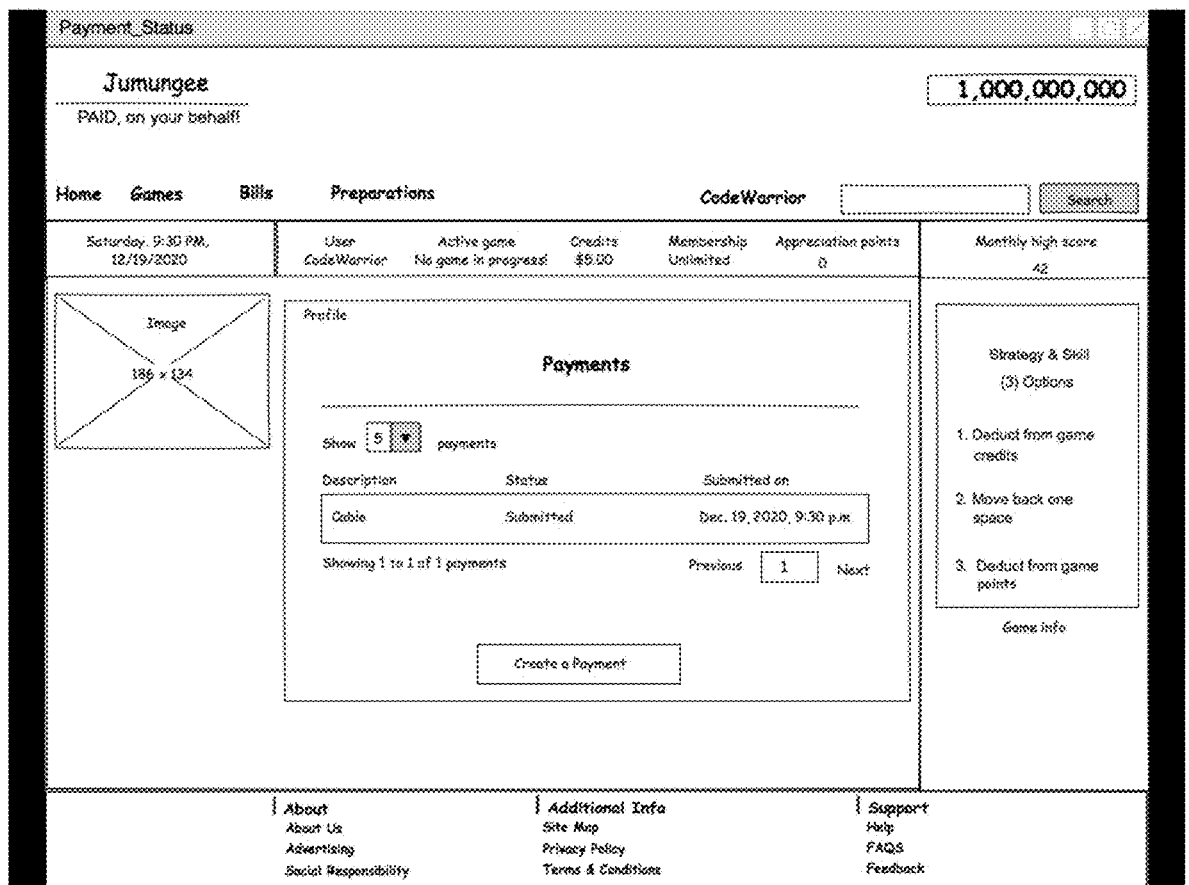
FIG. 64 shows a screen shot illustrating certain exemplary usability and functionality of the present disclosure.

In step S218, as illustrated in FIG. 64, the player is directed to the payment status page to confirm that the payment entered was included. To continue to add new payments the player, may optionally select the create a payment button. The method advance to step S220.

In step 220, as illustrated in FIGS. 65-68. The player is able to see the status of their bill, which is submitted, received, processing, and fulfilled. The method advance to step S222.

Figure 69:
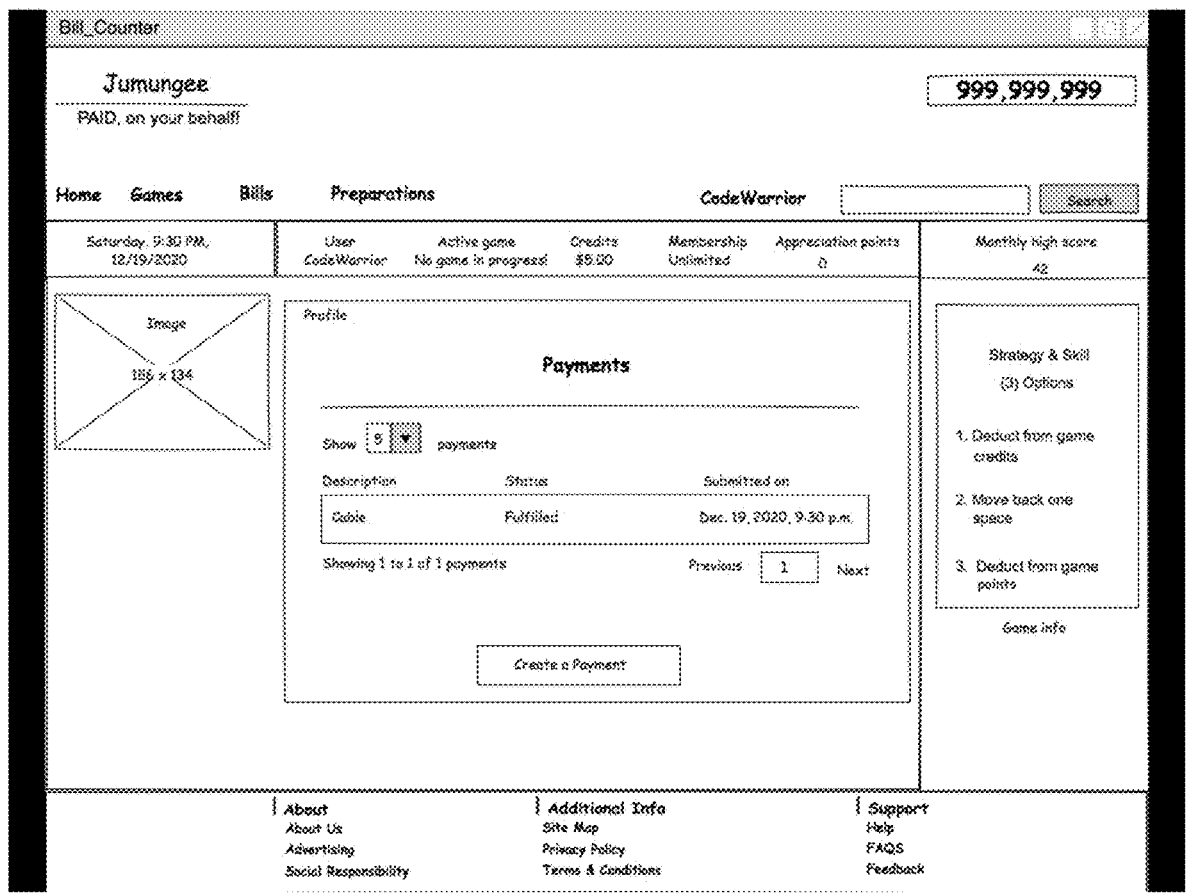
FIG. 69 shows a screen shot illustrating certain exemplary usability and functionality of the present disclosure.

In step S222, the bill counter has decreased by one in the upper right corner, as illustrated in FIG. 69. The method advance to step S224.

Figure 70:
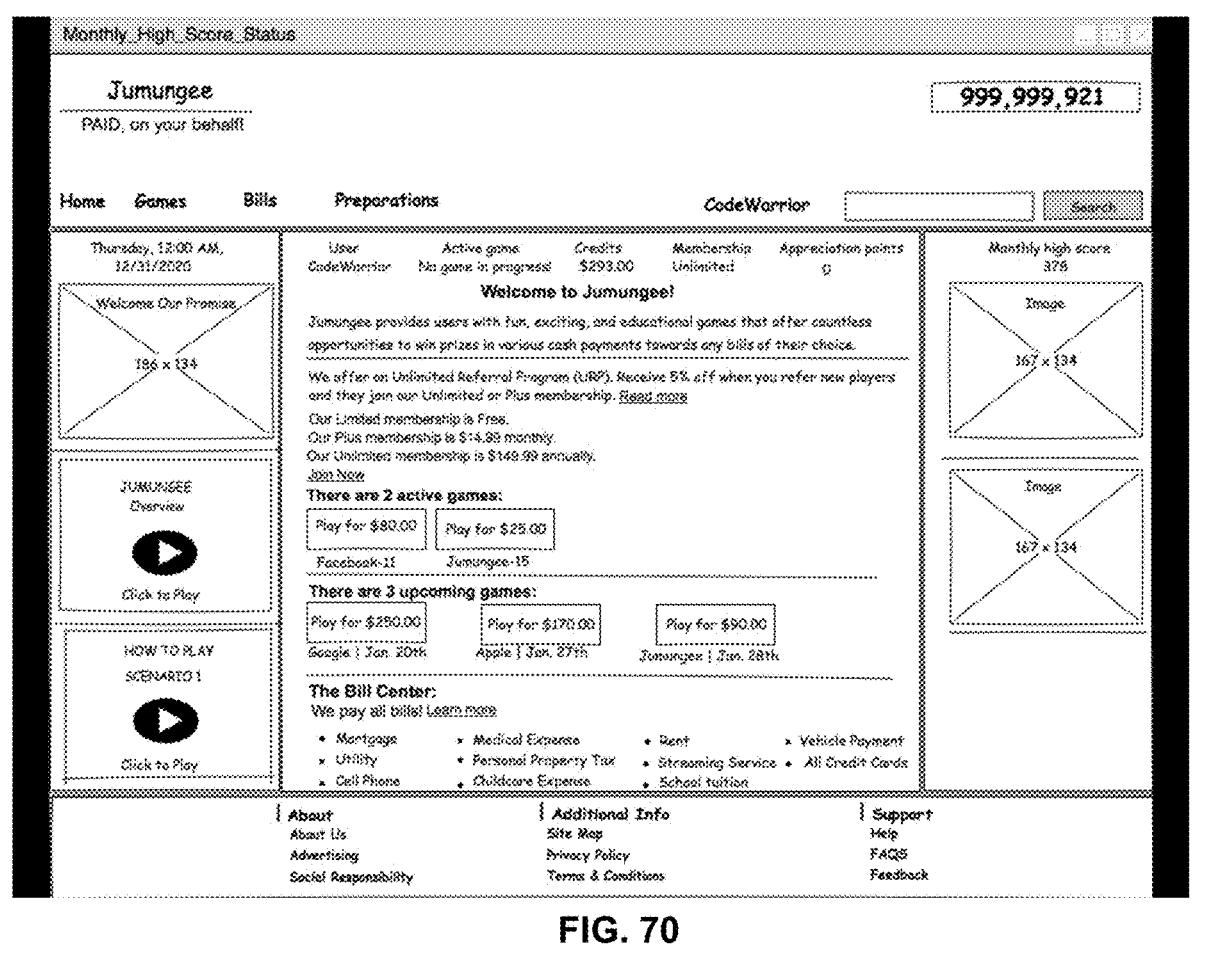

In step S224, the player has collected games points for the month that's transferred to the Monthly High Score, as illustrated in FIG. 70. The method advance to step S226.

Figure 71:
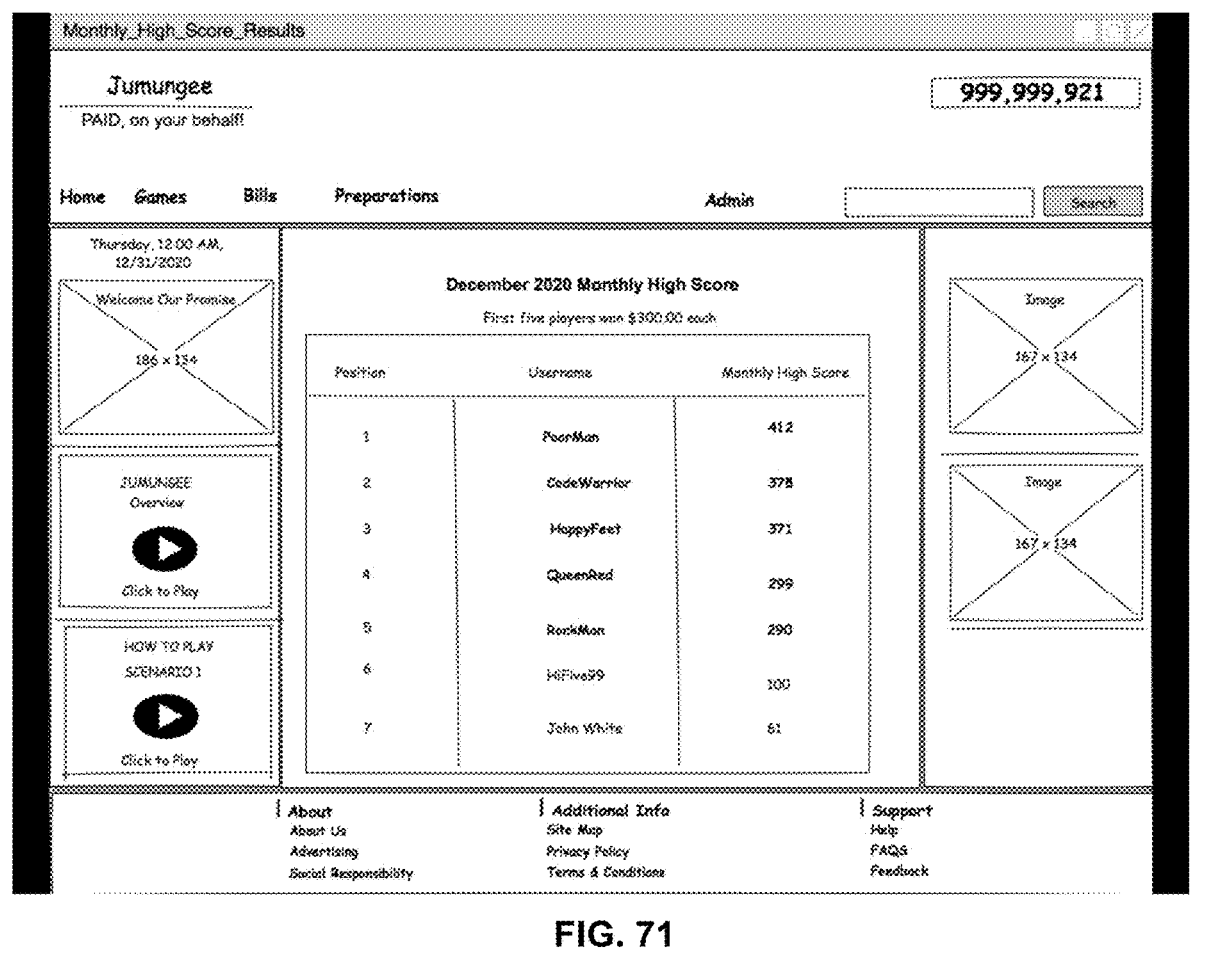

In step S226, the winners are determined, as illustrated in FIG. 71. FIG. 71 represents an exemplary summary page. The method advance to step S228.

Figure 72:
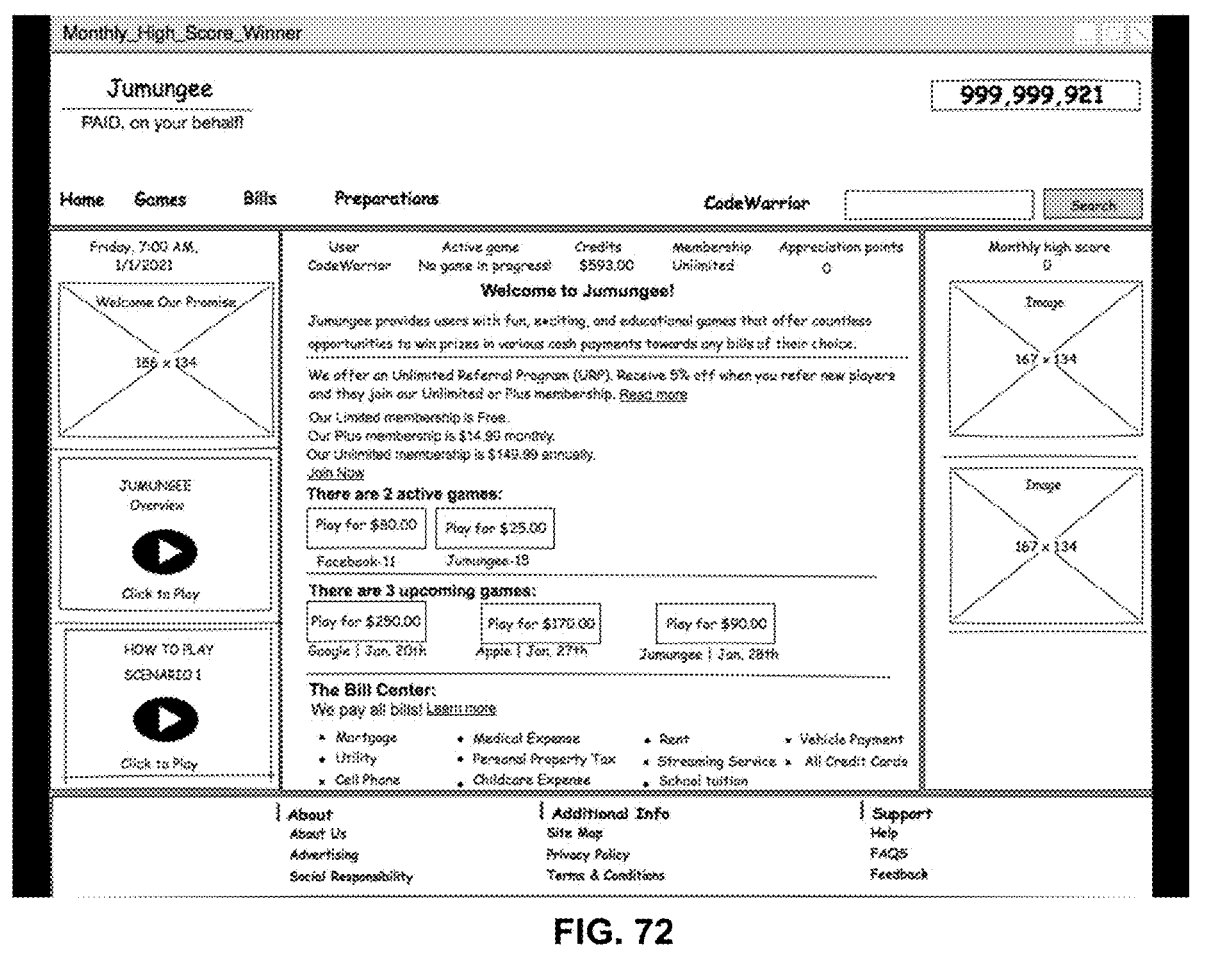

In step S228, the player has received their winnings credits from the Monthly High Score Game, as illustrated in FIG. 72. The method advance to step S230.

Figure 73:
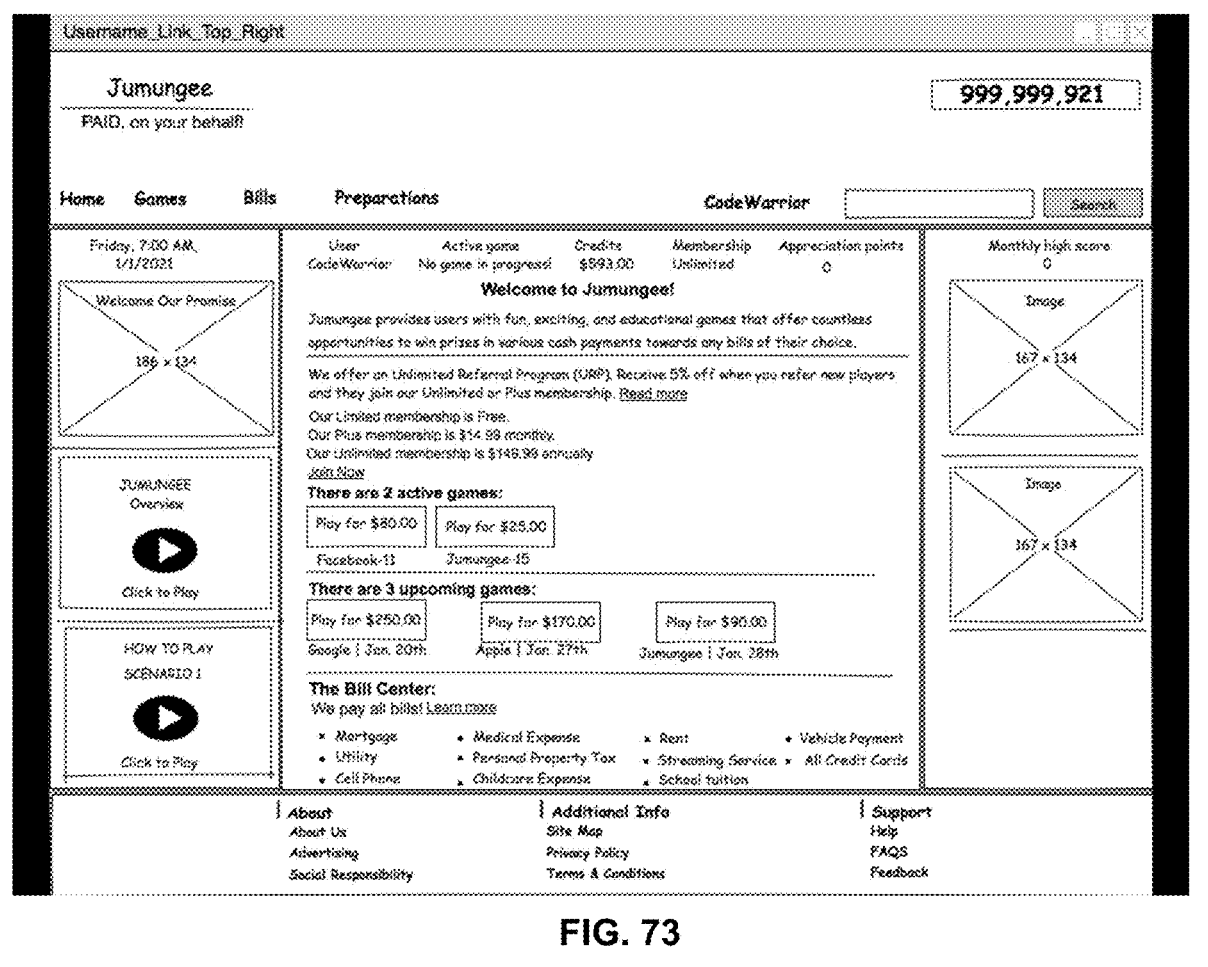

In step S230, as illustrated in FIG. 73. The player can select the username link top right. The method advance to step S232.

Figure 74:
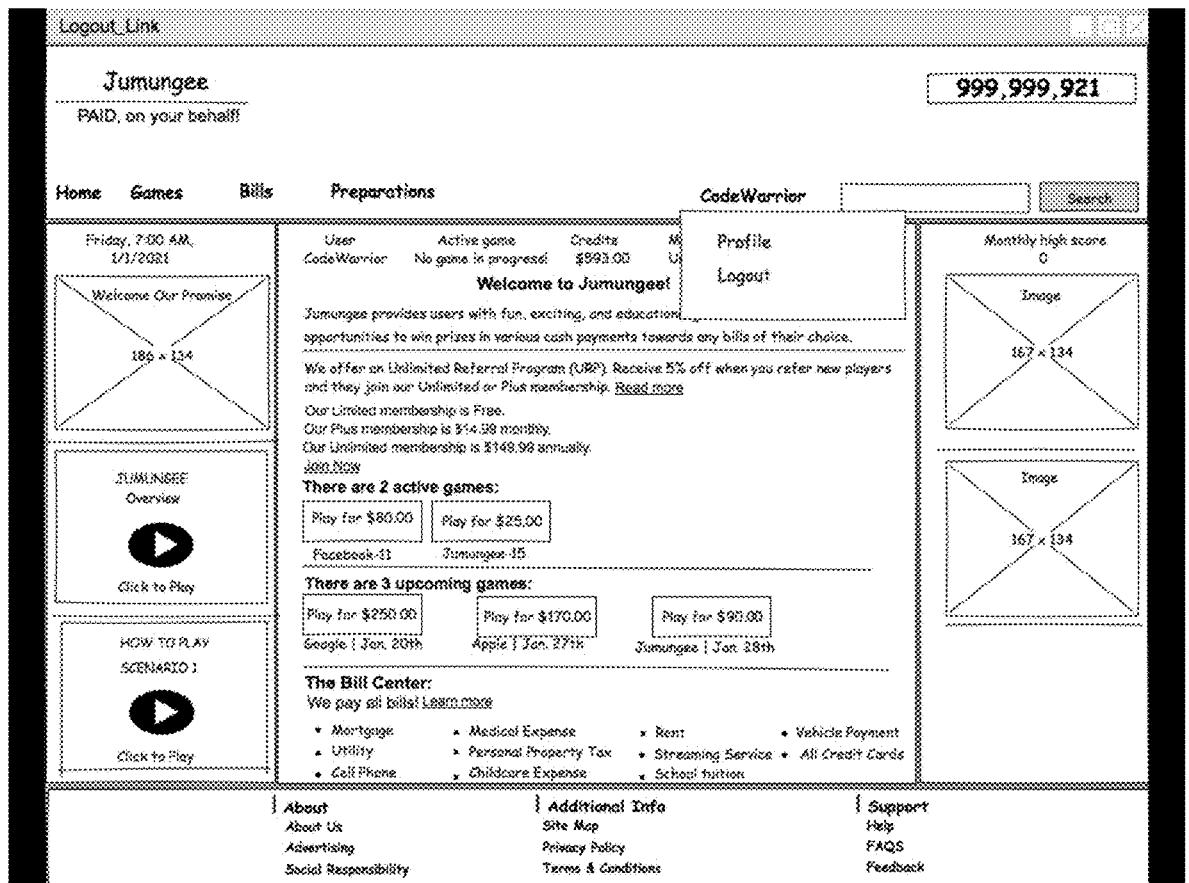
FIG. 74 shows a screen shot illustrating certain exemplary usability and functionality of the present disclosure.

In step 232, the player is logging out, as illustrated in FIG. 74. The method advance to step S234.

In step S234, the player has logged out, as illustrated in FIG. 75. FIG. 75 represents an exemplary logged out page, on this page members will receive visual clarification that they have successfully logged out of the website.

At this point, the method may optionally end.

FIG. 12 represents an exemplary homepage 200. In various exemplary embodiments, all players will see an exemplary homepage, such as, for example, homepage 200, when arriving at the website. This page illustrates an optional main page of the website. As illustrated on this exemplary page, the systems and methods of the present disclosure may optionally state, among other things, promise to players. If included, presentation of this information is to ensure players that their business is valued and reiterate a commitment to provide players with a desired degree of service. Jumungee is committed to providing players with fun, exciting, and educational games that allow them multiple opportunities to win prizes in credits or cash payments towards any bills of their choice.

In various exemplary embodiments, players may optionally sign up for the free account. If players would like they can purchase a subscription or membership. In certain exemplary embodiments, the players may purchase 1 of 2 subscriptions or memberships. The subscriptions or memberships that are offered are plus and unlimited. Players can upgrade anytime and only pay the difference of the price amount. In the middle of the exemplary page, the systems and methods of the present disclosure show games that are, currently available to play, and games that are coming soon. Underneath it is the bill center listing some of the bills that the systems and methods of the present disclosure pay. Jumungee pays all bills, the two requirements are the payee must receive online payment and have a valid account number. Click the Register link on the navigation bar.

FIG. 13 illustrates an optional new account options page. On this exemplary page, all new players will be required to register for the first time to create a new account. Click one of the join buttons.

FIG. 14 illustrates an optional limited account sign up page. On this exemplary page, new players must enter in all required information, and agree to terms. Click the sign up button.

FIG. 15 illustrates an optional plus or unlimited account sign up page. On this exemplary page, new players must enter in all required information, and agree to terms. Click the proceed to payment button.

FIG. 16 illustrates an optional login page. On this exemplary page, returning players may login to their accounts. Click the login button.

FIG. 17 illustrates an optional unlimited account payment page. On this exemplary page, players may enter their credit card information. Click the pay button.

FIG. 18 illustrates an optional email activation link page. On this exemplary page, all new players will receive this message informing how to activate their account. Click the activation link that was emailed.

FIG. 19 illustrates a login member page. The player has registered or login to their account. Click the games link on the navigation bar.

FIG. 20 illustrates an optional $75.00_01_start game page. On this exemplary page, players may optionally be presented with, for example, information presented on the top row displays, date and time, username, game status, winning game credits, membership level, and appreciation points. In the middle of the page is the start button to begin the game, and the game board will have 25 questions to be answered. To the right is an optional illustration of the scoreboard column that displays the monthly high score, name of the game, total game prize credits, game points earned per game, the point multiplier, and the timer that starts at 25 seconds and count down to zero. Click the start button. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 21 illustrates an optional game list page. As illustrated, players may select from a range of games or prize credits of interest. Games or prize credits may optionally be listed as $50.00, $75.00, etc. Click the name of the game link for $75.00. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 22 illustrates an optional $75.00_01_category 01 page. On this exemplary page, players may optionally be presented with, for example, information presented on the top row displays, date and time, username, game status, winning game credits, membership level, appreciation points. As illustrated on this exemplary page, players will have to select a category. The category headings may optionally be breakfast, history, miscellaneous, sandwiches. To the right is an optional illustration of the scoreboard column that displays the monthly high score, name of the game, total game prize credits, game points earned per game, the point multiplier, and the timer that starts at 25 seconds and count down to zero. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 23 illustrates an optional $75.00_01_question 01 page. On this exemplary page, players may optionally be presented with, for example, information presented on the top row displays, date and time, username, game status, winning game credits, membership level, and appreciation points. In the middle of the page is a question that have four options, select the correct answer. To the right is an optional illustration of the scoreboard column that displays the monthly high score, name of the game, total game prize credits, game points earned per game, the point multiplier, and the timer that starts at 25 seconds and count down to zero. The system will determine the next step after question 1 is answered correctly, incorrectly or the timer expires.

On this page, question 1 is being asked. Question number 1 game piece is highlighted to represent the player is on question 1. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 24 illustrates an optional $75.00_01_answer 01 page. On this exemplary page, players may optionally be presented with, for example, information presented on the top row displays, date and time, username, game status, winning game credits, membership level, and appreciation points. In the middle of the page the correct answer has been selected.

To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on this exemplary page, the question has been answered. Question number 1 game piece is highlighted to represent the player is on question 1. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 25 illustrates an optional incorrect answer 01 page. On this exemplary page, players may optionally be presented with, for example, information presented on the top row displays, date and time, username, game status, winning game credits, membership level, and appreciation points. In the middle of the page the player has selected the incorrect answer. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on these exemplary pages, the question has been answered incorrectly. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 26 illustrates an optional timer expired 01 page. On this exemplary page, players may optionally be presented with, for example, information presented on the top row displays, date and time, username, game status, winning game credits, membership level, and appreciation points. In the middle of the page the timer has expired. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on these exemplary pages, the timer has expired. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 27 illustrates an optional incorrect answer 01-02 page. On this exemplary page, players may optionally be presented with, for example, information presented on the top row displays, date and time, username, game status, winning game credits, membership level, and appreciation points. In the middle of the page is an incorrect message. To the right is an optional illustration of the, scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

On this page, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 28 illustrates an optional timer expired 01-02 page. On this exemplary page, players may optionally be presented with, for example, information presented on the top row displays, date and time, username, game status, winning game credits, membership level, and appreciation points. In the middle of the page is a timer expired message. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

On this page, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 29 illustrates an optional options/penalties page. On this exemplary page, players may optionally be presented with, for example, information presented on the top row displays, date and time, username, game status, winning game credits, membership level, and appreciation points. In the middle of the page are the available options/penalties at the current time of the game in progress. For example, the only available option/penalty is option 1 deduct from game credits. To the right is an optional illustration of the scoreboard column that displays the monthly high score, name of the game, total game prize credits, game points earned per game, the point multiplier, and the timer that starts at 25 seconds and count down to zero. The system will determine the next step after option/penalty one is selected.

On this page, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 30 illustrates an optional deduct from game credits page. On this exemplary page, players may optionally be presented with, for example, information presented on the top row displays, date and time, username, game status, winning game credits, membership level, and appreciation points. To the right is an optional illustration of the scoreboard column that displays the monthly high score, name of the game, total game prize credits which is no longer $75.00 but $70.00, game points earned per game, the point multiplier, and the timer that starts at 25 seconds and count down to zero. And the player remains on position 1 of the gameboard which is highlighted. The systems and methods of the present disclosure to a subsequent or next webpage.

FIG. 31 illustrates an optional $75.00_01_category 01 page. On this exemplary page, players may optionally be presented with, for example, information presented on the top row displays, date and time, username, game status, winning game credits, membership level, and appreciation points. As illustrated on this exemplary page, players will have to select a category. The category headings may optionally be breakfast, history, miscellaneous, sandwiches. To the right is an optional illustration of the scoreboard column that displays the monthly high score, name of the game, total game prize credits, game points earned per game, the point multiplier, and the timer that starts at 25 seconds and count down to zero. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 32 illustrates an optional $75.00_01_question 02 page. On this exemplary page, players may optionally be presented with, for example, information presented on the top row displays, date and time, username, game status, winning game credits, membership level, and appreciation points. In the middle of the page is a question that have four options, select the correct answer. To the right is an optional illustration of the scoreboard column that displays the monthly high score, name of the game, total game prize credits, game points earned per game, the point multiplier, and the timer that starts at 25 seconds and count down to zero. The system will determine the next step after question 1 is answered correctly, incorrectly or the timer expires.

On this page, question 1 is being asked. Question number 1 game piece is highlighted to represent the player is on question 1. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 33 illustrates an optional $75.00_01_category 02 page. On this exemplary page, players may optionally be presented with, for example, information presented on the top row displays, date and time, username, game status, winning game credits, membership level, appreciation points, monthly high score. As illustrated on this exemplary page, players will have to select a category. The category headings may optionally be breakfast, history, miscellaneous, sandwiches. This page is a continuation from FIG. 24. The player has advanced in position and points. The player is on position 2 and has 2 points. To the right is an optional illustration of the scoreboard column that displays the monthly high score, name of the game, total game prize credits, game points earned per game, the point multiplier, and the timer that starts at 25 seconds and count down to zero. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 34 illustrates an optional $75.00_01_answer 02 page. On this exemplary page, players may optionally be presented with, for example, information presented on the top row displays, date and time, username, game status, winning game credits, membership level, and appreciation points. In the middle of the page the correct answer has been selected.
To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on this exemplary page, the question has been answered. Question number 1 game piece is highlighted to represent the player is on question 1. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 35 illustrates an optional $75.00_01_category 02 page. On this exemplary page, players may optionally be presented with, for example, information presented on the top row displays, date and time, username, game status, winning game credits, membership level, and appreciation points. As illustrated on this exemplary page, players will have to select a category. The category headings may optionally be breakfast, history, miscellaneous, sandwiches. This page is a continuation from FIG. 34. The player has advanced in position and points. The player is on position 2 and has 2 points. To the right is an optional illustration of the scoreboard column that displays the monthly high score, name of the game, total game prize credits, game points earned per game, the point multiplier, and the timer that starts at 25 seconds and count down to zero. In addition, the system has been incorporated with the strategy and skill methods.
The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 36 illustrates an optional $75.00_01_category 25 page. On this exemplary page, players may optionally be presented with, for example, information presented on the top row displays, date and time, username, game status, winning game credits, membership level, and appreciation points. As illustrated on this exemplary page, players will have to select a category. The category headings may optionally be breakfast, history, miscellaneous, sandwiches. To the right is an optional illustration of the scoreboard column that displays the monthly high score, name of the game, total game prize credits, game points earned per game, the point multiplier, and the timer that starts at 25 seconds and count down to zero. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 37 illustrates an optional $75.00_01_question 25 page. On this exemplary page, players may optionally be presented with, for example, information presented on the top row displays, date and time, username, game status, winning game credits, membership level, and appreciation points. In the middle of the page is a question that have four options, select the correct answer. To the right is an optional illustration of the scoreboard column that displays the monthly high score, name of the game, total game prize credits, game points earned per game, the point multiplier, and the timer that starts at 25 seconds and count down to zero. The system will determine the next step after question 25 is answered correctly, incorrectly or the timer expires.

On this page, question 25 is being asked. Question number 25 game piece is highlighted to represent the player is on question 25. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 38 illustrates an optional $75.00_01_answer 25 page. On this exemplary page, players may optionally be presented with, for example, information presented on the top row displays, date and time, username, game status, winning game credits, membership level, and appreciation points. In the middle of the page the correct answer has been selected.
To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on this exemplary page, the question has been answered. Question number 25 game piece is highlighted to represent the player is on question 25. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 39 illustrates an optional incorrect answer 25-01 page. On this exemplary page, players may optionally be presented with, for example, information presented on the top row displays, date and time, username, game status, winning game credits, membership level, and appreciation points. In the middle of the page the player has selected the incorrect answer. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on these exemplary pages, the question has been answered incorrectly. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 40 illustrates an optional timer expired 25-01 page. On this exemplary page, players may optionally be presented with, for example, information presented on the top row displays, date and time, username, game status, winning game credits, membership level, and appreciation points. In the middle of the page the timer has expired. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

As illustrated on these exemplary pages, the timer has expired. In addition, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 41 illustrates an optional incorrect answer 25-02 page. On this exemplary page, players may optionally be presented with, for example, information presented on the top row displays, date and time, username, game status, winning game credits, membership level, and appreciation points. In the middle of the page is an incorrect message. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

On this page, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 42 illustrates an optional timer expired 25-02 page. On this exemplary page, players may optionally be presented with, for example, information presented on the top row displays, date and time, username, game status, winning game credits, membership level, and appreciation points. In the middle of the page is a timer expired message. To the right is an optional illustration of the scoreboard column that displays the monthly high score, name of the game, total game prize credits, game points earned per game, the point multiplier, and the timer that starts at 25 seconds and count down to zero. The system will determine the next step after the question is answered correctly, incorrectly or the timer expires.

On this page, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 43 illustrates an optional options/penalties page. On this exemplary page, players may optionally be presented with, for example, information presented on the top row displays, date and time, username, game status, winning game credits, membership level, appreciation points. In the middle of the page are the available options/penalties at the current time of the game in progress. For example, all 3 options/penalties apply, option 1 deduct from game credits, option 2 move back 1 space, or option 3 deduct from game points. To the right is an optional illustration of the scoreboard column that displays the monthly high score, name of the game, total game prize credits, game points earned per game, the point multiplier, and the timer that starts at 25 seconds and count down to zero. The system will determine the next step after one of the options/penalties is selected.

On this page, the system has been incorporated with the strategy and skill methods. The 3 options/penalties of the strategy and skill methods for players answering the questions incorrectly or the timer expires are option 1 deduct from the game credits, option 2 move back 1 space, or option 3 deduct from game points. The systems and methods of the present disclosure to a subsequent or next webpage.

FIG. 44 illustrates an optional deduct from game credits page. On this exemplary page, players may optionally be presented with, for example, information presented on the top row displays, date and time, username, game status, winning game credits, membership level, and appreciation points. To the right is an optional illustration of the scoreboard column that displays the monthly high score, name of the game, total game prize credits which is no longer $65.00 but $60.00, game points earned per game, the point multiplier, and the timer that starts at 25 seconds and count down to zero. And the player remains on gameboard 25 which is highlighted. As illustrated on this exemplary page, players will have to select a category.

FIG. 45 illustrates an optional move back one space page. On this exemplary page, players may optionally be presented with, for example, information presented on the top row displays, date and time, username, game status, winning game credits, membership level, and appreciation points. To the right is an optional illustration of the scoreboard column that displays the monthly high score, name of the game, total game prize credits which is $65.00, game points earned per game, the point multiplier, and the timer that starts at 25 seconds and count down to zero. For example, the player has return to position 24 on the gameboard which is highlighted. As illustrated on this exemplary page, players will have to select a category.

FIG. 46 illustrates an optional deduct from game points page. On this exemplary page, players may optionally be presented with, for example, information presented on the top row displays, date and time, username, game status, winning game credits, membership level, and appreciation points. To the right is an optional illustration of the scoreboard column that displays the monthly high score, name of the game, total game prize credits which is $65.00, game points earned per game, the point multiplier, and the timer that starts at 25 seconds and count down to zero. For example, the player has 39 points after 1 point was deducted from the 40 game points. As illustrated on this exemplary page, players will have to select a category.

FIG. 47 illustrates an optional $75.00_01_ game over_winner page. On this exemplary page, players may optionally be presented with, for example, presented on the top row displays, date and time, username, game status, winning game credits, membership level, and appreciation points. In the middle of the page is a congratulations message for the winners. To the right is an optional illustration of the scoreboard column that displays the monthly high score, name of the game, total game prize credits, game points earned per game, the point multiplier, and the timer that starts at 25 seconds and count down to zero.

In addition, the systems and methods of the present disclosure to a subsequent or next webpage.

FIG. 48 illustrates an optional $75.00_01_ game over_loser page. On this exemplary page, players may optionally be presented with, for example, presented on the top row displays, date and time, username, game status, winning game credits, membership level, and appreciation points. In the middle of the page is a game over message for the losers. To the right is an optional illustration of the scoreboard column that displays the monthly high score, name of the game, total game prize credits, game points earned per game, the point multiplier, and the timer that starts at 25 seconds and count down to zero.

In addition, the systems and methods of the present disclosure to a subsequent or next webpage.

FIG. 49 illustrates an optional monthly high score page. On this exemplary page, players may optionally be presented with, for example, presented on the top row displays, date and time, username, game status, winning game credits, membership level, and appreciation points. In the middle of the page is a message about the game points earned will transfer to the monthly high score.

To the right is an optional illustration of the scoreboard column that displays the monthly high score, name of the game, total game prize credits, game points earned per game, the point multiplier, and the timer that starts at 25 seconds and count down to zero.

FIG. 50 illustrates an optional username link top right page. On this exemplary page, players can select the username link top right beside the search box to advance to the profile page.

FIG. 51 illustrates an optional username link page. On this exemplary page, players can select the username link under the user heading across the top of the page to advance to the user profile page.

FIG. 52 illustrates an optional profile link page. On this exemplary page, players can click the profile link to advance to the user profile page.

FIG. 53 illustrates an optional user profile page. On this exemplary page, players can review important information about their account. Click the payees button.

FIG. 54 illustrates an optional payees page. On this exemplary page, players will select the create a payee button to create new payees. Click the create a payee button.

FIG. 55 illustrates an optional new payee page. On this exemplary page, enter the required information. Click the submit button.

FIG. 56 illustrates an optional bills page. On this exemplary page, players will be able to see all of the vendors listed to their account. Click the create a payee button to add another payee.

FIG. 57 illustrates an optional username link page. On this exemplary page, players can select the username link under the user heading across the top of the page to advance to the user profile page.

FIG. 58 illustrates an optional profile link page. On this exemplary page, players can click the profile link to advance to the user profile page.

FIG. 59 illustrates an optional username link top right page. On this exemplary page, players can select the username link top right beside the search box to advance to the profile link page.

FIG. 60 illustrates an optional profile link page. On this exemplary page, players can select the profile link to advance to the user profile page.

FIG. 61 illustrates an optional user profile page. On this exemplary page, players can review important information about their account. Click the payments button.

FIG. 62 illustrates an optional payments page. On this exemplary page, players will select the create a payment button to create new payment. Click the create a payment button.

FIG. 63 illustrates an optional new payment page. On this exemplary page, enter the required information. Click the submit button.

FIG. 64 illustrates an optional payment status page. On this exemplary page, players will be notified by one of four payment status which includes submitted, received, processing, and fulfilled.

Figure 65:
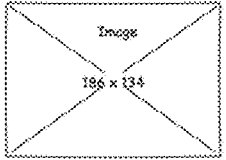
FIG. 65 shows a screen shot illustrating certain exemplary usability and functionality of the present disclosure.

FIG. 65 illustrates an optional submitted page. On this exemplary page, players can view the submitted status.

Figure 66:
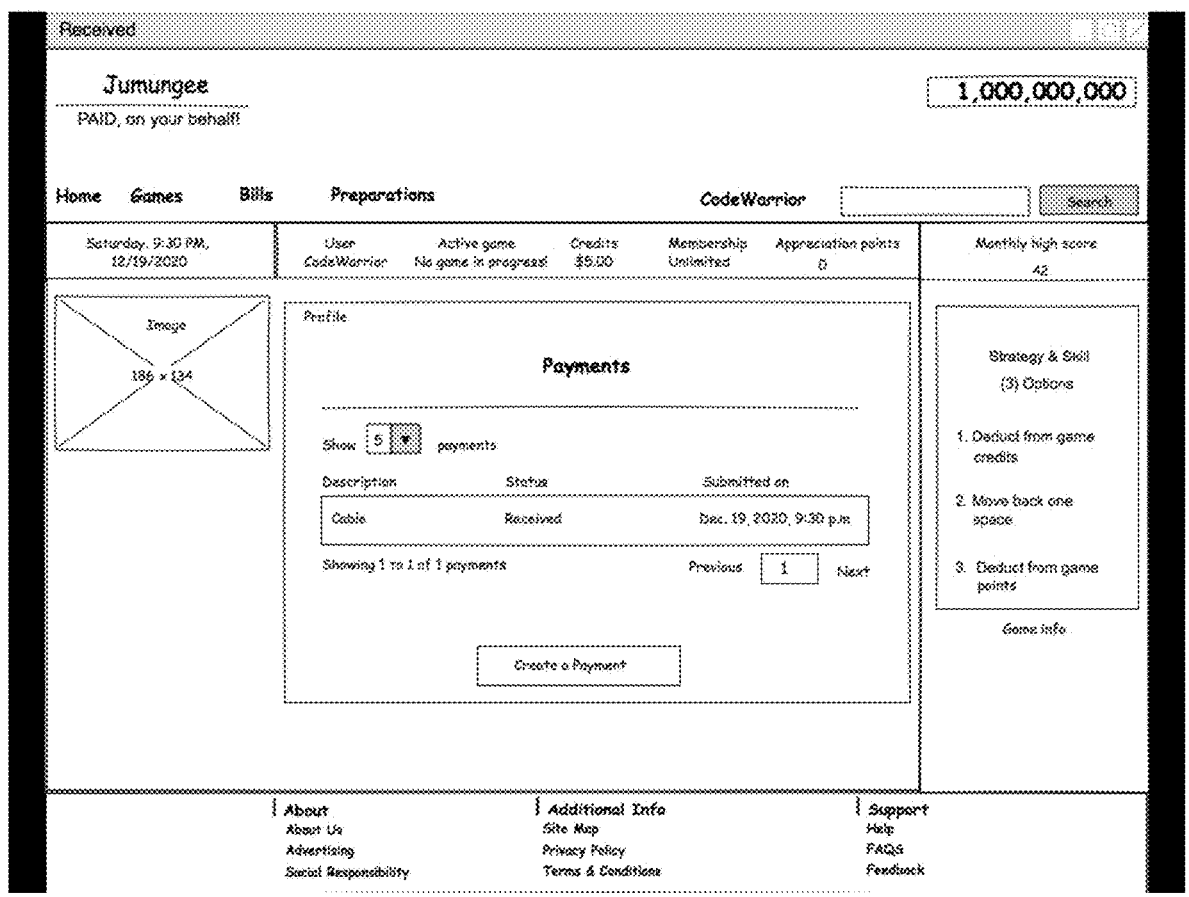
FIG. 66 shows a screen shot illustrating certain exemplary usability and functionality of the present disclosure.

FIG. 66 illustrates an optional received page. On this exemplary page, players can view the received status.

Figure 67:
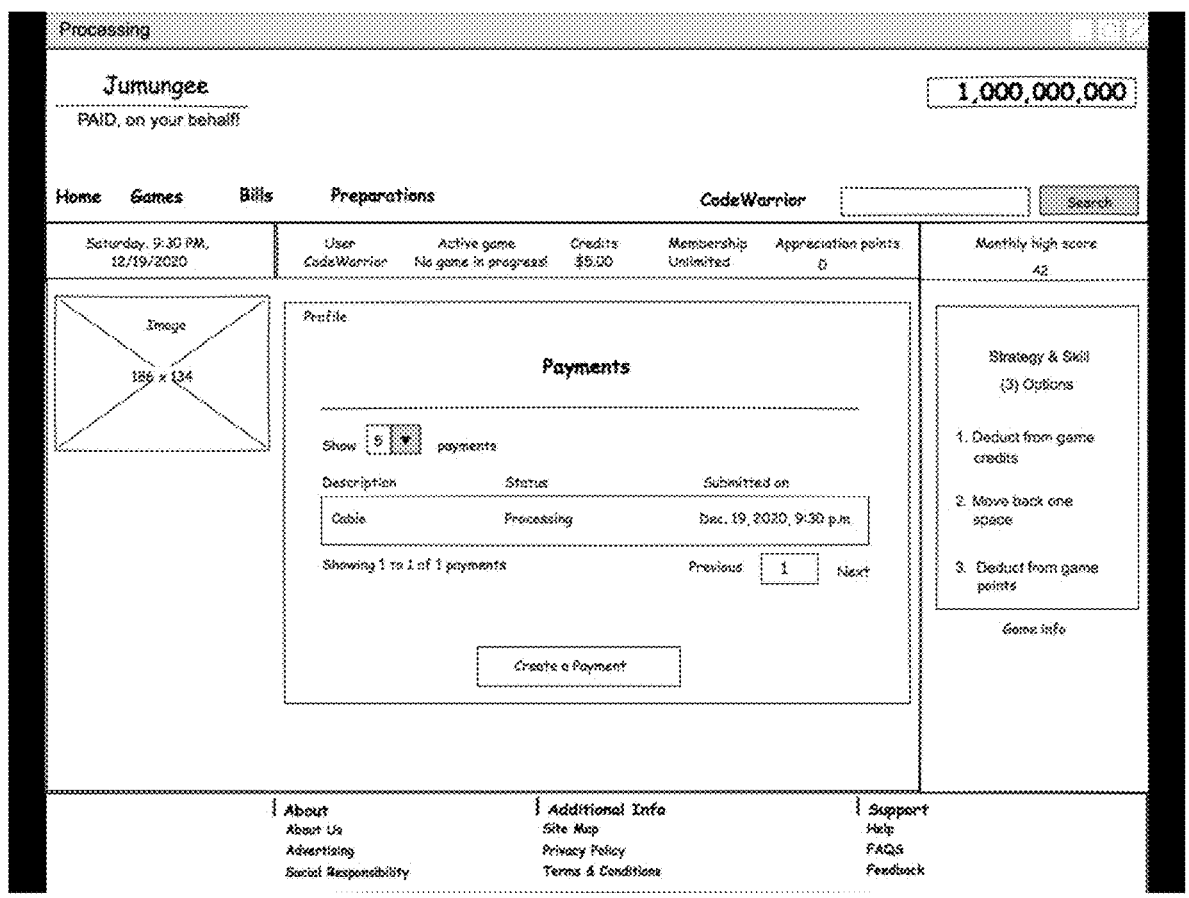
FIG. 67 shows a screen shot illustrating certain exemplary usability and functionality of the present disclosure.

FIG. 67 illustrates an optional processing page. On this exemplary page, players can view the processing status.

Figure 68:
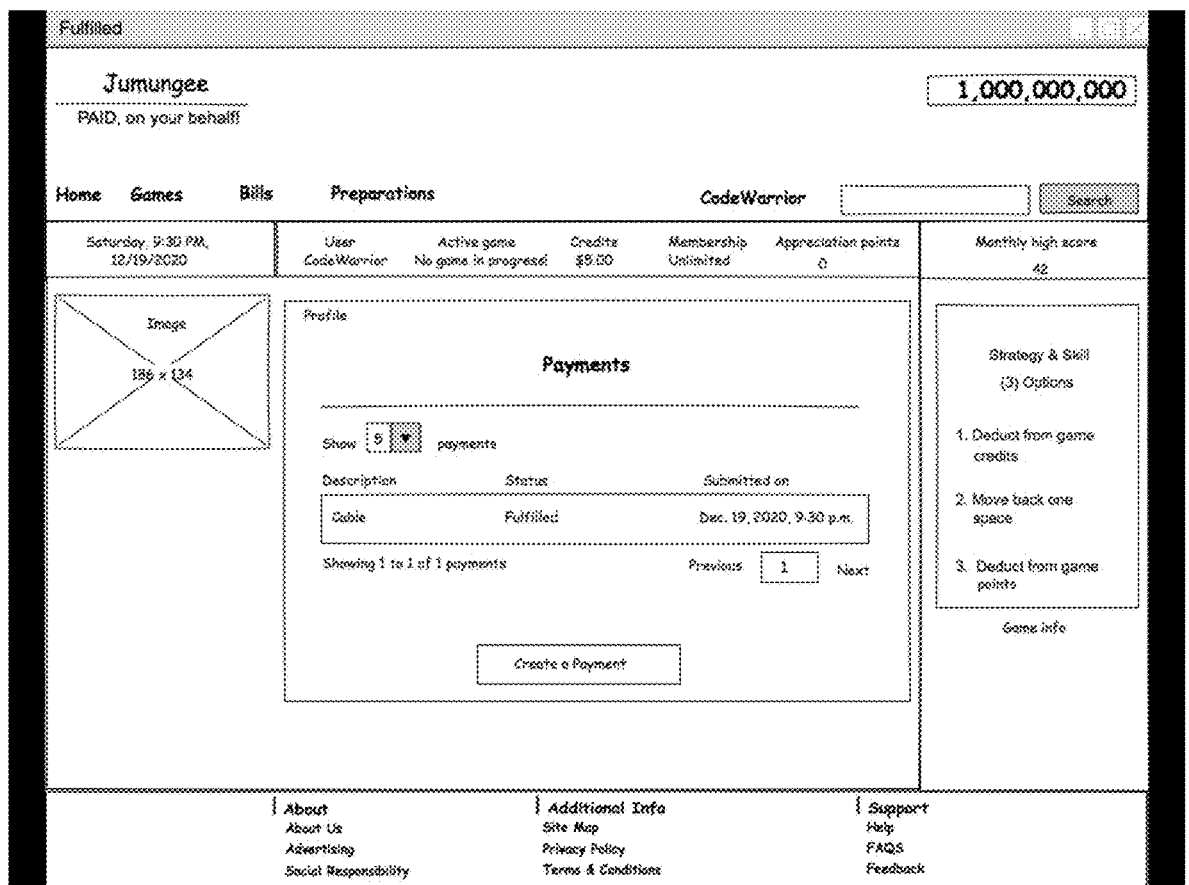
FIG. 68 shows a screen shot illustrating certain exemplary usability and functionality of the present disclosure.

FIG. 68 illustrates an optional fulfilled page. On this exemplary page, players can view the fulfilled status.

FIG. 69 illustrates an optional bill counter page. On this exemplary page, players will see the bill counter decrease by the number of bills paid.

FIG. 70 illustrates an optional monthly high score status page. On this exemplary page, players will view an increase in their monthly high score as they continue to generate game points.

FIG. 71 illustrates an optional monthly high score results page. On this exemplary page, view the results monthly.

FIG. 72 illustrates an optional monthly high score winner page. On this exemplary page, players that win the monthly high score we view an increase in their credits that will be use to pay any bills of their choice.

FIG. 73 illustrates an optional username link top right page. On this exemplary page, players can select the username link top right beside the search box.

FIG. 74 illustrates an optional logout link page. On this exemplary page, players can select the logout link to logout.

FIG. 75 illustrates an optional logged out page. On this exemplary page, players will receive visual clarification that they have successfully logged out of Jumungee.com.

Appreciation points are for players, subscribers, or members. Customers will receive them for providing us with important information and using the website. They will receive them for logging in one time a day and supplying us with feedback on our company and other companies. When customers reach 1000 points they can request a free gift or use the points to be transfer to the monthly high score.

In addition, the present disclosed presently systems and methods may optionally offer buy and sell of bills, insurance for bills, accept direct deposit, monthly financial group payouts, store, provide popular and new games, and offer appreciation and game points for purchase by individuals or companies. In addition, members are optionally able to submit questions along with answers to be included in the game "Jumungee" and they will receive a payment or credits towards any bills to be paid. The systems and methods of the present disclosure will alert members when they have broken-even while using our service. Instead of offering the game amount as a prize, the systems and methods of the present disclosure could use points references in the process.

The systems and methods of the present disclosure may optionally be conveniently implemented using a conventional general purpose or a specialized digital computer or microprocessor programmed according to the teachings of the present disclosure, as will be apparent to those skilled in the computer art. Appropriate software coding can be prepared by knowledgeable programmers based on the teachings of the present disclosure, as will be apparent to those skilled in the software art. The disclosed systems and methods may also be implemented by the preparation of application specific integrated circuits or by interconnecting an appropriate network of conventional component circuits, as will be readily apparent to those skilled in the art based on the present disclosure.

The presently disclosed systems and methods includes software for controlling the hardware and or software of a general purpose or specialized computer or microprocessor and for enabling the computer or microprocessor to interact with a human player or other mechanism utilizing the results of the present invention. Such software may include, but is not limited to, device drivers, operating systems, and player applications. Data used by the software may optionally be retrieved from different sources (local or remote) and either permanently or temporarily stored (before, during, or after any processing) by utilizing any of text files, delimited files, database(s), or other storage techniques.

Included in the programming and/or software of the general purpose or specialized computer or microprocessor are software modules for implementing the teachings of the present invention.

While the presently disclosed systems and/or methods has been described in conjunction with the exemplary embodiments outlined above, the foregoing description of exemplary embodiments of the presently disclosed systems and/or methods, as set forth above, are intended to be illustrative, not limiting and the fundamental disclosed systems and/or methods should not be considered to be necessarily so constrained. It is evident that the presently disclosed systems and/or methods is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems and/or methods. The upper and lower limits of these smaller ranges may independently be included in the smaller ranges and is also encompassed within the presently disclosed systems and/or methods, subject to any specifically excluded limit in the stated range. Where the stated range includes one or both of the limits, ranges excluding either or both of those included limits are also included in the presently disclosed systems and/or methods.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems and/or methods belongs.

In addition, it is contemplated that any optional feature of the inventive variations described herein may optionally be set forth and claimed independently, or in combination with any one or more of the features described herein.

Accordingly, the foregoing description of exemplary embodiments will reveal the general nature of the presently disclosed systems and/or methods, such that others may, by applying current knowledge, change, vary, modify, and/or adapt these exemplary, non-limiting embodiments for various applications without departing from the spirit and scope of the presently disclosed systems and/or methods and elements or methods similar or equivalent to those described herein can be used in practicing the presently disclosed systems and/or methods. Any and all such changes, variations, modifications, and/or adaptations should and are intended to be comprehended within the meaning and range of equivalents of the disclosed exemplary embodiments and may optionally be substituted without departing from the true spirit and scope of the presently disclosed systems and/or methods.

In addition, it is noted that as used herein and in the appended claims, the singular forms "a", "and", "said", and "the" include plural referents unless the context clearly dictates otherwise. Conversely, it is contemplated that the claims may optionally be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A method of providing payment towards financial obligations through an online game, comprising:
    presenting a player with a graphical representation of a game board, wherein said game board has a plurality of game spaces;
    presenting said player with a graphical representation of said player's position within an initial game space;
    crediting said player with at least one game credit;
    presenting said player with a question;
    providing said player with a determined time period for supplying a response to said presented question;
    crediting said player with at least one game point if said player provides a proper response to said presented question, wherein each game credit corresponds to a determined monetary value and advancing said graphical representation of said player's position to a next game space;
    subtracting, if said graphical representation of said player's position is within said initial game space, at least one game credit from said total number of game credits to said player if said player fails to respond within said determined time period or provides an improper response to said presented question within said determined time period;
    requiring, if said graphical representation of said player's position is not within said initial game space, said player to choose an option between at least one or more options if said player fails to respond within said determined time period or provides an improper response to said presented question within said determined time period, wherein said at least one or more options comprises reducing game credits for a total monetary value for participating in said game, subtracting at least one game point from said total number of game points credited to said player, or not advancing said graphical representation of said player's position to a new game space and implementing said option chosen by said player;
    presenting subsequent questions to said player until said player provides a proper response to a presented question while said graphical representation of said player's position is represented in a final game space, a determined time period for said game expires, or said player terminates said game; and allowing said player to exchange said determined monetary value of a selected number of credits for monetary credit towards payment of at least one financial obligation.

2. The method of claim 1, wherein said response must be a predetermined response.

3. The method of claim 1, wherein said response must be one of a plurality of predetermined responses.

4. The method of claim 1, wherein said question is selected from a category chosen by said player.

5. The method of claim 1, wherein said question is selected from a predetermined category.

6. The method of claim 1, wherein at least one subsequent question increases in difficulty from a previous question if said player answers said previous question correctly.

7. The method of claim 1, wherein at least one subsequent question decreases in difficulty from a previous question if said player answers said previous question incorrectly.

8. The method of claim 1, further comprising crediting said player with a determined number of game points if said player completes said game.

9. The method of claim 1, further comprising crediting said player with a determined number of game points if said player provides a proper response to each of said presented questions.

10. The method of claim 4, further comprising:
  beginning said game with a determined amount of game prize money;
  crediting said player with a determined amount of said game prize money each time said player provides a proper response to said presented question;
  reducing said determined amount of game prize money by said determined amount of said game prize money credited to said player; and
  terminating said game when said determined amount of game prize money reaches zero.

11. A method of providing payment towards financial obligations through an online game, comprising:
  presenting a plurality of players with a graphical representation of a game board, wherein said game board has a plurality of game spaces;
  crediting each of said plurality of players with at least one game credit;
  presenting each of said plurality of players with a discrete graphical representation of each player's position within an initial game space;
  presenting, during a respective turn, each player with a question;
  providing, during said respective turn, each player with a determined time period for supplying a response to said presented question;
  crediting each player with at least one game point if, during said respective turn, said player provides a proper response to said presented question, wherein each game credit corresponds to a determined monetary value and advancing said graphical representation of said player's position to a next game space;
  subtracting, if said graphical representation of said player's position is within said initial game space, at least one game credit from said total number of game credits to said player if said player fails to respond within said determined time period or provides an improper response to said presented question within said determined time period, during said respective turn;
  requiring, if said graphical representation of said player's position is not within said initial game space during said respective turn, each player to choose an option between at least one or more options if, during said respective turn, said player fails to respond within said determined time period or provides an improper response to said presented question within said determined time period, wherein said at least one or more options comprises reducing game credits for a total monetary value for participating in said game, subtracting at least one game point from said total number of game points credited to said player, or not advancing said graphical representation of said players position to a new game space and implementing said option chosen by said player; and
  presenting subsequent questions to said players, in turn, until at least one of said players provides a proper response to a presented question while said graphical representation of said player's position is represented in a final game space, a determined time period for said game expires, or a determined number of game points has been credited to said players.

12. The method of claim 11, further comprising, presenting each player, during said respective turn, with a graphical representation of said remaining time period for supplying a response to said presented question.

13. The method of claim 11, wherein said response must be a predetermined response.

14. The method of claim 11, wherein said response must be one of a plurality of predetermined responses.

15. The method of claim 11, further comprising crediting one of said players with a determined number of game points if said player completes said game.

16. The method of claim 11, further comprising crediting one of said players with a determined number of game points if said player provides a proper response to each of said presented questions.

17. The method of claim 11, further comprising:
  beginning said game with a determined amount of game prize money;
  crediting one of said players with a determined amount of said game prize money each time said player provides a proper response to said presented question;
  reducing said determined amount of game prize money by said determined amount of said game prize money credited to said player; and
  terminating said game when said determined amount of game prize money reaches zero.

* * * * *